United States Patent
You et al.

(10) Patent No.: US 11,751,177 B2
(45) Date of Patent: *Sep. 5, 2023

(54) METHOD FOR SLOT FORMAT FOR BACKHAUL AND ACCESS LINK IN WIRELESS COMMUNICATION SYSTEM AND TERMINAL USING SAME METHOD

(71) Applicant: LG Electronics Inc., Seoul (KR)

(72) Inventors: Hyangsun You, Seoul (KR); Yunjung Yi, Seoul (KR); Huayue Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,405

(22) Filed: May 3, 2022

(65) Prior Publication Data

US 2022/0272697 A1    Aug. 25, 2022

Related U.S. Application Data

(63) Continuation of application No. 17/045,666, filed as application No. PCT/KR2019/004126 on Apr. 8, 2019, now Pat. No. 11,350,410.

(Continued)

(30) Foreign Application Priority Data

Sep. 28, 2018 (KR) .......................... 10-2018-0116128

(51) Int. Cl.
*H04W 72/12*    (2023.01)
*H04W 72/21*    (2023.01)
(Continued)

(52) U.S. Cl.
CPC ....... *H04W 72/0446* (2013.01); *H04W 72/12* (2013.01); *H04W 72/21* (2023.01); *H04W 72/23* (2023.01); *H04W 84/04* (2013.01)

(58) Field of Classification Search
CPC .............................. H04W 72/12; H04W 84/04
(Continued)

(56) References Cited

U.S. PATENT DOCUMENTS

2012/0250647 A1*    10/2012   Das ..................... H04W 52/146
                                                                  370/329
2017/0064731 A1     3/2017   Wang et al.
(Continued)

OTHER PUBLICATIONS

Ericsson, "Duplexing in IAB," R2-1801024, 3GPP TSG-RAN WG2 NR AH1801, Vancouver, Canada, Jan. 22-26, 2018, 6 pages.
(Continued)

*Primary Examiner* — Angel T Brockman
(74) *Attorney, Agent, or Firm* — Fish & Richardson P.C

(57) ABSTRACT

The present disclosure provides a method for data transmission or reception performed by a first node in a wireless communication system, the method including: performing a first data transmission or reception to or from a UE on an access link on the basis of a first timing case in an access time duration; and performing a second data transmission or reception to or from a second node or a donor base station on a backhaul link on the basis of a second timing case in a backhaul time duration, wherein downlink transmission timings over the donor base station, the first node, the second node and the UE are aligned in the first timing case, and downlink and uplink transmission timings or downlink and uplink reception timings are aligned in the first node in the second timing case.

10 Claims, 49 Drawing Sheets

Related U.S. Application Data

(60) Provisional application No. 62/670,717, filed on May 11, 2018, provisional application No. 62/654,270, filed on Apr. 6, 2018.

(51) Int. Cl.
*H04W 72/0446* (2023.01)
*H04W 84/04* (2009.01)
*H04W 72/23* (2023.01)

(58) Field of Classification Search
USPC .......................................................... 370/329
See application file for complete search history.

(56) References Cited

U.S. PATENT DOCUMENTS

2018/0042031 A1    2/2018  Hampel et al.
2021/0160861 A1*   5/2021  You .................... H04W 72/042

OTHER PUBLICATIONS

Extended European Search Report in European Appln. No. 19781055.9, dated Apr. 15, 2021, 13 pages.

Huawei, HiSilicon, "Consideration on IAB physical layer enhancement," R1-1720606, 3GPP TSG RAN WG1 Meeting #91, Reno, USA, Nov. 27-Dec. 1, 2017, 7 pages.

Huawei, HiSilicon, "Evaluation on the dynamic and flexible resource allocation in IAB," R1-1801403, 3GPP TSG RAN WG1 Meeting #92, Athens, Greece, Feb. 26-Mar. 2, 2018, 6 pages.

Qualcomm Incorporated, "Resource Coordination across IAB Topology," R2-1804865, 3GPP TSG-RAN WG2 Meeting #101 bis, Sanya, China, dated Apr. 16-Apr. 20, 2018, 6 pages.

Samsung, "Dynamic resource allocation for Integrated Access and Backhaul," R1-1714497, 3GPP TSG RAN WG1#90, Prague, Czech Republic, Aug. 21-25, 2017, 3 pages.

\* cited by examiner

METHOD FOR SLOT FORMAT FOR BACKHAUL AND ACCESS LINK IN WIRELESS COMMUNICATION SYSTEM AND TERMINAL USING SAME METHOD

CROSS-REFERENCE TO RELATED APPLICATIONS

This application is a continuation of U.S. application Ser. No. 17/045,666, filed on Oct. 6, 2020, which is a National Stage application under 35 U.S.C. § 371 of International Application No. PCT/KR2019/004126, filed on Apr. 8, 2019, which claims the benefit of U.S. Provisional Application No. 62/654,270, filed on Apr. 6, 2018, U.S. Provisional Application No. 62/670,717, filed on May 11, 2018, and Korean Patent Application No. 10-2018-0116128, filed on Sep. 28, 2018. The disclosures of the prior applications are incorporated by reference in their entirety.

BACKGROUND OF THE DISCLOSURE

Field of the Disclosure

The present disclosure relates to wireless communication, and more specifically, to a method for slot formats with respect to backhaul and access links in a wireless communication system and a UE using the same.

Related Art

Recently, in 3GPP standardization organization, it has been considered a network slicing technique for implementing a plurality of logical networks on a single physical network in the NR system, which is 5G wireless communication system. To this end, the logical networks needs to be capable of supporting services having various requirements (e.g., enhanced Mobile Broadband (eMBB), massive Machine Type Communication (mMTC), Ultra Reliable Low Latency Communication (URLLC), etc.). In addition, in the physical layer system of the NR system, it has been considered a technique for supporting an orthogonal frequency division multiplexing (OFDM) scheme in which a variable numerology is applicable according to the various services. In other words, in the NR (New RAT) system, an OFDM scheme (or a multiple access scheme) in which independent numerologies are applied in each time and frequency resource region may be supported.

Hereinafter, the present disclosure proposes a method for scheduling/coordinating transmission/reception directions and transmission/reception timings between links in an IAB environment.

SUMMARY

The present disclosure provides a method for slot formats with respect to backhaul and access links in a wireless communication system and a UE using the same.

In an aspect, a method for transmitting or receiving a data in a wireless communication system is provided. The method is performed by a first node and comprises performing a first data transmission or reception to or from a UE on an access link on the basis of a first timing case in an access time duration and performing a second data transmission or reception to or from a second node or a donor base station on a backhaul link on the basis of a second timing case in a backhaul time duration, wherein downlink transmission timings over the donor base station, the first node, the second node and the UE are aligned in the first timing case, and wherein downlink and uplink transmission timings or downlink and uplink reception timings are aligned in the first node in the second timing case.

The first node may support being scheduled by the donor base station and scheduling of the second node or the UE.

The access time duration and the backhaul time duration may be time-division-multiplexed (TDMed).

The first node may be an integrated access and backhaul (IAB) node.

The first node may be connected to the donor base station on the basis of a first backhaul link, the first node is connected to the second node on the basis of a second backhaul link, and a slot format for the first backhaul link differs from a slot format for the second backhaul link.

The first node may be connected to a third node on the basis of a third backhaul link, and a slot format for the second backhaul link differs from a slot format for the third backhaul link.

A slot format for the backhaul link may differ from a slot format for the access link.

In another aspect, a first node in a wireless communication system is provided. The first node may comprise a memory, a transceiver and a processor operably connected to the memory and the transceiver, wherein the processor is configured: to perform a first data transmission or reception to or from a UE on an access link on the basis of a first timing case in an access time duration and to perform a second data transmission or reception to or from a second node or a donor base station on a backhaul link on the basis of a second timing case in a backhaul time duration, wherein downlink transmission timings over the donor base station, the first node, the second node and the UE are aligned in the first timing case, and downlink and uplink transmission timings or downlink and uplink reception timings are aligned in the first node in the second timing case.

In other aspect, a processor of a wireless communication device in a wireless communication system, wherein the processor is configured to cause the wireless communication device to: perform a first data transmission or reception to or from a UE on an access link on the basis of a first timing case in an access time duration and perform a second data transmission or reception to or from a second node or a donor base station on a backhaul link on the basis of a second timing case in a backhaul time duration, wherein downlink transmission timings over the donor base station, the first node, the second node and the UE are aligned in the first timing case, and downlink and uplink transmission timings or downlink and uplink reception timings are aligned in the first node in the second timing case.

According to the present disclosure, it is possible to support legacy UEs. UEs can reuse the existing specifications and thus impact on change of communication specifications can be mitigated. In addition, since downlink timings of UEs can be aligned in an access timing duration, interference caused by downlink communication performed by a certain UE and uplink communication performed by another UE in the access timing duration can be alleviated. Furthermore, an access timing duration and a backhaul timing duration are time-division-multiplexed and timing case 1 is applied in the access timing duration, and thus an access link may not be affected by change of a backhaul link route change unless a serving node is changed.

DESCRIPTION OF EXEMPLARY EMBODIMENTS

In what follows, for those terms or acronyms not defined separately, the 3GPP TS 36 series or TS 38 series may be referred to.

Figure 1:
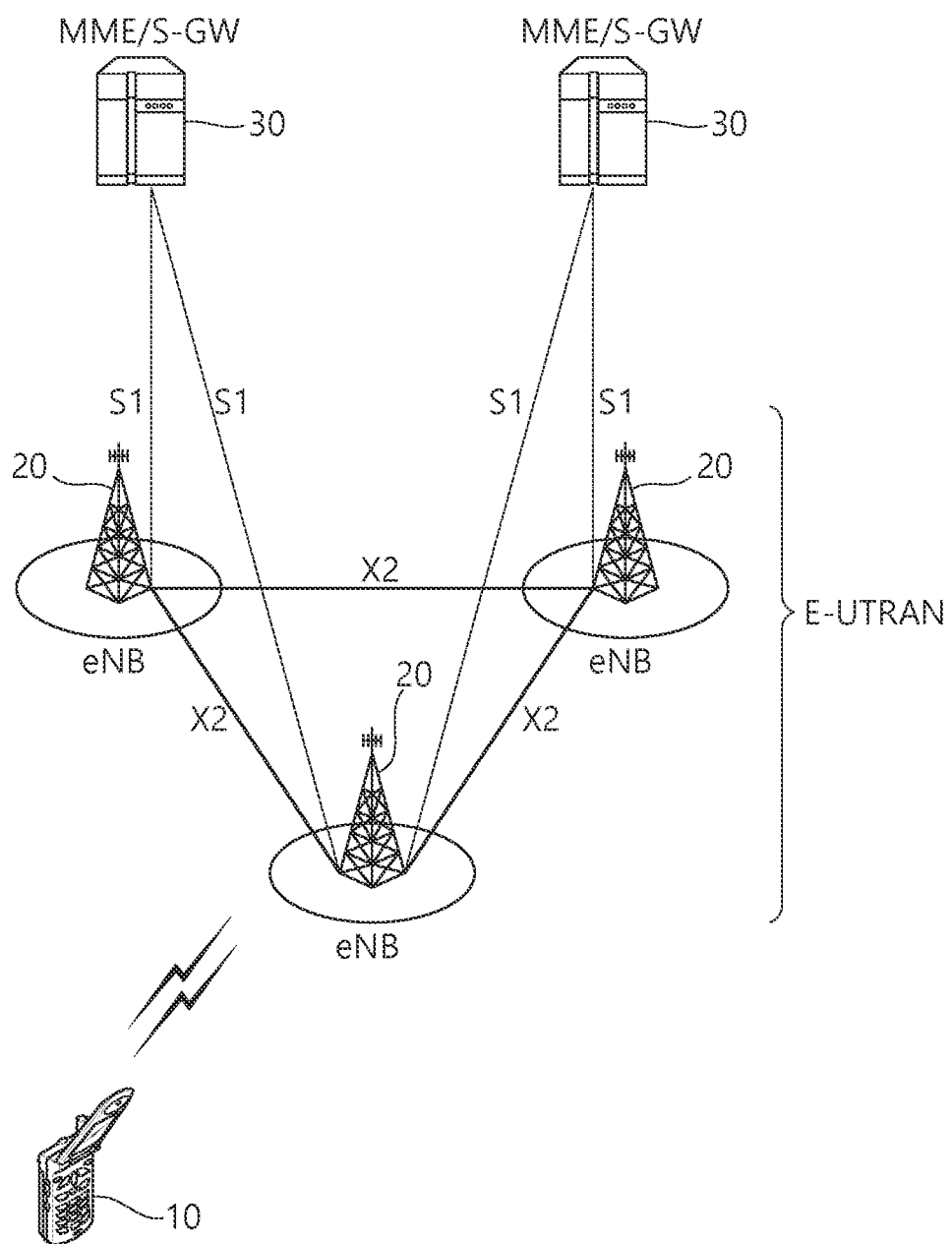
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
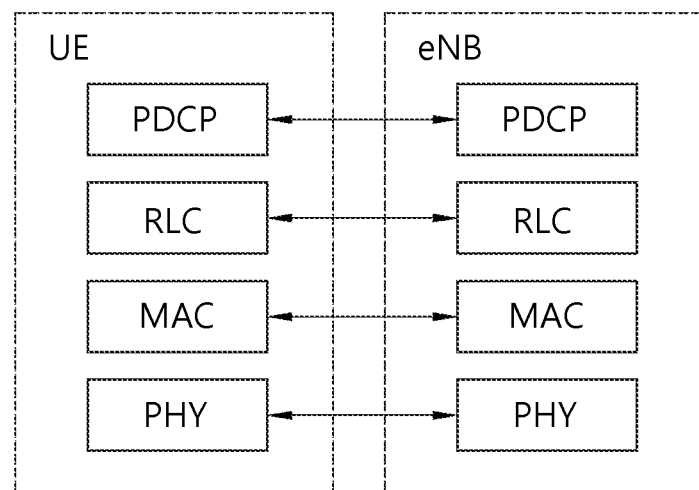
FIG. 2 is a diagram showing a wireless protocol architecture for a user plane.
Figure 3:
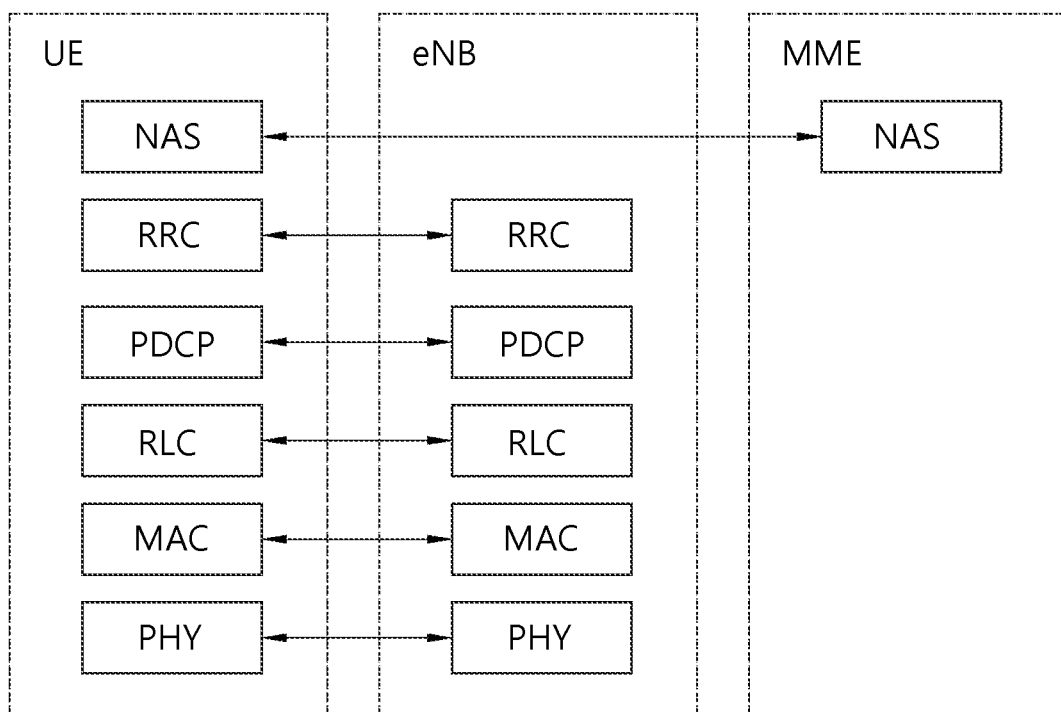
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
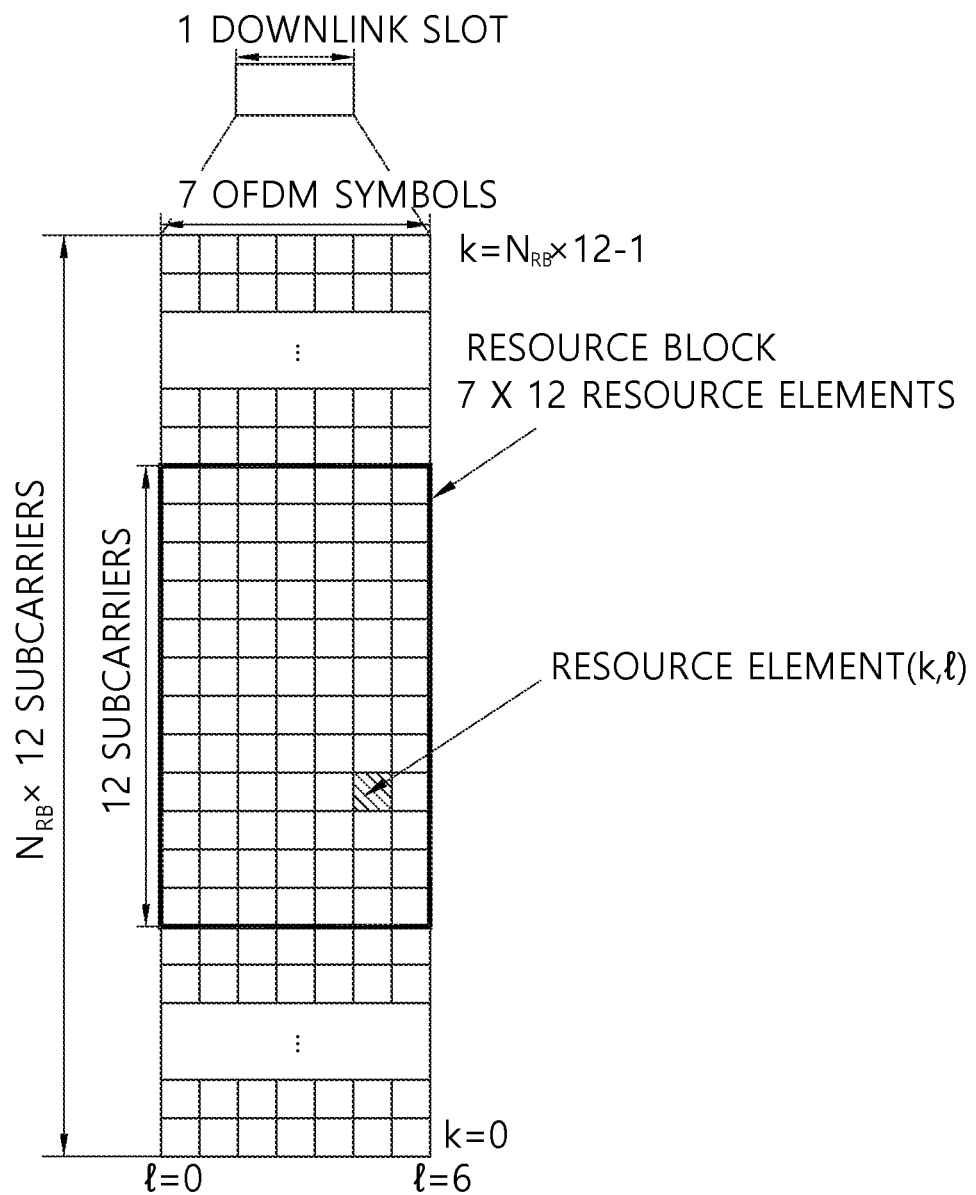
FIG. 4 illustrates an example of a downlink/uplink (DL/UL) slot structure in a wireless communication system.

FIG. 4 illustrates an example of a downlink/uplink (DL/UL) slot structure in a wireless communication system. Particularly, FIG. 4 illustrates a resource grid structure of the 3GPP LTE(-A) system. One resource grid is present per antenna port.

A slot includes a plurality of orthogonal frequency division multiplexing (OFDM) symbols in the time domain and includes a plurality of resource blocks (RBs) in the frequency domain. An OFDM symbol may means a symbol period. Referring to FIG. 2, a signal transmitted in each slot can be represented by a resource grid composed of $N_{RB}^{DL/UL} * N_{sc}^{RB}$ subcarriers and $N_{symb}^{DL/UL}$ OFDM symbols. Here, $N_{RB}^{DL}$ indicates the number of resource blocks (RBs) in a downlink slot and $N_{RB}^{UL}$ indicates the number of RBs in a UL slot. $N_{RB}^{DL}$ and $N_{RB}^{UL}$ respectively depend on a DL transmission bandwidth and a UL transmission bandwidth. $N_{symb}^{DL}$ indicates the number of OFDM symbols in a downlink slot and $N_{symb}^{UL}$ indicates the number of OFDM symbols in a UL slot. $N_{sc}^{RB}$ indicates the number of subcarriers constituting a single RB.

An OFDM symbols may be called an OFDM symbol, an SC-FDM symbol or the like according to multiple access scheme. The number of OFDM symbols included in a slot can vary with a channel bandwidth and a CP length. For example, one slot includes 7 OFDM symbols in a normal CP case, whereas one slot includes 6 OFDM symbols in an extended CP case. Although FIG. 2 illustrates a subframe including 7 OFDM symbols in a single slot for convenience of description, embodiments of the present disclosure can be applied to subframes having different numbers of OFDM symbols in the same manner. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and a null subcarrier for a guard band and a DC component. The null subcarrier for a DC component remains unused and is mapped to a carrier frequency ($f_0$) in an OFDM signal generation process or a frequency upconversion process. The carrier frequency is also called a center frequency.

One RB is defined as $N_{symb}^{DL/UL}$ (e.g., 7) consecutive OFDM symbols in the time domain and defined as $N_{sc}^{RB}$ (e.g., 12) consecutive subcarriers in the frequency domain. For reference, a resource composed of one OFDM symbol and one subcarrier is referred to as a resource element (RE) or a tone. Accordingly, one RB is composed of $N_{symb}^{DL/UL} * N_{sc}^{RB}$ resource elements. Each resource element in a resource grid can be uniquely defined by an index pair (k, 1) in a slot. k is an index assigned as 0 to $N_{RB}^{DL/UL} * N_{sc}^{RB} - 1$ in the frequency domain and 1 is an index assigned as 0 to $N_{symb}^{DL/UL} - 1$ in the time domain.

Two RBs respectively positioned in two slots of a subframe while occupying the same $N_{sc}^{RB}$ consecutive subcarriers in the subframe are referred to as a physical resource block (PRB). Two RBs constituting a PRB pair have the same PRB number (or PRB index). A VRB is a logical resource allocation unit introduced for resource allocation. The VRB has the same size as the PRB. The VRB is classified into a localized type VRB and a distributed type VRB according to VRB-to-PRB mapping methods. Localized type VRBs are directly mapped to PRBs and VRB numbers (or VRB indexes) correspond to PRB numbers. That is, $n_{PRB}=n_{VRB}$. Numbers are assigned to localized type VRBs in the order of 0 to $N_{VRB}^{DL}-1$, and $N_{VRB}^{DL}=N_{RB}^{DL}$. Accordingly, VRBs having the same VRB number are mapped to PRBs having the same PRB number in the first and second slots according to the localized mapping method. On the other hand, a distributed type VRB is mapped to a PRB through interleaving. Accordingly, distributed type VRBs having the same VRB number can be mapped to PRBs having different numbers in the first and second slots. Two PRBs positioned in two slots of a subframe and having the same VRB number are referred to as a VRB pair.

Figure 5:
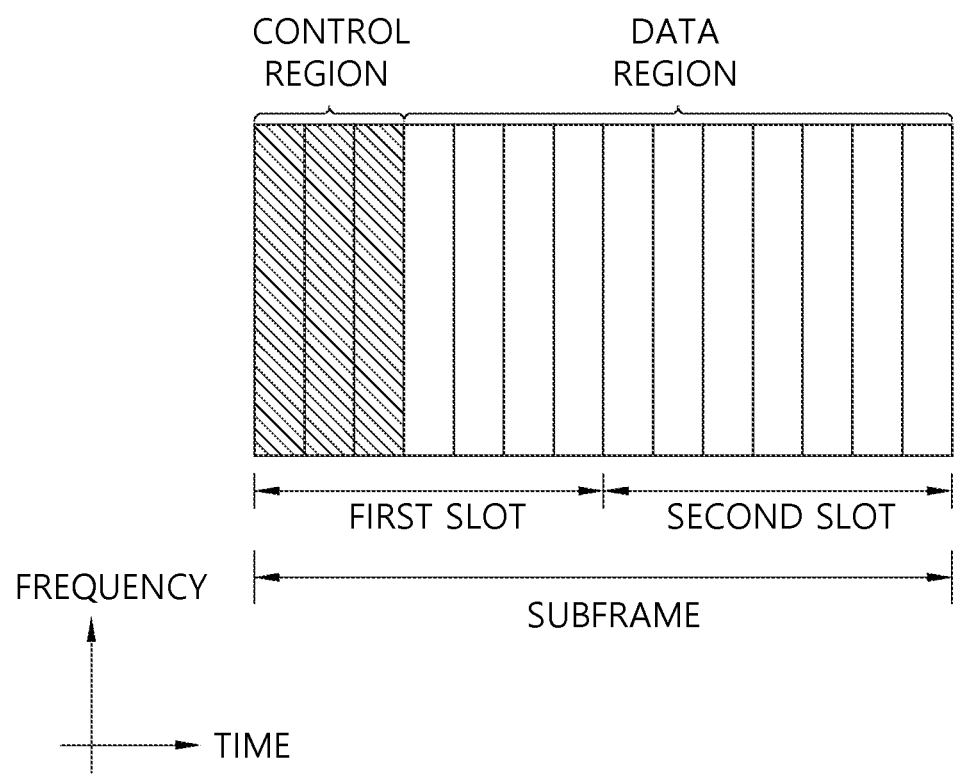
FIG. 5 illustrates a downlink subframe structure used in the 3GPP LTE(-A) system.

FIG. 5 illustrates a downlink subframe structure used in the 3GPP LTE(-A) system.

A DL subframe is divided into a control region and a data region in the time domain. Referring to FIG. 5, up to three (or four) OFDM symbols at the start of the first slot in a subframe correspond to a control region to which control channels are allocated. Hereinafter, a resource region that can be used for PDCCH transmission in a DL subframe is referred to as a PDCCH region. OFDM symbols other than the OFDM symbols used for the control region correspond to a data region to which a physical downlink shared channel (PDSCH) is allocated. Hereinafter, a resource region that can be used for PDSCH transmission in a DL subframe is referred to as a PDSCH region. Examples of DL control channels used in 3GPP LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information transmitted through the PDCCH is called downlink control information (DCI). The DCI includes resource allocation information and other control information for a UE or a UE group. For example, the DCI includes transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, a Tx power control command, activity indication information of voice over Internet protocol (VoIP), and the like. DCI carried by a PDCCH has a size and purpose depending on a DCI format and the size thereof may vary with a coding rate.

A plurality of PDCCHs can be transmitted in a PDCCH region of a DL subframe. A UE is able to monitor a plurality of the PDCCHs. A BS determines a DCI format according to DCI to be transmitted to the UE and adds a cyclic redundancy check (CRC) to the DCI. The CRC is masked (scrambled) with an identifier (e.g., a radio network temporary identifier (RNTI)) depending on an owner of the PDCCH or usage of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI). CRC masking (or scrambling) includes an XOR operation of the CRC and RNTI at a bit level, for example.

The PDCCH is transmitted on aggregation of one or a plurality of consecutive control channel elements (CCEs). The CCE is a logical allocation unit used to provide the PDCCH with a coding rate based on a radio channel state. The CCE corresponds to a plurality of resource element groups (REGs). For example, one CCE corresponds to 9

REGs and one REG corresponds to 4 REs. 4 QPSK symbols mapped to each REG. A resource element (RE) occupied by a reference signal (RS) is not included in an REG. Accordingly, the number of REGs in given OFDM symbols depends on presence or absence of an RS. The concept of the REG is also used for other DL control channels (i.e., PCFICH and PHICH). The DCI format and the number of DCI bits are determined according to the number of CCEs.

CCEs are numbered and consecutively used, and a PDCCH having a format composed of n CCEs can start only at a CCE having a number corresponding to a multiple of n. The number of CCEs used for transmission of a specific PDCCH, in other words, a CCE aggregation level is determined by a BS according to channel state. For example, in the case of a PDCCH for a UE (e.g., adjacent to the BS) having a DL channel in a satisfactory state, one CCE is sufficient therefor. However, in the case of a PDCCH for a UE (e.g., present near a cell boundary) having a poor channel, 8 CCEs may be necessary to obtain sufficient robustness.

Figure 6:
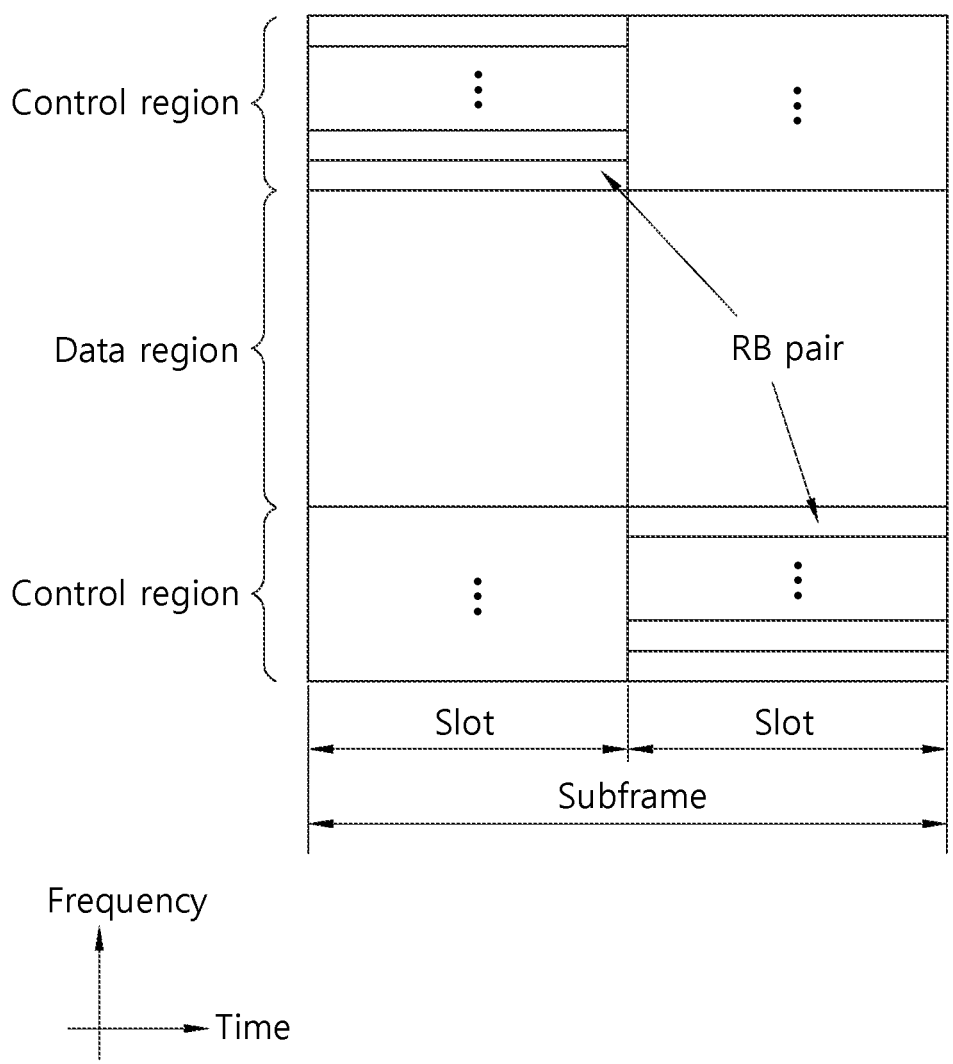
FIG. 6 illustrates an example of an uplink subframe structure used in the 3GPP LTE(-A) system.

FIG. 6 illustrates an example of an uplink subframe structure used in the 3GPP LTE(-A) system.

Referring to FIG. 6, the uplink subframe can be divided into a control region and a data region in the frequency domain. One or more physical uplink control channels (PUCCHs) can be allocated to the control region to carry uplink control information (UCI). One or more physical uplink shared channels (PUSCHs) can be allocated to the data region of the UL subframe to carry user data. The control region and the data region in the UL subframe are also called a PUCCH region and a PUSCH region. A sounding reference signal (SRS) may be allocated to the data region. The SRS is transmitted on the last OFDM symbol of the UL subframe in the time domain and a data transmission band of the UL subframe in the frequency domain, that is, the data region. SRSs of UEs transmitted/received in the last OFDM symbol of the same subframe can be distinguished according to frequency position/sequence.

When a UE adopts SC-FDMA for UL transmission, a PUCCH and a PUSCH cannot be simultaneously transmitted on one carrier in 3GPP LTE release 8 or release 9 in order to maintain single carrier characteristic. In 3GPP LTE release 10, a higher layer can indicate whether the PUCCH and the PUSCH are simultaneously transmitted.

In the UL subframe, subcarriers far away from a direct current (DC) subframe are used as a control region. In other words, subcarriers positioned at both ends of a UL transmission bandwidth are allocated to uplink control information transmission. The DC subcarrier is a component that remains without being used for signal transmission and is mapped to a carrier frequency $f_0$ in a frequency upconversion process. A PUCCH for a UE is allocated to an RB pair belonging to resources operating at a carrier frequency and RBs belonging to the RB pair occupy different subcarriers in two slots. Allocation of the PUCCH in this manner is represented as frequency hopping of an RB pair allocated to the PUCCH at a slot boundary. When frequency hopping is not applied, the RB pair occupies the same subcarrier.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 7:
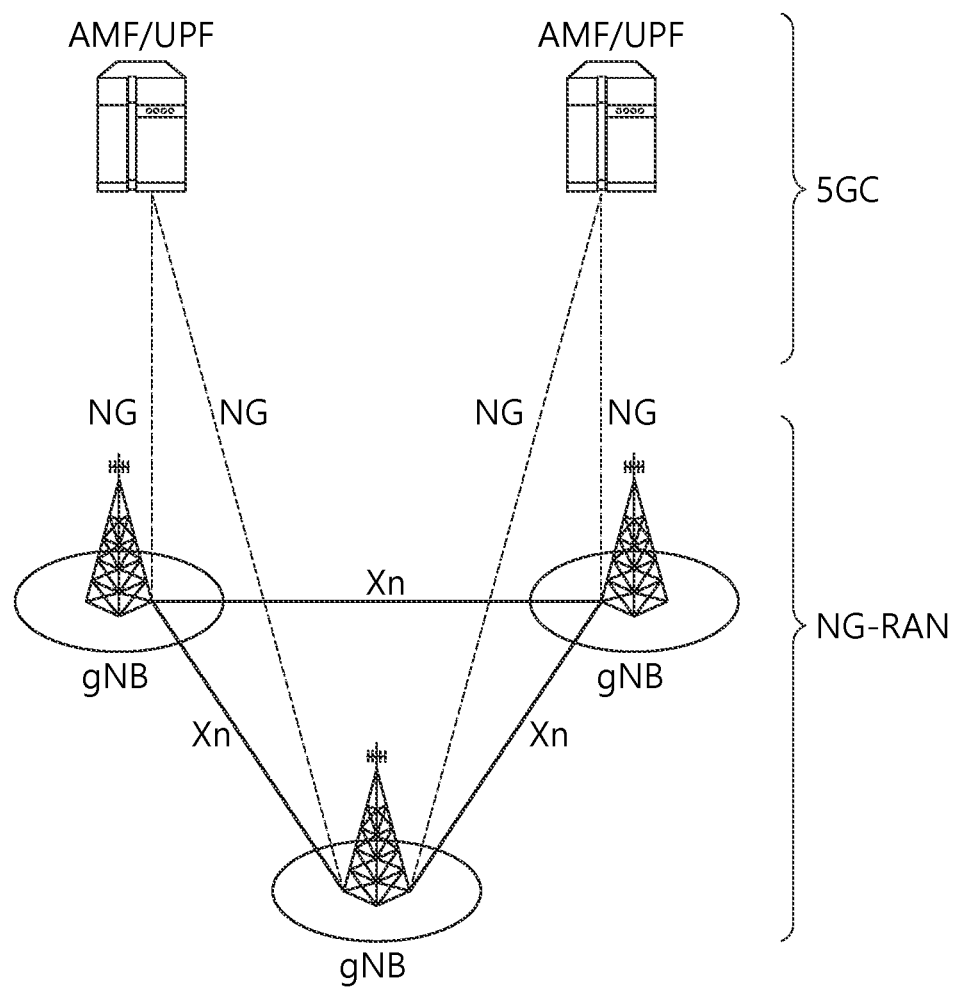
FIG. 7 illustrates a system structure of a new generation radio access network (NG-RAN) to which NR is applied.

FIG. 7 illustrates a system structure of a new generation radio access network (NG-RAN) to which NR is applied.

Referring to FIG. 7, the NG-RAN may include a gNB and/or an eNB providing a user plane and a control plane protocol termination to a terminal. FIG. 7 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 8:
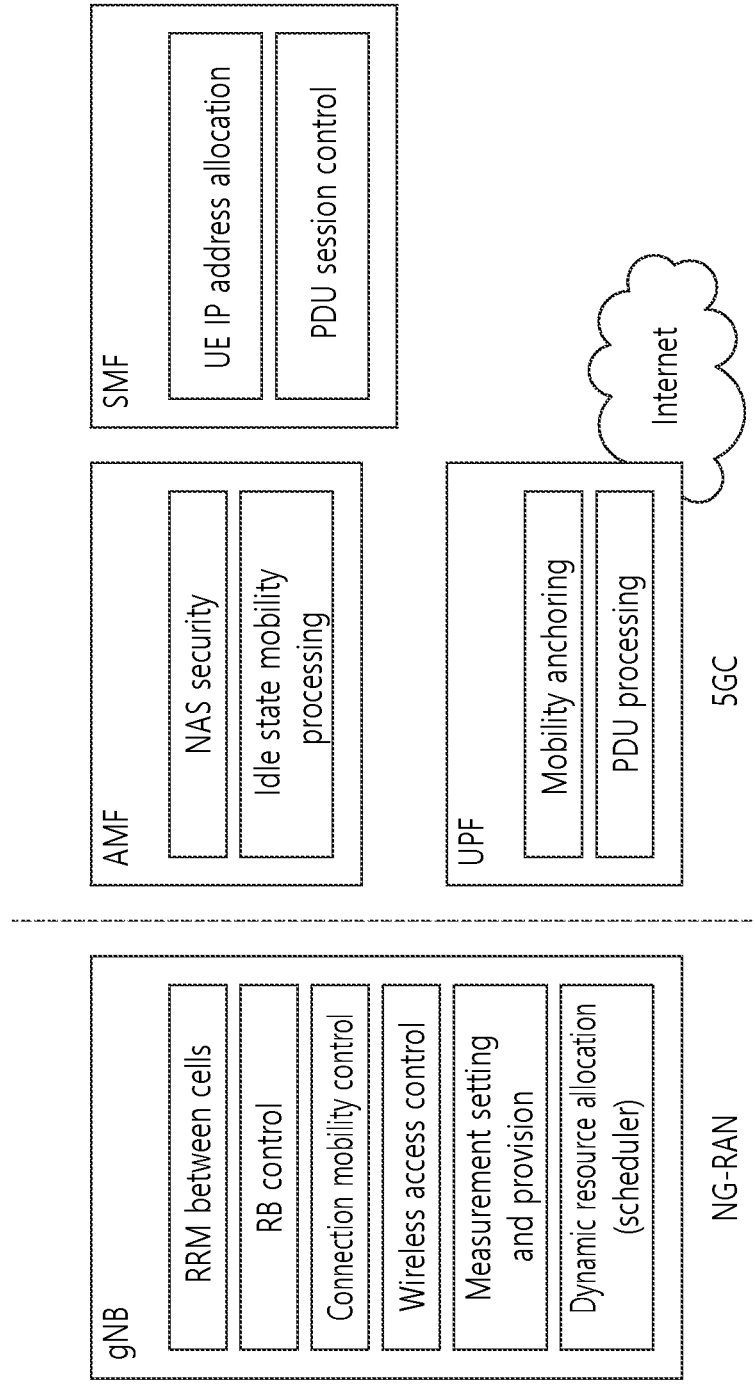
FIG. 8 illustrates functional partitioning between NG-RAN and 5GC.

FIG. 8 illustrates functional partitioning between NG-RAN and 5GC.

Referring to FIG. 8, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<Self-Contained Subframe Structure>

A structure in which a control channel and a data channel are TDMed as illustrated in the figure may be considered as a frame structure in order to minimize latency in 5G NR. That is, to minimize data transmission latency in the TDD system, a self-contained subframe structure is considered in 5G NR.

Figure 9:
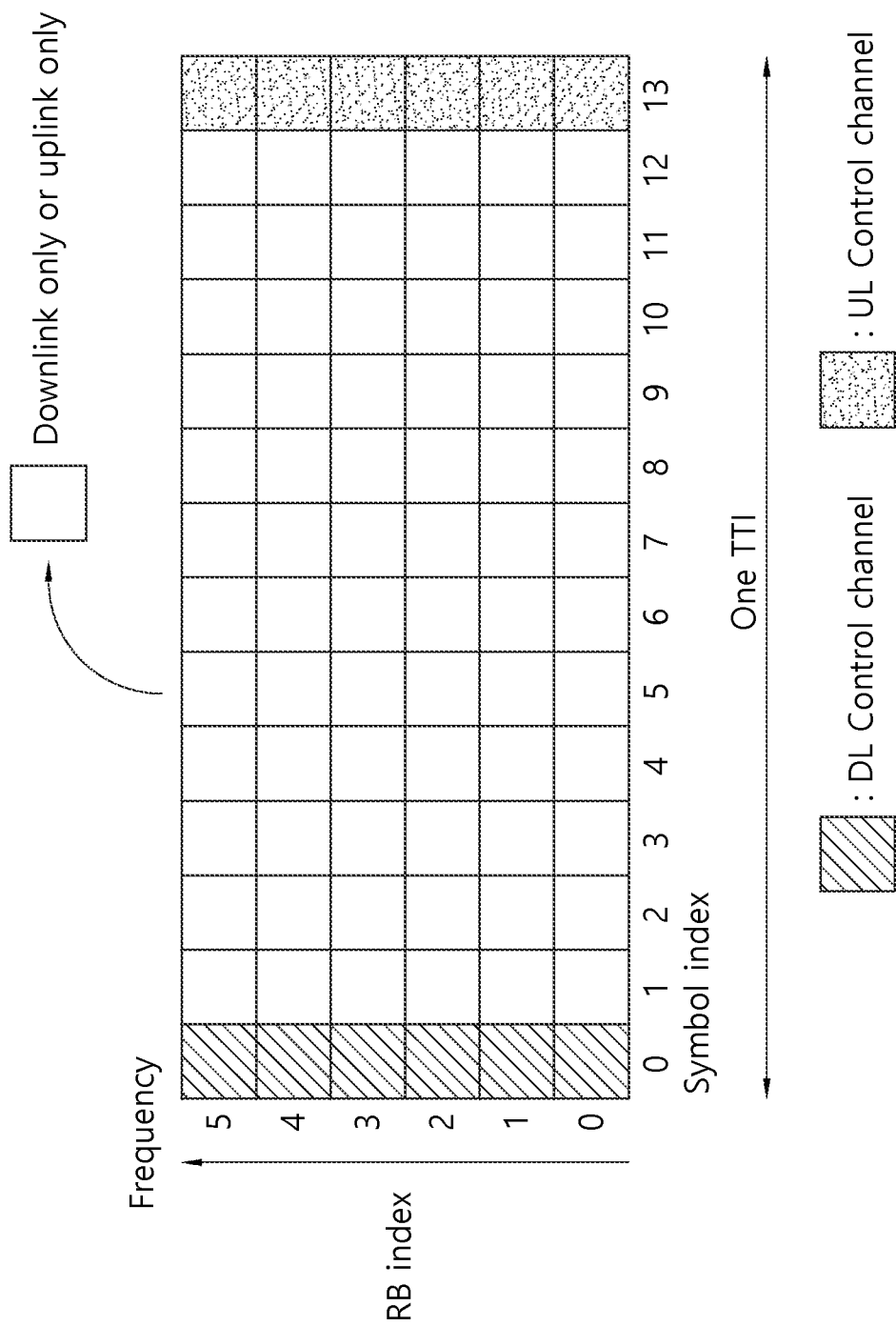
FIG. 9 schematically illustrates an example of a frame structure based on a structure in which a data channel and a control channel are time-division-multiplexed (TDMed).

FIG. 9 schematically illustrates an example of a frame structure based on a structure in which a data channel and a control channel are time-division-multiplexed (TDMed).

Referring to FIG. 9, as an example of a frame structure, a subframe (here, a subframe may be used interchangeably with a transmission time interval (TTI)) can be represented on the basis of a resource block (RB) index and a symbol index. Here, a TTI may include a region related to a downlink control channel, a region related to an uplink control channel, and a downlink or uplink region.

For example, a TTI structure is described on the basis of FIG. 6. The hatched area represents a downlink control region and the black part represents an uplink control region. The area having no marks may be used for downlink data transmission or uplink data transmission. According to this structure, as DL transmission and UL transmission take place sequentially in one subframe, transmission of DL data and reception of a UL ACK/NACK may be performed in the one subframe. As a consequence, when an error is generated during data transmission, a time taken for a data retransmission may be reduced, thereby minimizing the latency of a final data transmission.

In this data and control TDMed subframe structure (i.e., self-contained subframe structure), a time gap is required to allow a base station and a UE to switch from a transmission mode to a reception mode or from the reception mode to the transmission mode. To this end, some OFDM symbols corresponding to a DL-to-UL switching time is configured as a guard period (GP) in the subframe structure.

<Analog Beamforming>

In a millimeter wave (mmW) system, since a wavelength is short, multiple antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, it is available to improve the coverage or throughput by increasing the beamforming (BF) gain using multiple antenna elements.

In this case, in the case that each antenna element may include a transceiver unit (TXRU) to enable adjustment of transmit power and phase, independent beamforming per frequency resource is available. However, installing TXRUs in all of the about 100 antenna elements is less feasible in terms of cost. Therefore, a method of mapping a plurality of antenna elements to one TXRU and adjusting a direction of a beam using an analog phase shifter has been considered. However, the analog beamforming method is disadvantageous in that frequency selective beamforming is impossible because only one beam direction is generated over the entire band.

As an intermediate form of digital beamforming (BF) and analog beamforming (BF), hybrid BF with B TXRUs that are fewer than Q antenna elements may be considered. In this case, the number of beam directions that can be transmitted at the same time is limited to B or less, which depends on the connection scheme of B TXRUs and Q antenna elements.

In the present disclosure, a proposed method is described on the basis of the new RAT (NR) system for convenience of description. However, the proposed method can be extended to other systems such as 3GPP LTE/LTE-A systems in addition to the new RAT system.

To aid in understanding of the following description, 3GPP TS 38 series (38.211, 38.212, 38.213, 38.214, 38.331, etc.) may be referred to.

<NR Frame Structure and Physical Resources>

In the NR system, DL and UL transmission is performed through frames having a duration of 10 ms and each frame includes 10 subframes. Accordingly, one subframe corresponds to 1 ms. Each frame is divided into two half frames. One subframe includes $N_{symb}^{subframe,\mu} = N_{symb}^{slot} \times N_{slot}^{subframe,\mu}$ consecutive OFDM symbols. Ns indicates the number of symbols per slot, indicates OFDM numerology, and $N_{slot}^{subframe,\mu}$ indicates the number of slots per subframe for corresponding µ. In NR, multiple OFDM numerologies as shown in Table 1 can be supported.

TABLE 1

| µ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1, ∆f indicates a subcarrier spacing (SCS). µ and a cyclic prefix (CP) for a DL carrier bandwidth part (BWP) and µ and a CP for a UL carrier BWP can be configured for a UE through higher layer signaling.

Table 2 shows the number $N_{symb}^{slot}$ of symbols per slot, the number $N_{slot}^{frame,\mu}$ of slots per frame and the number $N_{slot}^{frame,\mu}$ of slots per subframe for each SCS in a normal CP case.

TABLE 2

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 shows the number $N_{symb}^{slot}$ of symbols per slot, the number $N_{slot}^{frame,\mu}$ of slots per frame and the number $N_{slot}^{subframe,\mu}$ of slots per subframe for each SCS in an extended CP case.

TABLE 3

| µ | $N_{symb}^{slot}$ | $N_{slot}^{frame,\mu}$ | $N_{slot}^{subframe,\mu}$ |
|---|---|---|---|
| 2 | 12 | 40 | 4 |

As described above, the number of slots constituting one subframe may vary with the subcarrier spacing (SCS) in the NR system. OFDM symbols included in each slot may correspond to any of D (DL), U (UL) and X (flexible). DL transmission can be performed using the D or X symbol and UL transmission can be performed using the U or X symbol. The X (flexible) symbol may be represented by "F".

In NR, one resource block (RB) corresponds to 12 subcarriers in the frequency domain. An RB may include a plurality of OFDM symbols. A resource element (RE) corresponds to one subcarrier and one OFDM symbol. Accordingly, 12 REs are present on one OFDM symbol in one RB.

A carrier BWP can be defined as a set of consecutive physical resource blocks (PRBs). The carrier BWP may also be referred to as a simply BWP. A maximum of four BWPs can be configured for uplink/downlink to one UE. Even when multiple BWPs are configured, one BWP is activated for a given time. However, when supplementary uplink (SUL) is configured for a UE, four BWPs may be additionally configured for the SUL and one BWP can be activated for a given time. A UE is not expected to receive a PDSCH, a PDCCH, a channel state information-reference signal (CSI-RS) or a tracking reference signal (TRS) outside an activated DL BWP. Further, the UE is not expected to receive a PUSCH or a PUCCH outside an activated UL BWP.

A slot format can be configured in various manners according to combinations of D, U and/or X symbols constituting a slot. For example, a network can configure various slot format combinations for a UE through higher layer signaling and indicate at least one of the slot format combinations configured for the UE through a UE group common signaled PDCCH (e.g., DCI format 2-0).

Table 4 shows an example of various slot formats with respect to the normal CP.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |

In Table 4, D represents a downlink symbol, U represents an uplink symbol, and F represents a flexible symbol.

For convenience of understanding, slot formats will be described below on the basis of Table 4. For example, slot format 0 may represent that all symbols (i.e., symbols 0 to 13) present in one slot are downlink symbols. For example, slot format 1 may represent that all symbols present in one slot are uplink symbols. As another example, slot format 55 may represent that symbols 0, 1 and 8 to 13 are downlink symbols, symbols 2 to 4 are flexible symbols, and symbols 5 to 7 are uplink symbols.

One of potential technologies that allow future cellular network deployment scenario and application is to flexibly and densely deploy NR cells without densifying the same in proportion to transmission networks by supporting radio backhaul and relay links.

Since an expected bandwidth that can be used for NR is greater than LTE (e.g., mmWave spectrum) along with basic deployment of massive MIMO or multi-beam system, there is an opportunity to develop and distribute integrated access and backhaul links. This can allow easy deployment of a dense network of a self-backhauled NR cell in a more integrated manner by constructing a plurality of control and data channels/procedures defined to provide access to UEs.

Figure 10:
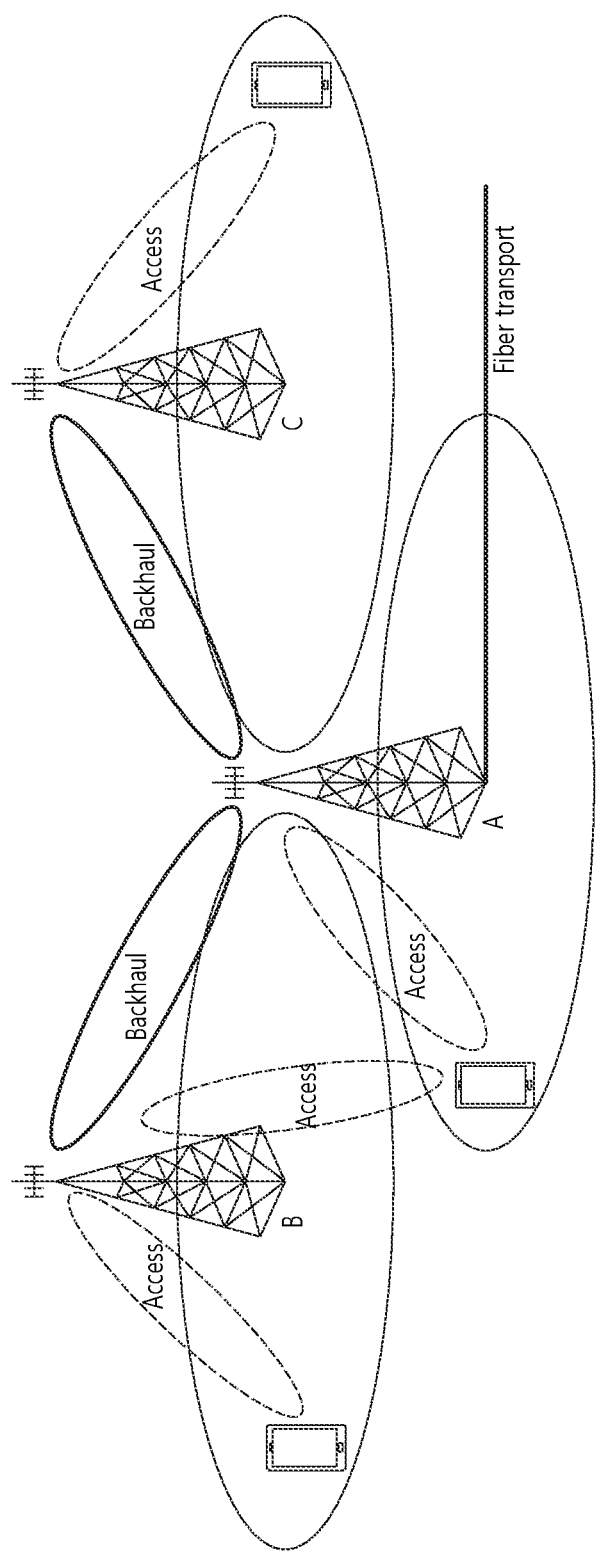
FIG. 10 schematically illustrates an example of integrated access and backhaul links.

FIG. 10 schematically illustrates an example of integrated access and backhaul links.

An example of a network having such integrated access and backhaul links is shown in FIG. 10. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result.

Accordingly, this centralized scheduling includes delayed scheduling and waiting time problems. On the other hand, distributed scheduling can be performed if each RN has scheduling capability. Then, immediate scheduling can be performed for an uplink scheduling request of a UE and backhaul/access links can be used more flexibly in response to surrounding traffic conditions.

Hereinafter, the present disclosure will be described.

The present disclosure proposes a method of scheduling/coordinating a transmission/reception direction and a transmission/reception timing between links in an IAB environment. Here, coordination may be replaced with the term "synchronization".

The present disclosure will be described on the assumption of an in-band environment, but the present disclosure can be applied to an out-band environment.

In addition, although the present disclosure will be described in consideration of an environment in which a donor gNB (DgNB), a relay node (RN) and a UE perform half-duplex operation, the present disclosure can also be applied to an environment in which the DgNB, the RN and/or the UE perform full-duplex operation.

In the present disclosure, for convenience of description, when two nodes DgNB and RN are present, the two nodes are node A and node B, and node A schedules node B (i.e., node B is associated with node A), a backhaul link that connects the two nodes is referred to as a node A-node B backhaul link. Likewise, when node A schedules UE 1 (i.e., node B is associated with node A), an access link that connects node A and UE 1 is referred to as a node A-UE 1 access link.

In addition, in the present disclosure, for convenience of description, a backhaul link with a node scheduled by a specific node is referred to as a backhaul link of the corresponding node and an access link with a UE scheduled by the specific node is referred to as an access link of the corresponding node. That is, an RN1-RN2 backhaul link and an RN1-RN3 backhaul link are backhaul links of RN1 and an RN1-UE2 access link and an RN1-UE4 access link are access links of RN1, for example.

In the present disclosure, when RNs which transmit/receive data to/from a specific DgNB in order to transmit/receive data to/from a UE are present, backhaul links connected between the DgNB and the RNs are referred to as backhaul links under the DgNB for convenience of description. In addition, access links between RNs and UEs connected through backhaul links under a specific DgNB are referred to as access links under the DgNB. For example, a DgNB-RN1 backhaul link and an RN1-RN2 backhaul link are backhaul links under the DgNB and a DgNB-UE access link, an RN1-UE2 access link and an RN2-UE3 access link are access links under the DgNB in an environment as shown in FIG. 11.

For convenience of understanding, the above will be described below with reference to the drawings.

Figure 11:
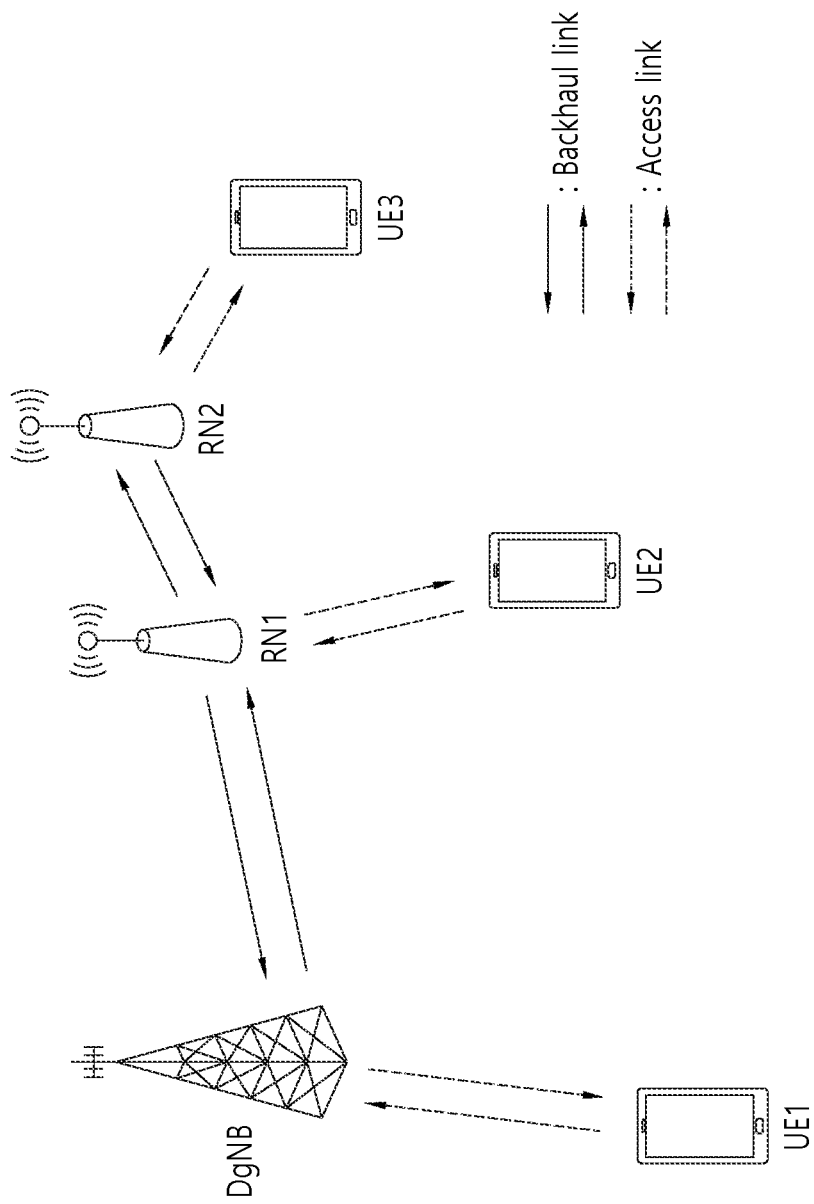
FIG. 11 schematically illustrates an example of links between a DgNB, RNs and UEs.

FIG. 11 schematically illustrates an example of links between a DgNB, RNs and UEs.

Referring to FIG. 11, a link between the DgNB and UE 1 may be an access link, a link between RN1 and UE2 may be an access link, and a link between RN2 and UE 3 may also be an access link, for example.

Similarly, referring to FIG. 11, a link between the DgNB and RN1 and a link between RN1 and RN2 may be backhaul links, for example.

A. Individual Slot Format for Backhaul Links and Access Links

To determine transmission directions and transmission timings of each backhaul link and each access link, slot formats used in NR can be reused.

A-1. Slot Format Between Backhaul Links

Here, when the same slot format is applied to each backhaul link for one RN, a situation in which the same RN needs to simultaneously perform transmission and reception may occur. In the case of RN 1 in FIG. 11, for example, if the slot format between DgNB and RN 1 is the same as the slot format between RN 1 and RN 2, a situation in which the two backhaul links are DL or UL at the same time occurs. In this case, RN 1 needs to simultaneously perform transmission of a DL signal to RN 2 and reception of a DL signal from the DgNB. Otherwise, RN 1 needs to simultaneously perform reception of a UL signal from RN 2 and transmission of a UL signal to the DgNB. This operation may act as considerable interference on RN 1 and is impossible in the case of a half-duplex operation.

In this case, it is desirable to receive a UL signal from RN 1 while receiving a DL signal from the DgNB and it is desirable to transmit a DL signal to RN 2 while transmitting a UL signal to the DgNB from the viewpoint of RN 1.

This means that the same slot format cannot be used between backhaul links.

Accordingly, the present disclosure proposes the following methods.

1. Method 1: Different slot formats may be applied to backhaul links connected to specific nodes (DgNB and RN).

For example, when RN1 is connected to the DgNB and RN2, a slot format applied to a DgNB-RN1 backhaul link may be different from a slot format applied to an RN1-RN2 backhaul link.

When RN1 is connected to RN2 and RN3, a slot format applied to an RN1-RN2 backhaul link may be different from a slot format applied to an RN1-RN3 backhaul link.

2. Method 2: Different slot formats may be applied to a backhaul link with respect to a scheduled node and a backhaul link with respect to a scheduling node.

For example, when node 1 schedules node 2 and node 2 schedules node 3, a slot format applied to a node 1-node 2 backhaul link may be different from a slot format applied to a node 2-node 3 backhaul link.

When node 1 schedules node 2 and node 2 schedules node 3 and node 4, a slot format applied to a node 1-node 2 backhaul link may be different from a slot format applied to a node 2-node 3 backhaul link and a node 2-node 4 backhaul link. In this case, the same slot format is applied to the node 2-node 3 backhaul link and the node 2-node 4 backhaul link.

Although not additionally illustrated, section A-1 may be described as divided stages as follows. In a case in which a donor base station (e.g., DgNB or DeNB) is connected to a first IAB node and the first IAB node is connected to the donor base station and a second IAB node, the first IAB node may need to perform transmission and/or reception of data to and/or from the donor base station and the second IAB node on backhaul links on the basis of different slot formats.

Here, cell-specific slot formats (e.g., slot formats that can be obtained through system information and the like) as well as UE-specific slot formats (e.g., slot formats that can be obtained through RRC signaling and the like) may be different slot formats.

A-2. Slot Format Between Access Link and Backhaul Link

Another node and a UE may be simultaneously associated with a specific node and thus the specific node can simultaneously have a backhaul link and an access link. In this case, the backhaul link and the access link can have the following relationship.

1. Method 1: The same slot format may be applied to a backhaul link and an access link connected to a specific node. This proposition can be used along with method 2 proposed in section A-1.

In the case of an RN1-RN2 backhaul link and an RN1-UE2 access link, for example, DL transmission to an RN1-RN2 backhaul link and DL transmission to an RN1-UE2 access link can be simultaneously performed because one node can perform simultaneous transmission or reception to or from multiple links.

On the other hand, UL reception from the RN1-RN2 backhaul link and DL transmission to the RN1-UE2 access link can be simultaneously performed.

2. Method 2: Different slot formats may be applied to a backhaul link and an access link connected to a specific node. This proposition can be used along with proposition 2 in section A-1.

When slot formats of NR are reused in access links, a slot format of access links is configured such that it starts with a downlink symbol and ends with an uplink symbol over one or a plurality of slots. In this case, a timing at which DL or UL is simultaneously performed between a plurality of access links is generated. Here, when DL or UL is simultaneously performed through the RN1-UE2 access link and the RN2-UE3 access link in FIG. 11, for example, RN1 and RN2 simultaneously perform transmission or reception. In this case, communication between RN1-RN2 backhauls is impossible and thus it is impossible that the RN1-UE2 access link and the RN1-RN2 backhaul link have the same slot format. Accordingly, slot formats applied to a backhaul link and an access link connected to a specific node can be differently configured.

Although not additionally illustrated, method 2 of section A-2 may be described as divided stages as follows. In a case in which a donor base station (e.g., DgNB or DeNB) is connected to an IAB node and the IAB node is connected to the donor base station and a UE, the IAB node can perform transmission and/or reception of data to and/or from the donor base station and the UE on a backhaul link and an access link on the basis of different slot formats.

Here, cell-specific slot formats (e.g., slot formats that can be obtained through system information and the like) as well as UE-specific slot formats (e.g., slot formats that can be obtained through RRC signaling and the like) may be different slot formats.

B. Slot Format Indication Method

Considering that slot formats may be different between backhaul links/access links, such slot formats may be determined in a centralized or distributed manner as follows. Links mentioned below mean a backhaul link and/or an access link.

Figure 12:
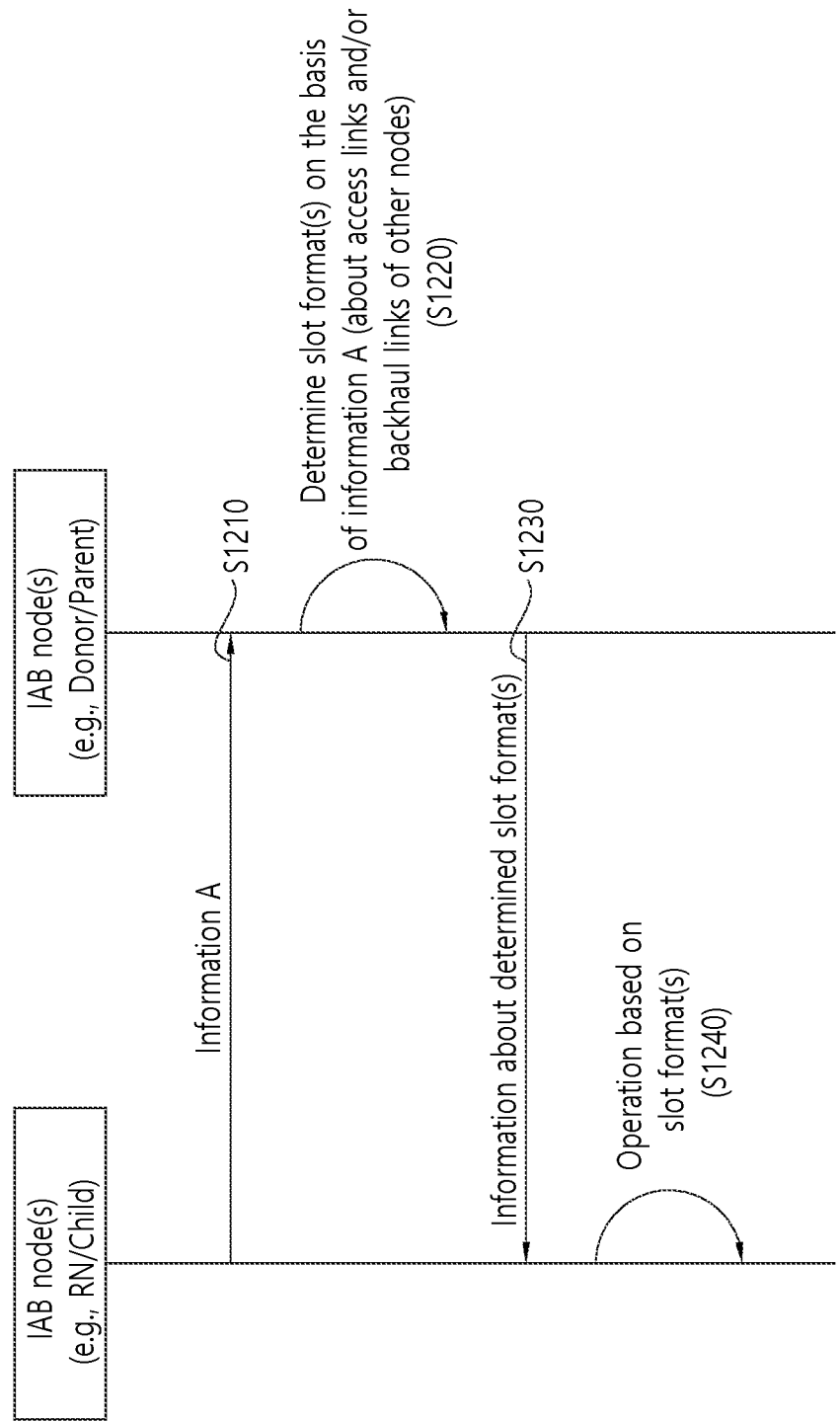
FIG. 12 illustrates an example of a slot format indication method.

FIG. 12 illustrates an example of a slot format indication method.

Although FIG. 12 is applicable to examples which will be described later, the present disclosure is not limited to FIG. 12.

Referring to FIG. 12, (RN/child) IAB node(s) can transmit information A to (donor/parent) IAB node(s) (S1210).

Thereafter, the (donor/parent) IAB node(s) can determine slot format(s) on the basis of information A (about access links and/or backhaul links of other node(s)) (S1220).

The (donor/parent) IAB node(s) can transmit information about the determined slot format(s) to the (RN/child) IAB node(s) (S1230).

Then, the (RN/child) IAB node(s) perform operations based on the slot format(s) (S1240).

B-1. Centralized Method

A specific DgNB can determine a slot format of each link under the DgNB and notify each link of the slot format.

To support this, each RN can provide the following information to the DgNB.

Information about a donor node of each RN

Information about a relay node for which each RN performs relay

Information about a neighboring node that interferes when each RN performs UL operation The corresponding information may be for each link because interferers may be different for links. For example, an interferer for an access link, an interferer for a donor-RN link and an interferer for an RN-relay node link may be different.

A measurement result through RSRP with respect to each neighboring node can be signaled.

Resource configuration for measurement between neighboring cells (e.g., CSI-RS configuration)

SR resource information or periodic uplink resource information (period & offset) configured for UE Periodic downlink resources (e.g., SSB period & offset) configured for UE Information about a UE may be configured by each RN according to determined SFI.

Backhaul links are necessary to transmit such information, and information may be transmitted at a predetermined timing or such timing may be set by a donor gNB.

Methods for signaling a slot format of each link by a DgNB will be described in detail as follows. Some of the methods which will be described below may be used together.

1. Method 1: The DgNB can broadcast slot format information of all links under the DgNB.

The ID of an RN and slot format information of a link scheduled by the corresponding RN can be signaled to all RNs under the DgNB. For example, the DgNB can broadcast information about {IDs of RNs, slot formats of backhaul links scheduled by the RNs, and slot formats of access links scheduled by the RNs} with respect to RN1 and RN2 in the environment as shown in FIG. 11. Alternatively, the DgNB can broadcast information of {IDs of the RNs and a slot format of links (access links & backhaul links) scheduled by the RNs} with respect to RN1 and RN2 in consideration of a case in which slot formats of access links and backhaul links are identical. Alternatively, the DgNB can broadcast information of {IDs of the RNs and a slot format of backhaul links scheduled by the RNs} with respect to RN1 and RN2 in consideration of a case in which slot formats of access links under the DgNB are identical.

2. Method 2: The DgNB can signal a slot format of each link in a unicast manner.

3. Method 3: To signal a slot format of each link by the DgNB, only information of nodes under each node may be transmitted.

B-2. Distributed Method

Each RN can determine a slot format of a link under the RN and signal the slot format.

To support this, each RN can provide the following information to a donor NB (gNB or RN).

Information about a neighbor node that interferes when each RN performs UL operation The corresponding information may be for each link because interferers may be different for links. For example, an interferer for an access link, an interferer for a donor-RN link and an interferer for an RN-relay node link may be different.

A measurement result through RSRP with respect to each neighboring node can be signaled.

Resource configuration for measurement between neighboring cells (e.g., CSI-RS configuration)

SR resource information or periodic uplink resource information (period & offset) configured for UE Periodic downlink resources (e.g., SSB period & offset) configured for UE Information about a UE may be configured by each RN according to determined SFI.

Backhaul links are necessary to transmit such information, and information may be transmitted at a predetermined timing or such timing may be set by a donor gNB.

Alternatively, when SFI for an access link differs from that of the donor, SFI information can be transmitted. The corresponding SFI can be limited to semi-statically configured SFI.

The aforementioned slot format determination method may be different for a backhaul link and an access link. For example, although a backhaul link is configured on the basis of SFI for backhaul links of the donor NB (refer to section C), it can be assumed that the same SFI as that of the donor NB is applied as SFI of access links.

The slot format of each link determined in this manner can be semi-statically transmitted through system information (SI) or RRC or dynamically transmitted through UE/node group-common DCI, UE/node-specific DCI or the like.

The centralized method and/or the distributed method can be used for the semi-static slot format determination method and the distributed method can be used for the dynamic slot format determination method.

C. Slot Format Determination Method A

In this section, more specifically, methods for determining, by a DgNB or each RN, slot formats of a backhaul and/or an access link thereof are proposed.

Methods proposed in this section may be applied only to the semi-static determination method.

In the present disclosure, D refers to downlink, U refers to uplink and X refers to a flexible link direction for which a transmission direction is not determined. Here, X may refer to a state in which the corresponding link is not used and cannot be used for transmission.

C-1. Determination Method A-0

To determine slot formats of a backhaul link and/or an access link of a DgNB or each RN, the following rules can be established.

For a specific node, slot formats of a backhaul link and an access link of the node are identical. That is, method 1 of section A-2 is applicable.

Here, for a specific node, a slot format of backhaul/access links of the corresponding node can be determined using slot format information of backhaul/access links of a previous node (i.e., a node that schedules the specific node).

Here, the present disclosure proposes methods for determining a slot format such that the following conditions are satisfied. Slot format determination conditions may include some or all of the following conditions.

1. Condition 1: A link direction of a specific node is determined such that it becomes the opposite direction of a link direction of a previous node for a specific timing. Here, flexible link directions or states in which transmission is not performed can be opposite directions of all link directions.

That is, the link direction of the next node according to the link direction of the previous node can be as shown in Table 5.

TABLE 5

| Link direction of previous node | Link direction of next node |
| --- | --- |
| D | U or X |
| U | D or X |
| X | D or U or X |

2. Condition 2: A link direction is determined such that it changes in the order of D, X and U over time. This includes appearance of the link direction in the order of X, U and D and U, D and X. That is, symbols with D appear for a specific duration, symbols with X appear for a specific duration, and then symbols with U appear for a specific duration. After the symbol duration with U, the symbol duration with D appears again.

3. Condition 3: It is determined that one node does not simultaneously receive a UL signal from another node or a UE while receiving a DL signal from another node. That is, when the backhaul link of a previous node is D for a specific node, a backhaul/access link of the corresponding node cannot be U state.

This is because "uplink transmission to backhaul/access links scheduled by a specific node" and "downlink scheduling transmission to a backhaul link through which the corresponding node is scheduled" cannot be multiplexed through coordination without interference because scheduling nodes are different.

In the case of condition 3, when interference can be reduced through coordination (e.g., FDM or SDM) between the donor NB and an interfering NB, restriction is not necessary. More specifically, this may mean that, when one node receives a signal from another node, another node or a UE which applies interference thereto is caused not to perform reception. Furthermore, when an interfering node/UE can reduce interference through scheduling of the corresponding NB, it may not be treated as an interferer.

When the aforementioned conditions are combined, the link direction of node 2 which is available in response to the link direction of node 1 may be as follows when node 1 schedules node 2, which will be described with reference to the drawings.

Figure 13:
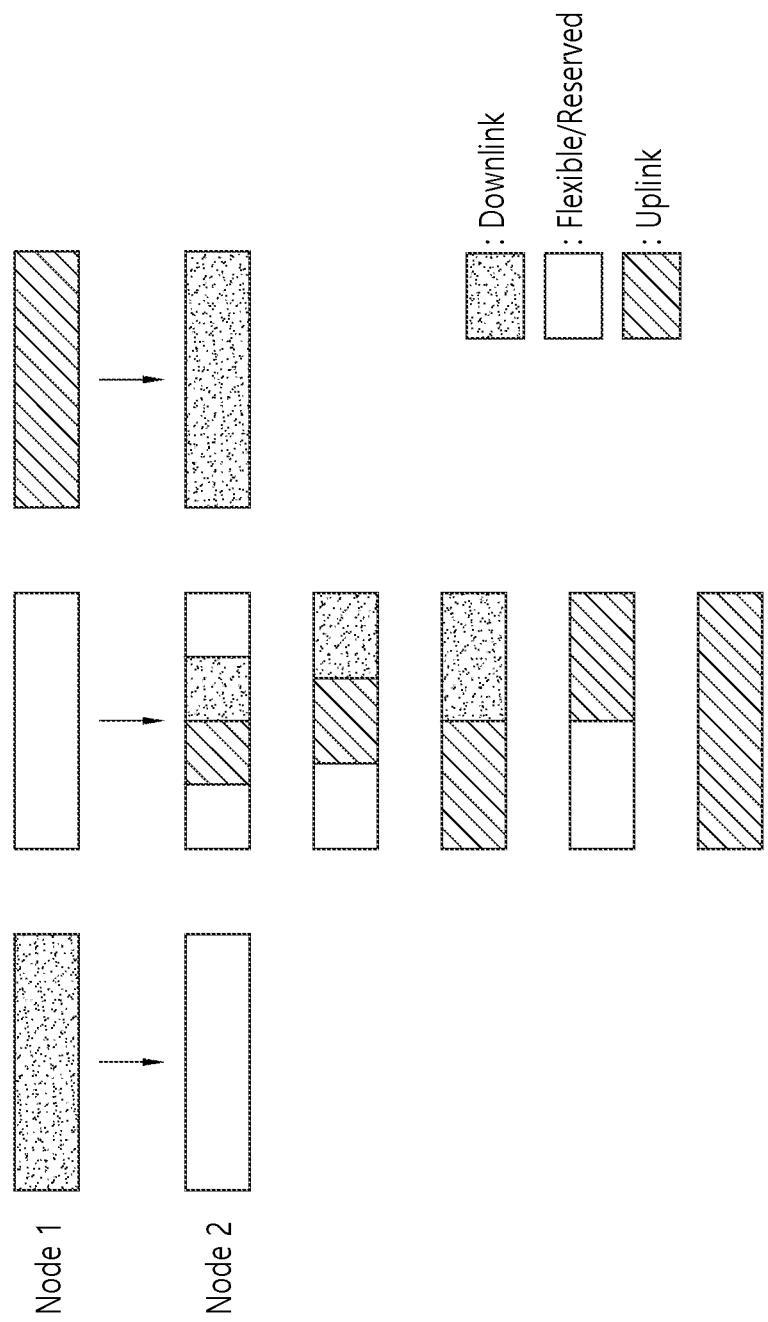
FIG. 13 schematically illustrates an example of the link direction of node 2 which is available in response to the link direction of node 1.

FIG. 13 schematically illustrates an example of the link direction of node 2 which is available in response to the link direction of node 1.

The link direction of node 2 is X in a period in which the link direction of node 1 is D.

The link direction of node 2 can be determined as one of the following five options in a period in which the link direction of node 1 is X.

1. Option (a): A period in which the link direction is X, a period in which the link direction is U, a period in which the link direction is D and a period in which the link direction is X can sequentially appear. Here, the weight of each period may be fixed or determined by a node (e.g., node 2) that determines slot formats.

2. Option (b): A period in which the link direction is X, a period in which the link direction is U and a period in which the link direction is D can sequentially appear. Here, the weight of each period may be fixed or determined by a node (e.g., node 2) that determines slot formats.

3. Option (c): A period in which the link direction is U and a period in which the link direction is D can sequentially appear. Here, the weight of each period may be fixed or determined by a node (e.g., node 2) that determines slot formats.

4. Option (d): A period in which the link direction is X and a period in which the link direction is U can sequentially appear. Here, the weight of each period may be fixed or determined by a node (e.g., node 2) that determines slot formats.

5. Option (e): The link direction becomes U.

The link direction of node 2 can be determined as one of the three options in a period in which the link direction of node 1 is U.

1. Option (1): The link direction becomes D.

2. Option (2): A period in which the link direction is D and a period in which the link direction is X can sequentially appear. Here, the weight of each period may be fixed or determined by a node (e.g., node 2) that determines slot formats.

3. Option (3): The link direction becomes X.

Here, the link direction configuration of node 2 in response to the link direction of node 1 can be selected from the aforementioned options such that condition 2 is satisfied (i.e., the link direction changes in the order of D, X and U over time).

To reduce the number of options, the link direction of node 2 which is available in response to the link direction of node 1 may be limited to only some of the aforementioned options.

C-2. Determination Method A-1

Figure 14:
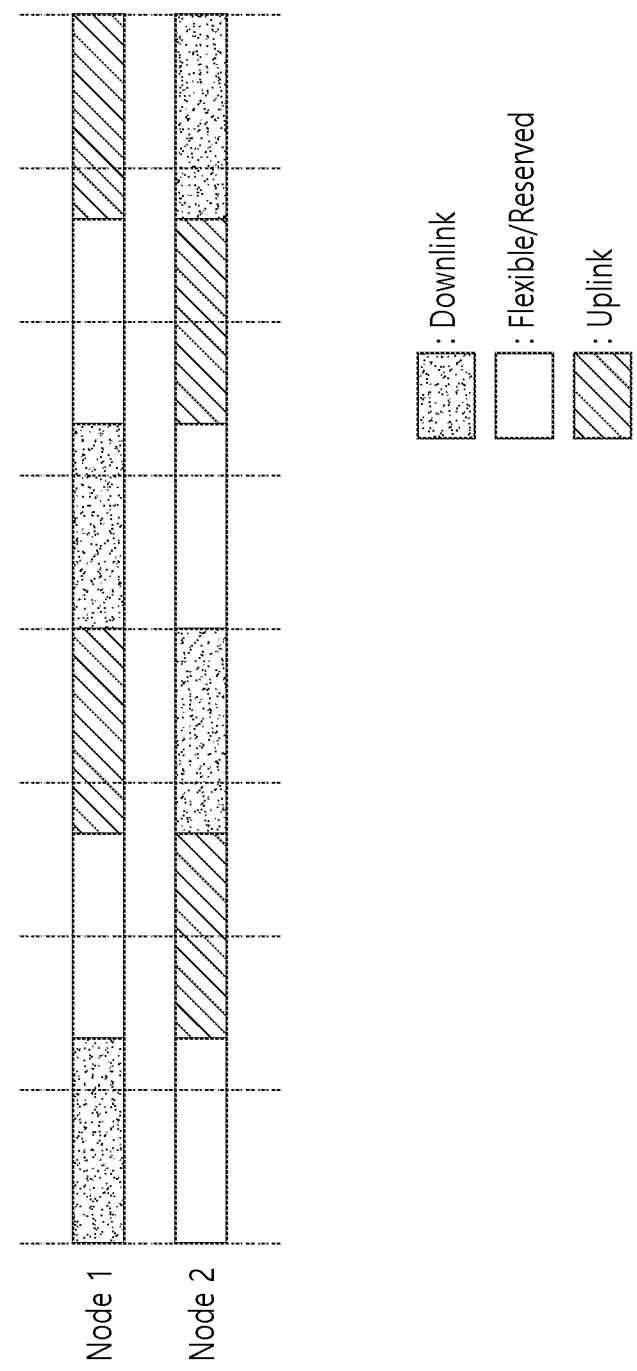
FIG. 14 schematically illustrates another example of the link direction of node 2 which is available in response to the link direction of node 1.

FIG. 14 schematically illustrates another example of the link direction of node 2 which is available in response to the link direction of node 1.

In addition to the above-described determination method A-0, in order to determine a slot format more simply, the link direction of node 2 is X if the link direction of node 1 is D, U if the link direction of node 1 is X and D if the link direction of node 1 is U when node 1 schedules node 2. An example of this method is illustrated in FIG. 14.

C-3. Determination Method A-2

Figure 15:
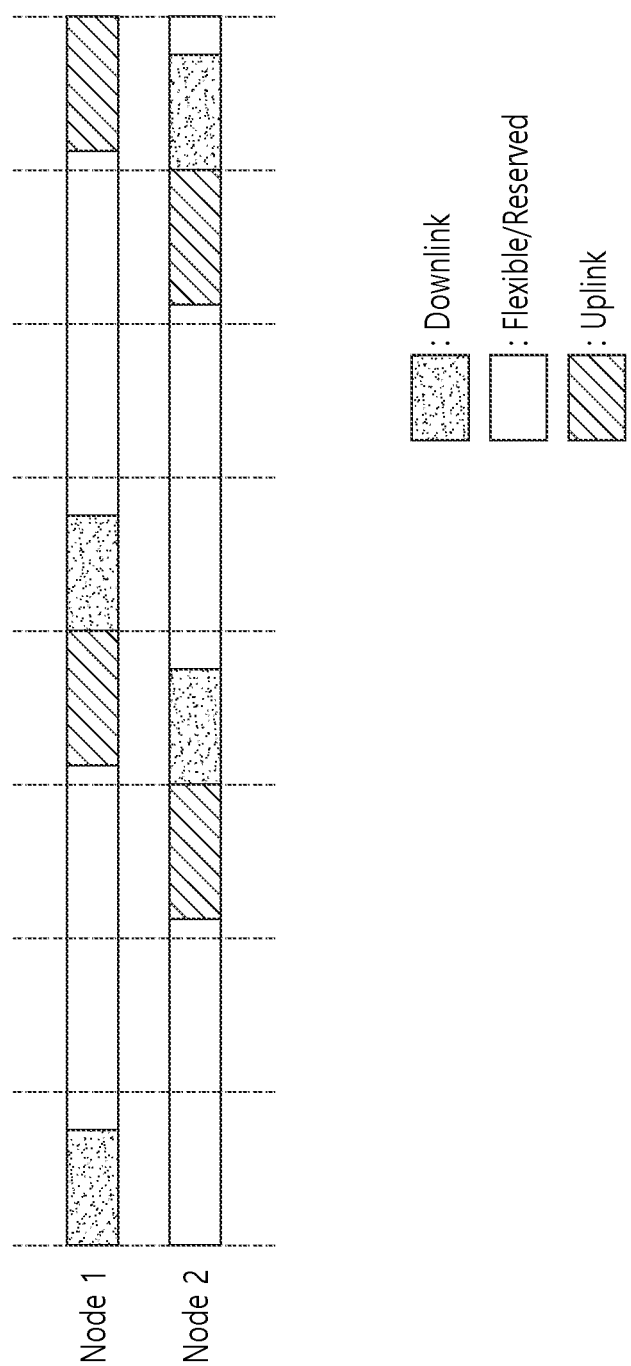
FIG. 15 schematically illustrates another example of the link direction of node 2 which is available in response to the link direction of node 1.

FIG. 15 schematically illustrates another example of the link direction of node 2 which is available in response to the link direction of node 1.

In addition to the above-described determination method A-0, slot formats can be determined such that the weights of D, U and X are identical between the slot format of node 1 and the slot format of node 2 when node 1 schedules node 2. That is, the durations of D, U and X can be identical for the slot format of node 1 and the slot format of node 2. An example thereof is illustrated in FIG. 15.

Here, if the duration of the X period is shorter than the duration of the U period, slot formats cannot be determined such that the weights of D, U and X are identical between the slot format of node 1 and the slot format of node 2. Accordingly, to apply this method, a restriction that the duration of the X period needs to be longer than the duration of D and U periods is necessary.

C-4. Determination Method A-3

Figure 16:
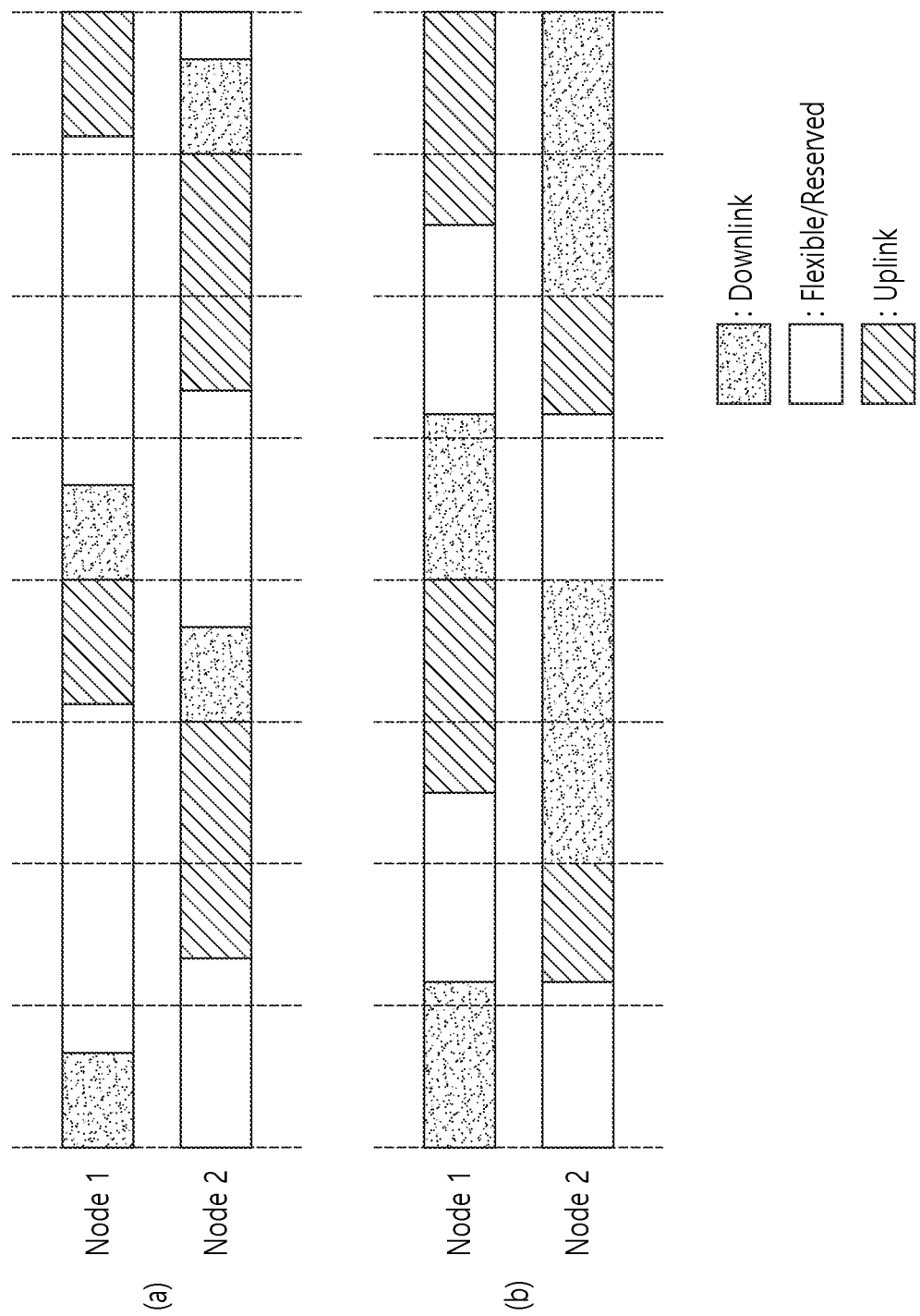
FIG. 16 schematically illustrates another example of the link direction of node 2 which is available in response to the link direction of node 1.

FIG. 16 schematically illustrates another example of the link direction of node 2 which is available in response to the link direction of node 1.

In addition to the above-described determination method A-0, considering that a downlink period starts at a slot starting point all the time and an uplink period ends at a slot end point when the slot format of current NR is configured in the order of D, X and U, slot formats can be determined such that a downlink period starts at a slot starting point all the time and an uplink period ends at a slot end point. That is, slot formats can be determined such that a timing at which U switches to D is positioned at a slot boundary.

Two examples of this method are respectively illustrated in (a) and (b) of FIG. 16. In the figure, dotted lines indicate slot boundaries. When node 1 schedules node 2, slot formats are determined according to determination method A such that a timing at which U switches to D is positioned at a slot boundary.

C-4. Slot Format Indication Method

When slot formats have been determined using the above-described slot format determination methods, the slot formats can be signaled through the following methods.

1. Method 1: A slot format indication method according to the existing NR specifications can be reused.

2. Method 2: This method can be used when the weights of D, U and X are identical between slot formats of nodes as in determination method A-2. For a specific node, an offset value of the slot format used in the corresponding node is signaled on the basis of the slot format of a reference node. Here, the reference node may be a node that schedules a DgNB or the corresponding node. For example, when a D period starting point of the slot format of the specific node is separated from a D period starting point of the slot format of the reference node by SF_offset symbol(s)/slot(s)/msec, the slot format used in the corresponding node can be indicated by signaling an SF_offset value.

Figure 17:
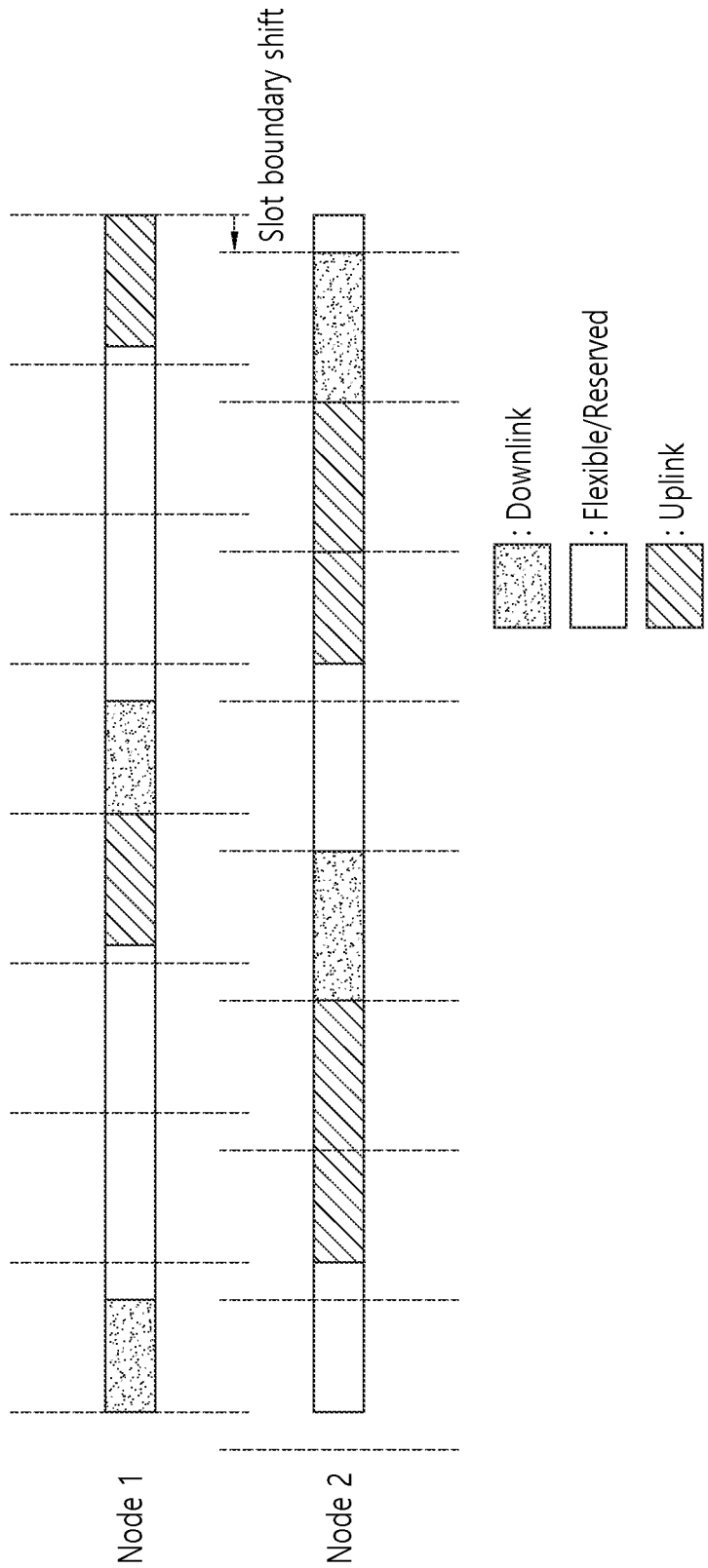
FIG. 17 schematically illustrates another example of the link direction of node 2 which is available in response to the link direction of node 1.

FIG. 17 schematically illustrates another example of the link direction of node 2 which is available in response to the link direction of node 1.

Additionally, to cause a timing at which U switches to D is positioned at a slot boundary all the time in a slot format, synchronization can be modified such that a starting point of a slot boundary of a specific node and/or a timing at which system frame number (SFN)=0 correspond to a timing at which the slot format of the corresponding node switches from U to D. For example, when node 1 schedules node 2, the slot format of node 2 is determined as illustrated in FIG. 17 and slot boundaries used by links of node 2 can be shifted such that a D period starting point is positioned at a slot boundary. Additionally, system frame boundaries used by the links of node 2 can be shifted such that a D period starting point is positioned at a system frame boundary.

When such a method is applied, it can be assumed that the slot format of the reference node is applied to all nodes without signaling slot formats when the weights of D, U and X are identical between slot formats of nodes as in determination method A-2.

D. Slot Format Determination Method B

In this section, more specifically, other methods for determining slot formats of backhaul and/or access links by a DgNB or each RN are proposed.

Specifically, methods proposed in this section may be applied only to semi-static determination methods.

In the present disclosure, D represents downlink, U represents uplink, and X represents a flexible link direction in which a transmission direction is not determined. Here, X may mean a reserved state in which transmission cannot be performed.

D-1. Determination Method B-0

To determine slot formats of backhaul and/or access links of a node, the following rules can be established.

For a specific node, slot formats of a backhaul link and an access link of the corresponding node may be different. That is, method 2 of section A-2 can be applied.

Slot formats of access links conform to the legacy technique of NR. That is, a link direction repeatedly appears in the order of D, X and U, and a D starting point and a U end point are positioned at slot boundaries.

Here, for a specific node, a slot format of a backhaul link of the corresponding node can be determined in consideration of the slot format of a backhaul link of a node that schedules the corresponding node, slot format information of an access link of the corresponding node, and slot format information of access links of node(s) scheduled by the corresponding node. Here, when the corresponding node is a DgNB, the slot format of a backhaul link of a node that schedules the corresponding node is not considered.

Considering this case, slot formats are determined such that the following conditions are satisfied. Slot format determination conditions may include all or some of the following conditions.

1. Condition 1: A link direction of a specific node is determined such that it becomes the opposite direction of a link direction of a previous node for a specific timing. Here, flexible link directions or states in which transmission is not performed can be opposite directions of all link directions. That is, the link direction of the next node according to the link direction of the previous node can be as shown in Table 4-1.

2. Condition 2: It is determined that one node does not simultaneously receive a UL signal from another node or a UE while receiving a DL signal from another node. That is, when the backhaul link of a previous node is D for a specific node, a backhaul/access link of the corresponding node cannot be U state. This is because "uplink transmission to backhaul/access links scheduled by a specific node" and "downlink scheduling transmission to a backhaul link through which the corresponding node is scheduled" cannot be multiplexed through coordination without interference because scheduling nodes are different.

In the case of condition 2, when interference can be reduced through coordination (e.g., FDM or SDM) between a donor NB and an interfering NB, restriction is not necessary. More specifically, this may mean that, when one node receives a signal from another node, another node or a UE which applies interference thereto is caused not to perform reception. Furthermore, when an interfering node/UE can reduce interference through scheduling of the corresponding NB, it may not be treated as an interferer.

Figure 18:
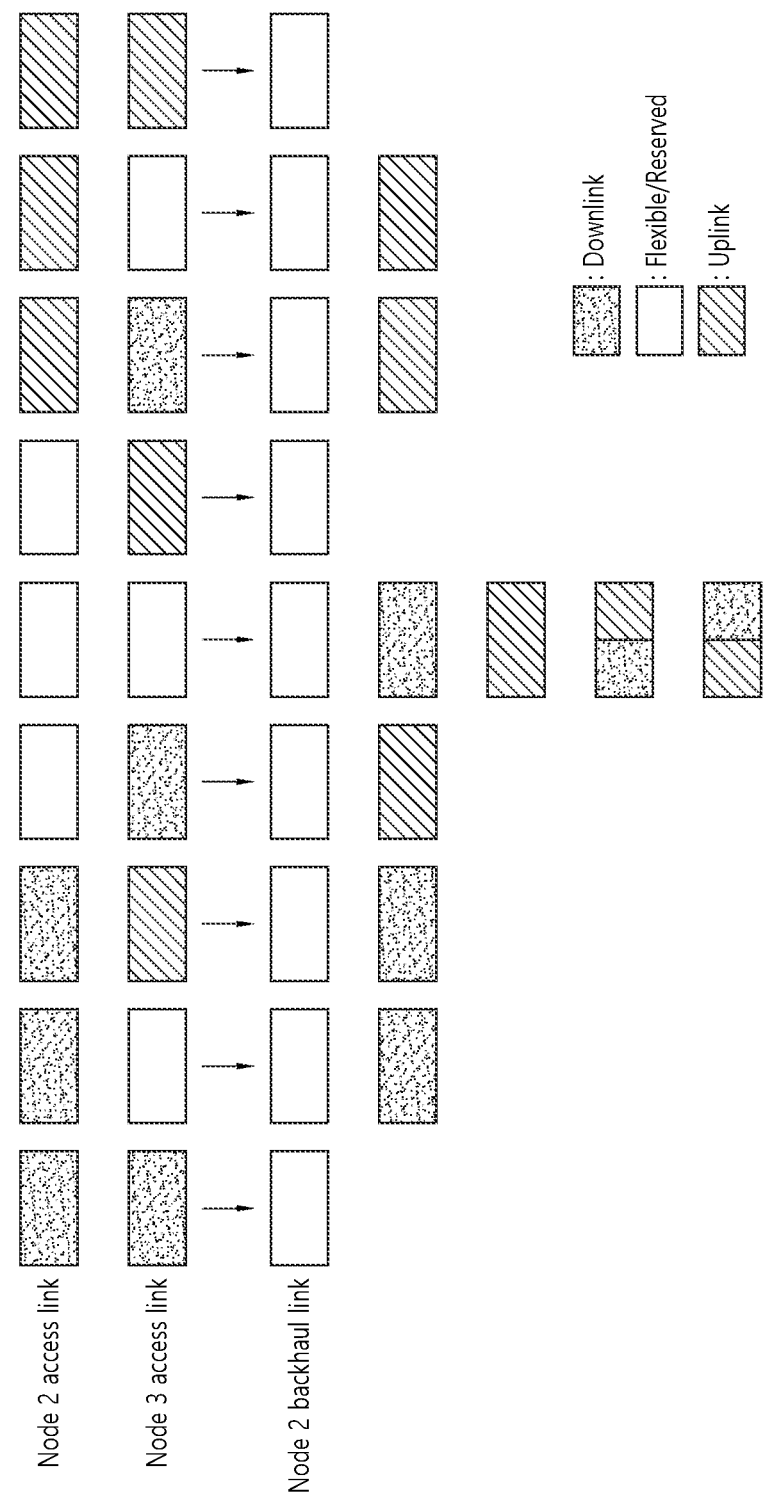
FIG. 18 schematically illustrates an example of a backhaul link direction of node 2 according to an access link direction of node 2 and an access link direction of node 3.

FIG. 18 schematically illustrates an example of a backhaul link direction of node 2 according to an access link direction of node 2 and an access link direction of node 3.

For example, when the aforementioned conditions are combined, the backhaul link direction of node 2 according to the access link direction of node 2 and the access link direction of node 3 may be as follows when node 1 schedules node 2 and node 2 schedules node 2.

The backhaul link direction of node 2 is X in a period in which the access link direction of node 2 is D and the access link direction of node 3 is D.

The backhaul link direction of node 2 can be determined as one of the following options in a period in which the access link direction of node 2 is D and the access link direction of node 3 is X.

1. Option (a): It is X.
2. Option (b): It is D. Here, being X includes being D in the entire period or presence of X at the start and/or end of the period.

The backhaul link direction of node 2 can be determined as one of the following options in a period in which the access link direction of node 2 is D and the access link direction of node 3 is U.

1. Option (a): It is X.
2. Option (b): It is D. Here, being X includes being D in the entire period or presence of X at the start and/or end of the period.

The backhaul link direction of node 2 can be determined as one of the following options in a period in which the access link direction of node 2 is X and the access link direction of node 3 is D.

1. Option (a): It is X.
2. Option (b): It is U. Here, being U includes being U in the entire period or presence of X at the start and/or end of the period.

The backhaul link direction of node 2 can be determined as one of the following options in a period in which the access link direction of node 2 is X and the access link direction of node 3 is X.

1. Option (a): It is X.
2. Option (b): It is D. Here, being D includes being D in the entire period or presence of X at the start and/or end of the period.
3. Option (c): It is U. Here, being U includes being U in the entire period or presence of X at the start and/or end of the period.
4. Option (d): AD period and a U period can sequentially appear. This includes presence of X at the start of the D period. Further, this includes presence of X at the end of the U period. Additionally, X may be present between the D period and the U period.
5. Option (e): AU period and a D period can sequentially appear. This includes presence of X at the start of the U period. Further, this includes presence of X at the end of the D period. Additionally, X may be present between the U period and the D period.

The backhaul link direction of node 2 is X in a period in which the access link direction of node 2 is X and the access link direction of node 3 is U.

The backhaul link direction of node 2 can be determined as one of the following options in a period in which the access link direction of node 2 is U and the access link direction of node 3 is D.

1. Option (a): It is X.
2. Option (b): It is U. Here, being U includes being U in the entire period or presence of X at the start and/or end of the period.

The backhaul link direction of node 2 can be determined as one of the following options in a period in which the access link direction of node 2 is U and the access link direction of node 3 is X.

1. Option (a): It is X.
2. Option (b): It is U. Here, being U includes being U in the entire period or presence of X at the start and/or end of the period.

The backhaul link direction of node 2 is X in a period in which the access link direction of node 2 is U and the access link direction of node 3 is U.

Additionally, one of the aforementioned options can be selected in consideration of a backhaul link direction of node 1 and the aforementioned conditions 1 and 2.

To further reduce the number of options, the access link direction of node 3 which is available in response to the access link direction of node 2 may be limited to only some of the aforementioned options.

Figure 19:
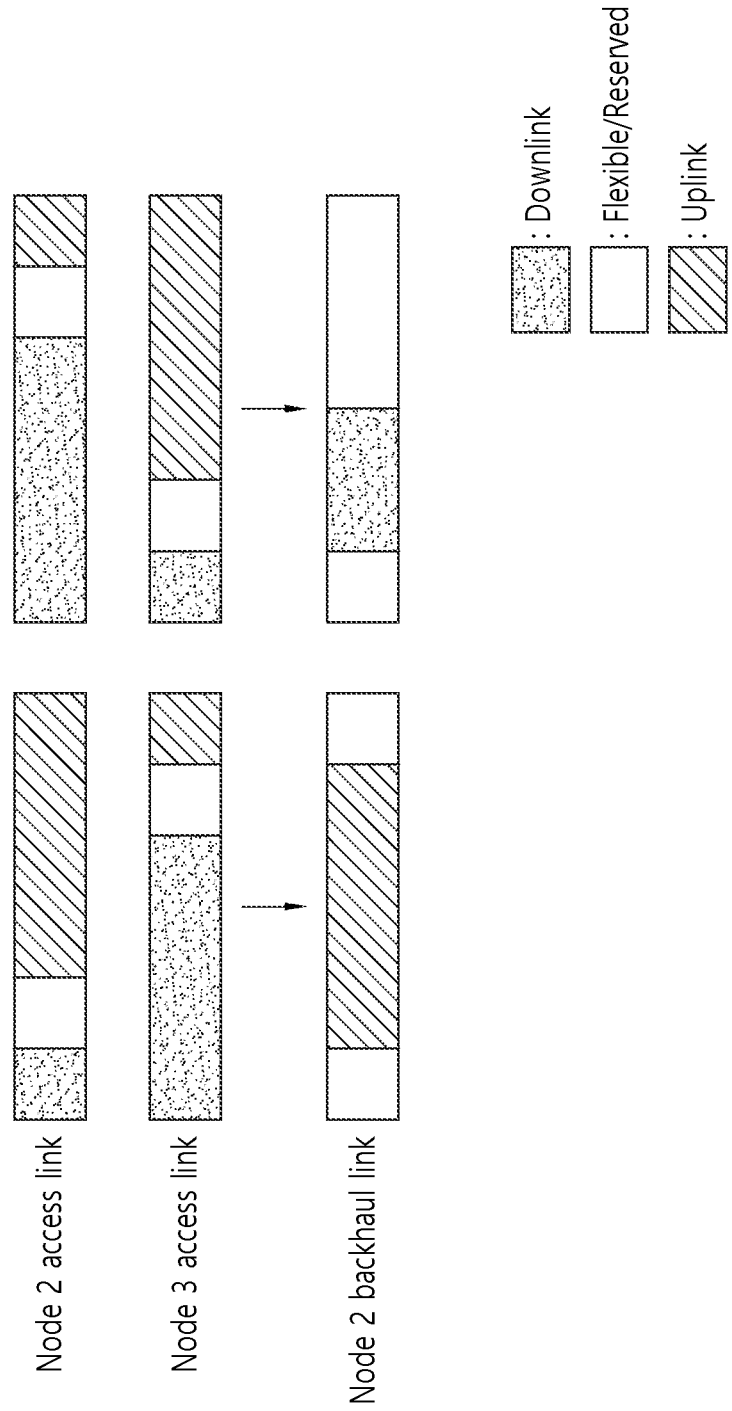
FIG. 19 schematically illustrates another example of a backhaul link direction of node 2 according to an access link direction of node 2 and an access link direction of node 3.

FIG. 19 schematically illustrates another example of a backhaul link direction of node 2 according to an access link direction of node 2 and an access link direction of node 3.

For example, slot formats may be configured such that all of D, X and U periods are present in a backhaul link of node 2 during a slot period of an access link configured in the order of D, X and U, for example.

In this case, if the access link slot format of node 2 and the slot format of node 3 are configured such that X periods do not overlap as illustrated in FIG. 19, all of D, X and U cannot be present in the backhaul link of node 2.

Accordingly, to configure slot formats such that all of D, X and U periods are present in the backhaul link of node 2, presence of the following restrictions in a slot format of access links available in an IAB environment is proposed.

1. Method 1. A slot format is configured such that X periods of access links under the same DgNB overlap in time.

2. Method 2. When node A and node B area scheduled, a slot format is configured such that X periods of an access link of node A and an access link of node B overlap in time.

An example of configuring a slot format of a backhaul link according to an access link slot format when a slot format is configured such that X periods of access links of nodes under the same DgNB or connected nodes overlap in time, as described above, is illustrated in FIG. 20. It is assumed that nodes and links are configured as illustrated in FIG. 11.

Figure 20:
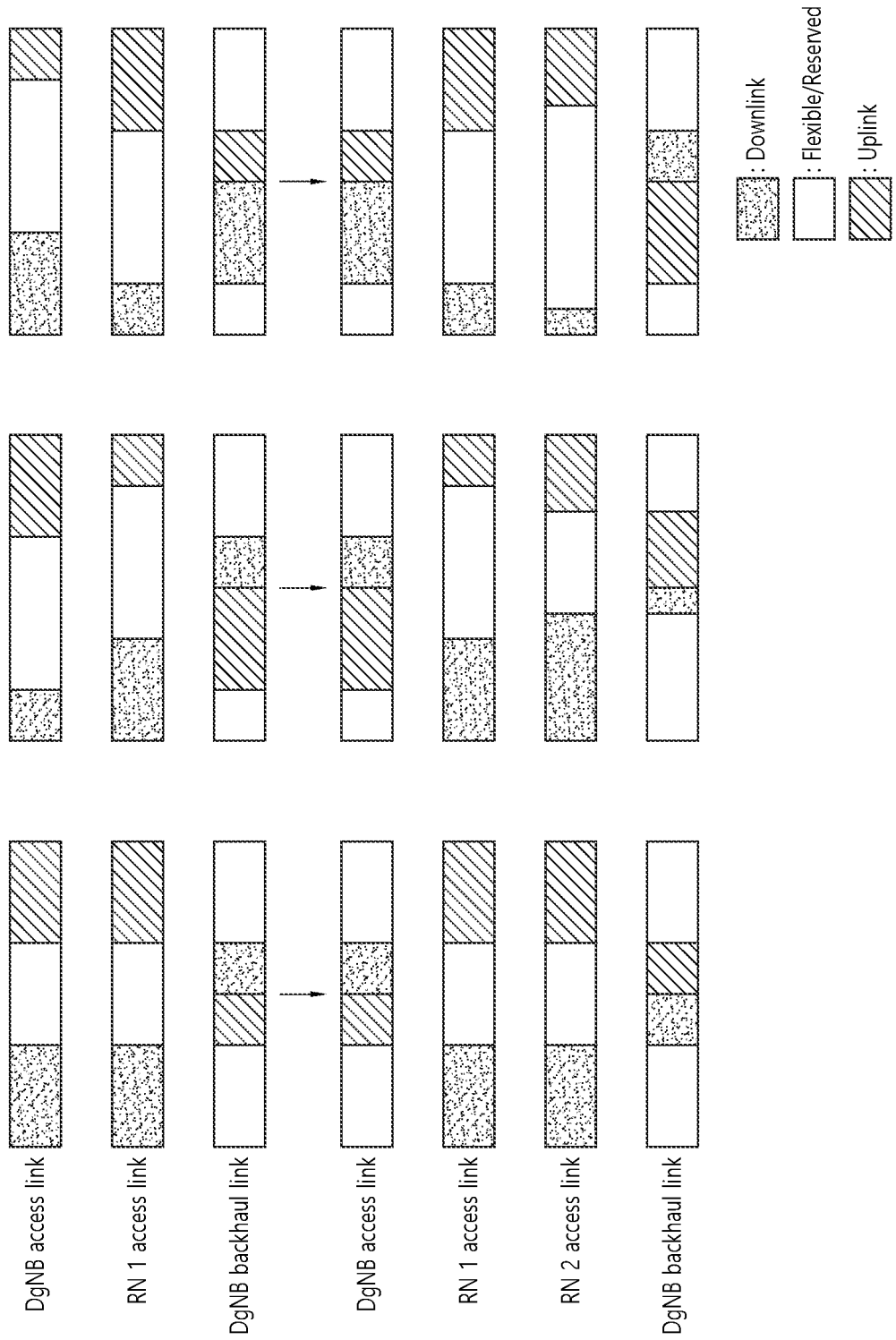
FIG. 20 schematically illustrates an example of a slot format of a backhaul link according to an access link slot format.

FIG. 20 schematically illustrates an example of a slot format of a backhaul link according to an access link slot format.

Here, a backhaul link slot format of a DgNB can be determined according to the access link slot format of the DgNB and the access link slot format of RN1. Here, the backhaul link slot format can be configured in the order of X, U, D and X or in the order of X, D, U and X according to configuration of access links. Here, an X period may be present between a U period and a D period or between a D period and a U period.

When the backhaul link slot format of the DgNB is determined, the backhaul link slot format of RN1 can be determined according to the backhaul link slot format of the DgNB, an access link slot format of RN1, and an access link slot format of RN2. In this case, considering the backhaul link direction of the DgNB, the backhaul link direction of RN1 can be the opposite direction of the backhaul link direction of the DgNB. That is, the backhaul link slot format of RN1 can be configured in the order of X, D, U and X when the backhaul link slot format of the DgNB is configured in the order of X, U, D and X, and the backhaul link slot format of RN1 can be configured in the order of X, U, D and X when the backhaul link slot format of the DgNB is configured in the order of X, D, U and X. In addition, the access link direction of RN2 may be mapped to U or D for D or U, or resources of D and U may be unused.

That is, when node A schedules node B, slot format configurations of a backhaul link of node A and a backhaul link of node B may have the following relationship.

A backhaul link slot format of node B is configured in the order of X, D, U and X when a backhaul link slot format of node A is configured in the order of X, U, D and X, and the backhaul link slot format of node B is configured in the order of X, U, D and X when the backhaul link slot format of node A is configured in the order of X, D, U and X.

That is, for XUDX of the backhaul link configured by node A, node B determines XDUX. In addition, a node additionally determines a resource to be configured as D or U among Xs thereof in consideration of SFI of an access link of a relay node thereof.

Here, the present proposition includes presence of an X period between a U period and a D period or between a D period and a U period.

D-2. Determination Method B-1

Figure 21:
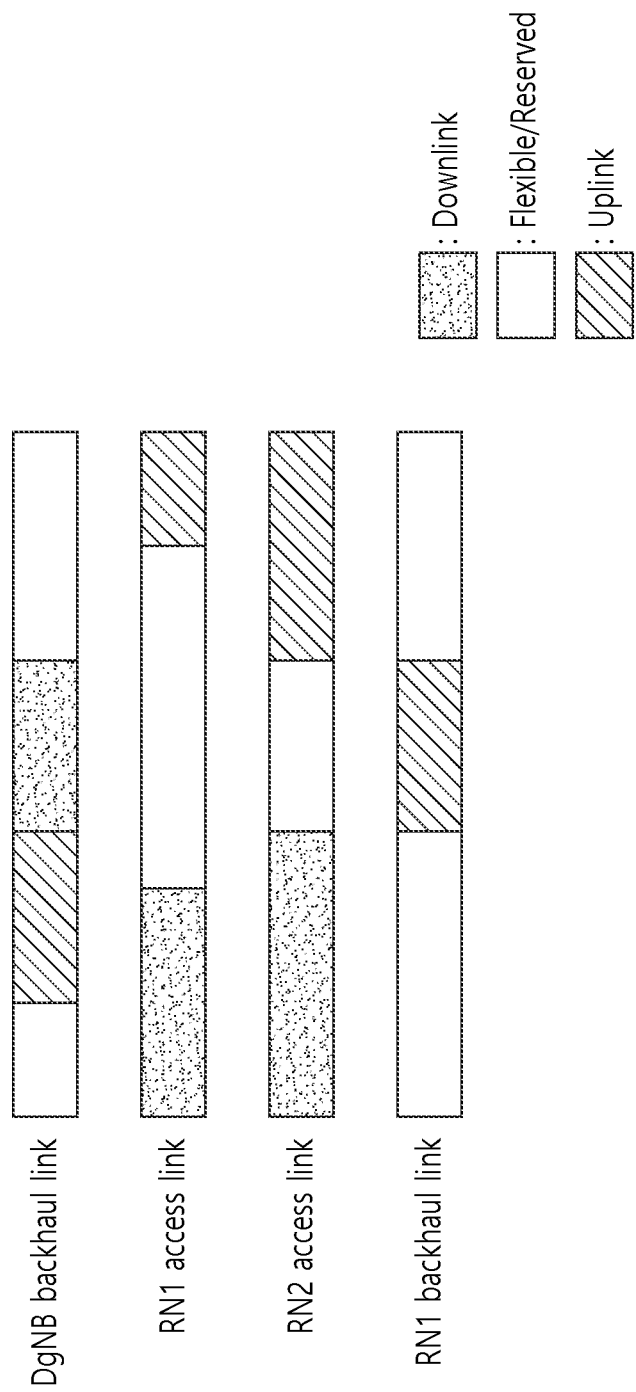
FIG. 21 schematically illustrates another example of configuring a backhaul link slot format according to an access link slot format.

FIG. 21 schematically illustrates another example of configuring a backhaul link slot format according to an access link slot format.

Referring to FIG. 21, a situation in which both D and U are not present according to situation may occur.

Referring to FIG. 20, a period in which the backhaul link of RN1 can be D or U is limited to a period in which both the access link of RN1 and the access link of RN2 are X. In addition, a situation in which both D and U are not present according to situation may occur as in the example of FIG. 21.

Accordingly, to prevent this situation and to cause D and U to be present in a backhaul link all the time, the following methods are proposed.

Slot formats of access links under the same DgNB are configured to be identical.

When access links under the same DgNB have the same slot format, a slot format can be determined such that D and U of a backhaul link are present only in a period in which an access link is X as in the example of (a) of FIG. 20.

Referring to this, the present disclosure proposes a method of determining a backhaul link slot format as follows.

A backhaul link is X in a period in which access links under the same DgNB are D or U.

A backhaul link has D and U periods in the order of D and U or U and D in a period in which access links under the same DgNB are X. Here, an X period may be included before and/or after the D and U periods. Alternatively, a backhaul link has only a D period and only a U period in a period in which access links under the same DgNB are X.

When node A schedules node B, a backhaul link of node B has U in a period in which a backhaul link of node A is D and has D in a period in which the backhaul link of node A is U.

D-3. Determination Method C (1) A tree structure of RN nodes single-hop or multi-hop forwarding from each donor gNB is generated. For example, a tree of DgNB-RN1-RN2 may be configured in FIG. 11. When a donor is D and a relay node is R for each backhaul link, it is assumed that SFI is configured according to the following rules.

(2) It is assumed that a semi-static SFI format of a donor gNB is commonly used for RN nodes belonging to a tree based on the corresponding node. This SFI format may be preset or transmitted through backhaul signaling.

(3) It is assumed that a semi-static SFI DL/UL configuration period is P. Here, it is assumed that a downlink symbol is M1, an uplink symbol is M2, and an unknown symbol is P*14-M1-M2.

(4) In determination of backhaul SFI of the donor gNB,

A. Alt 1: D of an access link of node A is used as D of a backhaul link, and U of the access link is used as U of the backhaul link. D or U of the backhaul link may be additionally determined from among Xs. More generally, this method is to multiplex the access link and the backhaul link through FDM/SDM and to perform TDM of backhauls in resources allocated to the backhaul link.

B. Alt 2: D of the access link of node A cannot be used as the backhaul link and U of the access link cannot be used as the backhaul link. D or U of the backhaul link can be additionally determined from among Xs. Here, a resource that cannot be used as the backhaul link is represented as A (unavailable). More generally, this method is to multiplex the access link and the backhaul link through TDM and to perform TDM of backhauls in resources allocated to the backhaul link.

C. In addition, FDM/SDM/TDM can be combined between backhaul/access links, but the disclosure focuses on the above-described two methods. More generally, each backhaul link and an interference link may be generated in consideration of FDM/SDM and TDM may be performed between interfering nodes. For example, when UE1-RN1 is interference and UE2-RN2 is an interference link in FIG. 13, the access link of the donor gNB and the backhaul link of RN1 are D/U and thus cannot collide. Accordingly, in this case, Alt 2 needs to be assumed.

D. Here, a method of using D or U as a backhaul link in SFI of the relay node can also consider Alt 1/Alt 2. More specifically, Alt. 1/2 in which D/U of an access link of a node and an access link of a relay node can be used as a backhaul link may be assumed to be aligned or may be selected according to an interference level.

(5) Determination of backhaul SFI of RN node,

A. According to SFI of a donor gNB or a donor NB of the RN node, i. Alt 1: All directions of backhaul links of the donor NB are aligned.

1. Backhaul D is configured as backhaul U.
2. Backhaul U is configured as backhaul D.
3. When additional D/U assignment to an access link of the RN node among backhaul A (unavailable) is required, it is performed.
4. An additional backhaul link of the RN node is determined for backhaul A or X resources. This can be obtained according to two methods of (4).

ii. Alt 2: Some directions of backhaul links of the donor NB are aligned.

1. Some backhaul Ds are configured as backhaul U.
2. Some backhaul Us are configured as backhaul D.
3. When additional D/U assignment to an access link of the RN node among backhaul A (unavailable) is required, it is performed.
4. When additional D/U assignment to a backhaul link of the RN node among Xs in backhaul SFI of the donor NB is required, it is performed.
5. An additional backhaul link of the RN node is determined for backhaul A or X resources. This can be obtained through two methods of (4).

B. The corresponding backhaul SFI is transmitted to the relay/donor node of the RN node.

After determination of the semi-static SFI in this manner, backhaul D can be used as D (or U) of the access link when there is no data transmission to the RN node for the backhaul link. In addition, where there is no data transmission to the RN node (for example, a control channel is read to check backhaul data), backhaul U can be switched to D (or to U of the access link) and used. In this case, a UE of another RN node may be interfered, and thus usage change is performed using CLI handling (e.g., power reduction).

Downlink and uplink timing can be determined using a semi-statically configured slot format in new RAT. A flexible region can be defined as a slot format available for uplink or downlink according to dynamic instruction. For resource coordination, semi-static resource coordination between links can be considered first on the basis of semi-static SFI of access and backhaul links.

Here, the following terms can be defined.

Node A backhaul link: A backhaul link scheduled by node A

Node A access link: An access link scheduled by node A

According to the above definition, a backhaul link between a DgNB and RN1 corresponds to a DgNB backhaul link. In addition, a backhaul link between RN1 and RN2 corresponds to an RN1 backhaul link.

Here, to determine a slot format from the viewpoint of a relay node, the following consideration may be necessary.

(1) When a relay node access link is downlink, a relay node backhaul link may be downlink (D) or unused (N).

(2) When the relay node access link is uplink, the relay node backhaul link may be uplink (U) or unused (N).

(3) when the relay node access link is flexible, resources can be allocated as downlink or uplink resources for the relay node backhaul link.

(4) When a donor backhaul uplink is downlink, the relay node backhaul link may be uplink, and the opposite is possible.

Figure 22:
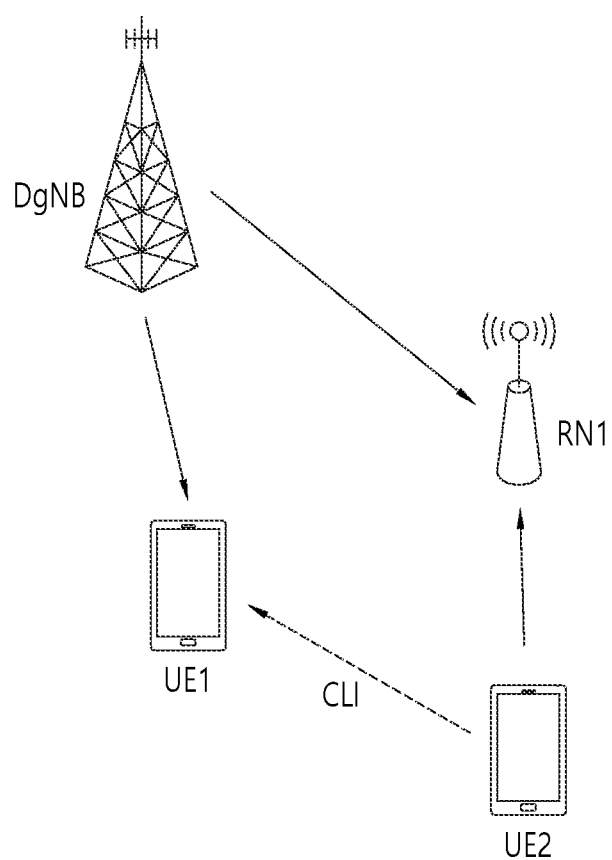
FIG. 22 schematically illustrates an example of access links and backhaul links between a DgNB, RN1, UE1 and UE2.

FIG. 22 schematically illustrates an example of access links and backhaul links between a DgNB, RN1, UE1 and UE2.

For example, if backhaul and access links scheduled by the same node use the same slot format, a DgNB access link and a DgNB backhaul link may be the same as downlink and an RN1 access link may be uplink, as illustrated in FIG. 22. Then, cross-link interference may occur between RN1 and RN2 because RN1 receives a downlink signal while UE2 transmits an uplink signal.

When this mechanism is used, it is difficult to alleviate cross-link interference and thus different slot formats may need to be used for the access link and the backhaul link. That is, the backhaul link and the access link need to be TDMed.

In addition, to allow communication between a donor and a relay, backhaul SFI may need to be different for nodes/hops.

Figure 23:
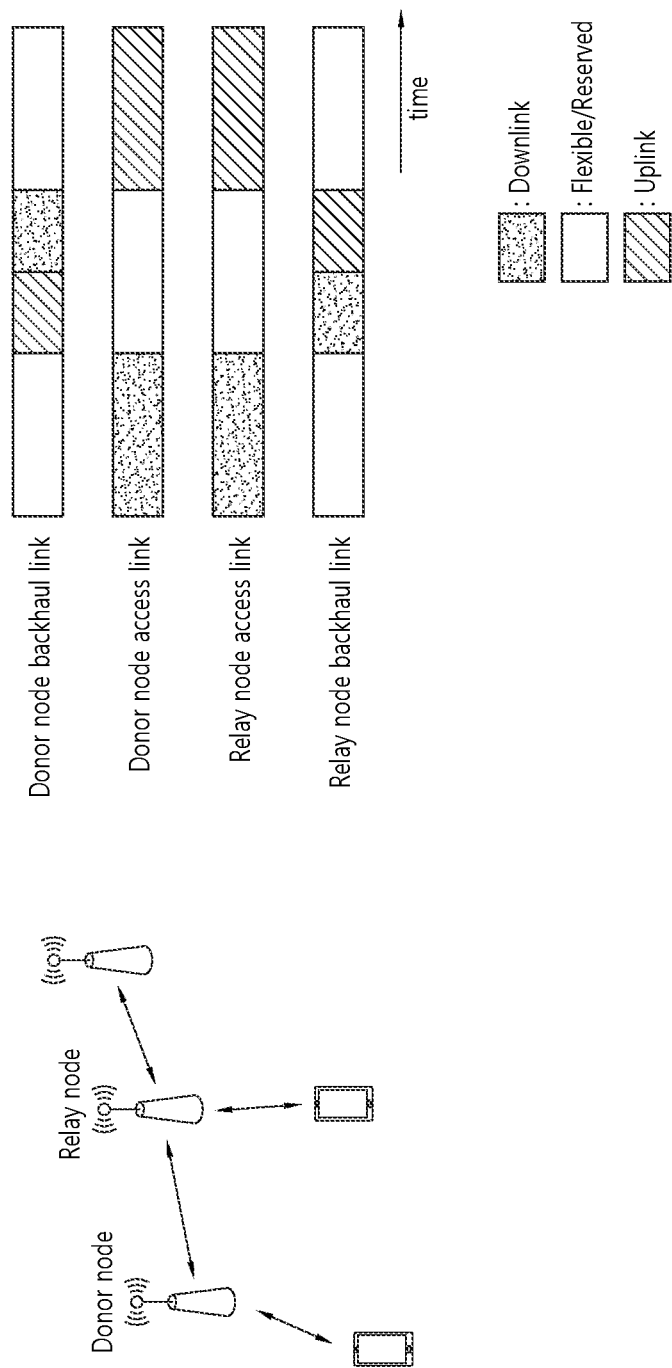
FIG. 23 schematically illustrates an example of SFI determination in a backhaul link.

FIG. 23 schematically illustrates an example of SFI determination in a backhaul link.

Considering the aforementioned aspect, an example of SFI determination in a backhaul link may be as illustrated in FIG. 23.

(1) A donor node access link and a relay node access link may have the same slot format.

(2) A backhaul link and an access link may be TDMed.

(3) A donor node backhaul link and a relay node backhaul link may have opposite directions (for example, U-D for the donor node and D-U for the relay node).

When semi-static SFI is coordinated for access and backhaul, a link may need to be accessed using an unused backhaul link.

E. Transmission/Reception Timing of Access and Backhaul Links

Figure 24:
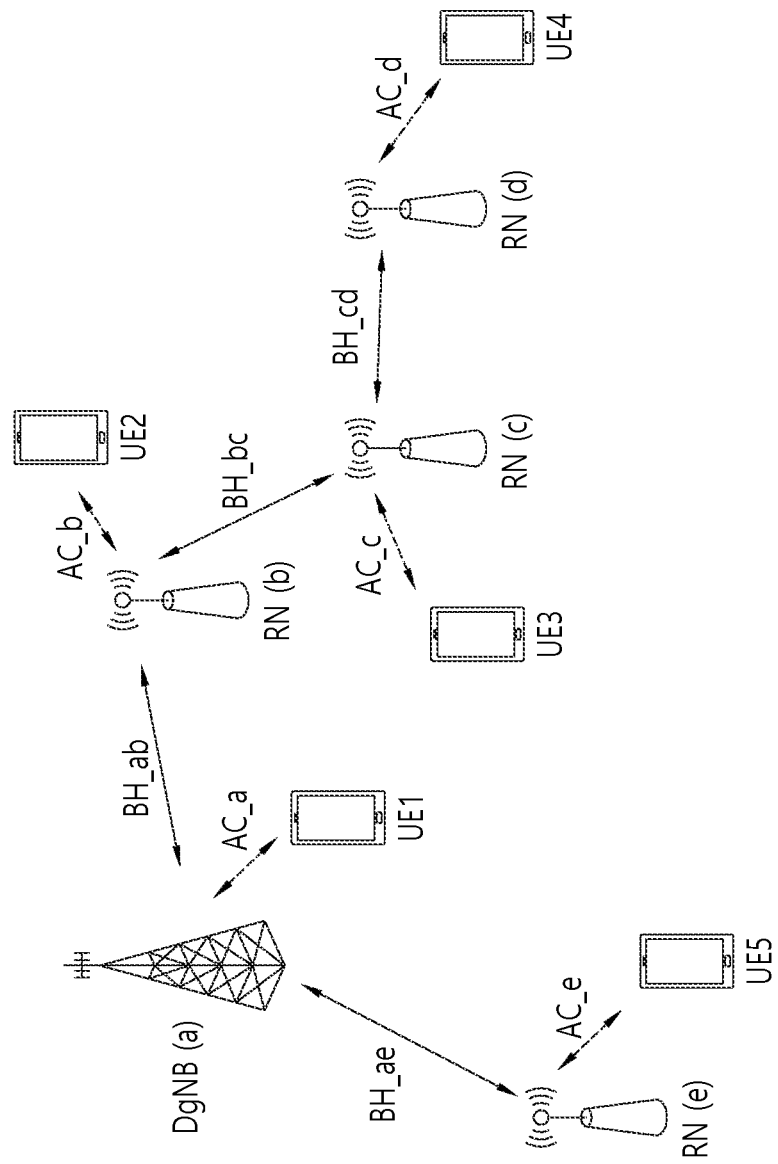
FIG. 24 schematically illustrates an example of an access and backhaul link configuration.

FIG. 24 schematically illustrates an example of an access and backhaul link configuration.

Referring to FIG. 24, data transmission between nodes may not be smoothly performed unless coordination/scheduling is performed between these links.

In this section, necessity and consideration with respect to scheduling/coordination between backhaul/access links are described and appropriate methods for backhaul/access link scheduling are provided.

As illustrated in FIG. 24, there may be four link types. Backhaul uplink, backhaul downlink, access uplink and access downlink may correspond to the four link types. Some aspects can be considered for scheduling/coordination of these links.

<DL/UL Alignment and Symbol Boundary Alignment Between Higher Node and Lower Node>

A half-duplex RN can only transmit (or receive) a signal to (or from) other RNs and/or UEs at a time. Here, other RNs may be a parent RN or a child RN.

Here, to efficiently schedule resources, it may be desirable to align links between a higher node and a lower node.

For example, when downlink data is transmitted from DgNB(a) to RN(b) while RN(b) transmits downlink data to RN(c) in the example of FIG. 24, RN(b) cannot receive the downlink data from DgNB(a) because a device cannot simultaneously perform transmission and reception.

Accordingly, directions between links connected to nodes need to be aligned. According to this rule, only RN(c) and UE2 can transmit signals to RN(b) when RN(b) receives a signal from DgNB(a). Here, RN(c) can perform only transmission to UE3.

On the other hand, when RN(b) transmits an uplink signal to DgNB(a), RN(b) can transmit a downlink signal to RN(c) and UE2 and RN(c) can perform only reception from UE3 and RN(d).

Figure 25:
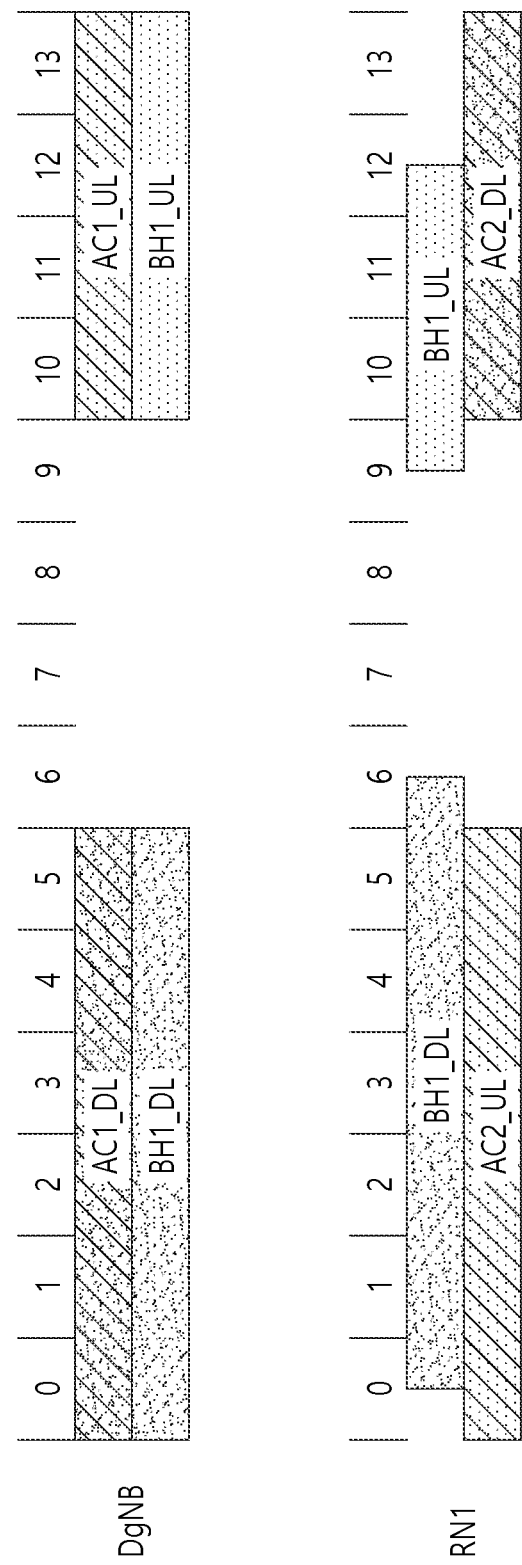
FIG. 25 schematically illustrates an example of Tx/Rx timing at each node with respect to other links.

FIG. 25 schematically illustrates an example of Tx/Rx timing at each node with respect to other links.

When an RN simultaneously processes multiple links, symbol boundaries need to be carefully processed. If not, performance may be considerably deteriorated.

Assume that access links of other nodes have the same Tx/Rx timing.

In this case, a DgNB can set the same backhaul link Tx/Rx timing as the access link timing. However, RN1 can receive a DL signal from the DgNB at a delayed timing and transmit a UL signal to the DgNB as a configured TA value. In this case, it is difficult for RN1 to process symbol boundaries, which causes interference in both the access link and backhaul link.

Since problems may occur even when the access link can be flexibly scheduled, the network needs to perform appropriate scheduling/coordination between backhaul/access links.

<CLI (D/U Alignment Between Access Links) for UE>

When link directions with respect to nodes have been aligned, cross-link interference (CLI) may also occur.

A case in which a node simultaneously performs reception of a backhaul downlink signal from a parent node and reception of a backhaul uplink signal from a child relay node or an access uplink signal (from a UE) may be considered. In this case, it is difficult to coordinate resources in advance because scheduling nodes of two links are different, and thus resources for signal transmission of the two links may be redundant.

For example, in FIG. 24, RN(b) can receive a DL signal from DgNB(a) scheduled by DgNB(a) and also receive UL signals from a UE and RN(c) scheduled by RN(b).

If RN(b) cannot correctly receive a scheduling signal from DgNB(a), it is difficult for RN(b) to schedule resources for RN(c) and UE2, and even if RN(b) schedules resources for RN(c) and UE2, CLI occurs with high probability.

Figure 26:
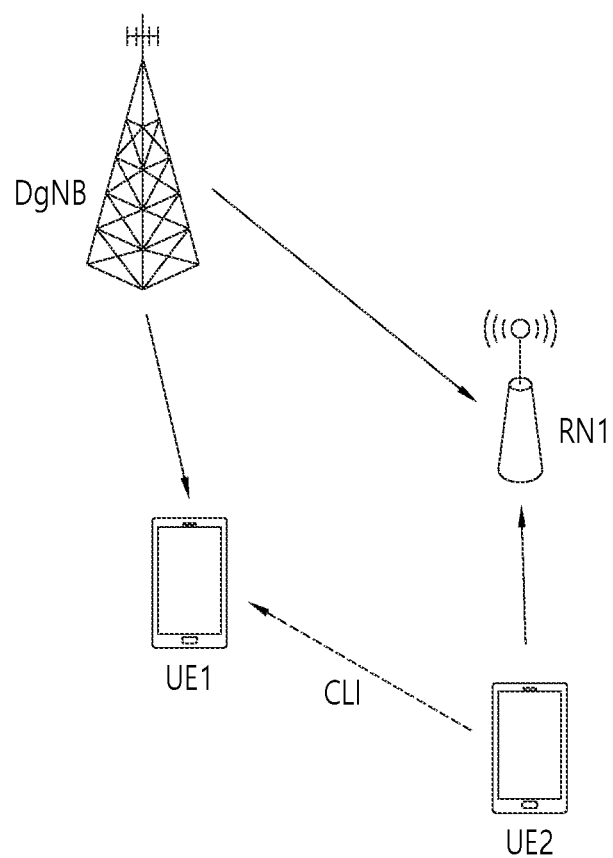
FIG. 26 schematically illustrates an example of a case in which CLI occurs.

FIG. 26 schematically illustrates an example of a case in which CLI occurs.

Another case with respect to CLI may be as illustrated in FIG. 26. When different UEs access a network from different RNs and/or a DgNB, the UEs can be configured in different directions on access links at the same time (e.g., UE1 can be configured as access downlink from the DgNB and UE2 can be configured as an access uplink from RN1). Here, when the distance between UE1 and UE2 is not sufficiently long, transmission of UE2 may correspond to significant interference applied to UE1.

<Independent Access Link Timing During Backhaul Link Switching>

A UE needs to have an access link timing independent from a backhaul timing in an IAB scenario, which means that switching between different backhaul links should not affect the access link timing of the UE.

If not, the ULE needs to perform a synchronization process whenever a backhaul link timing changes, which may not be efficient for both the RN and the UE.

Figure 27:
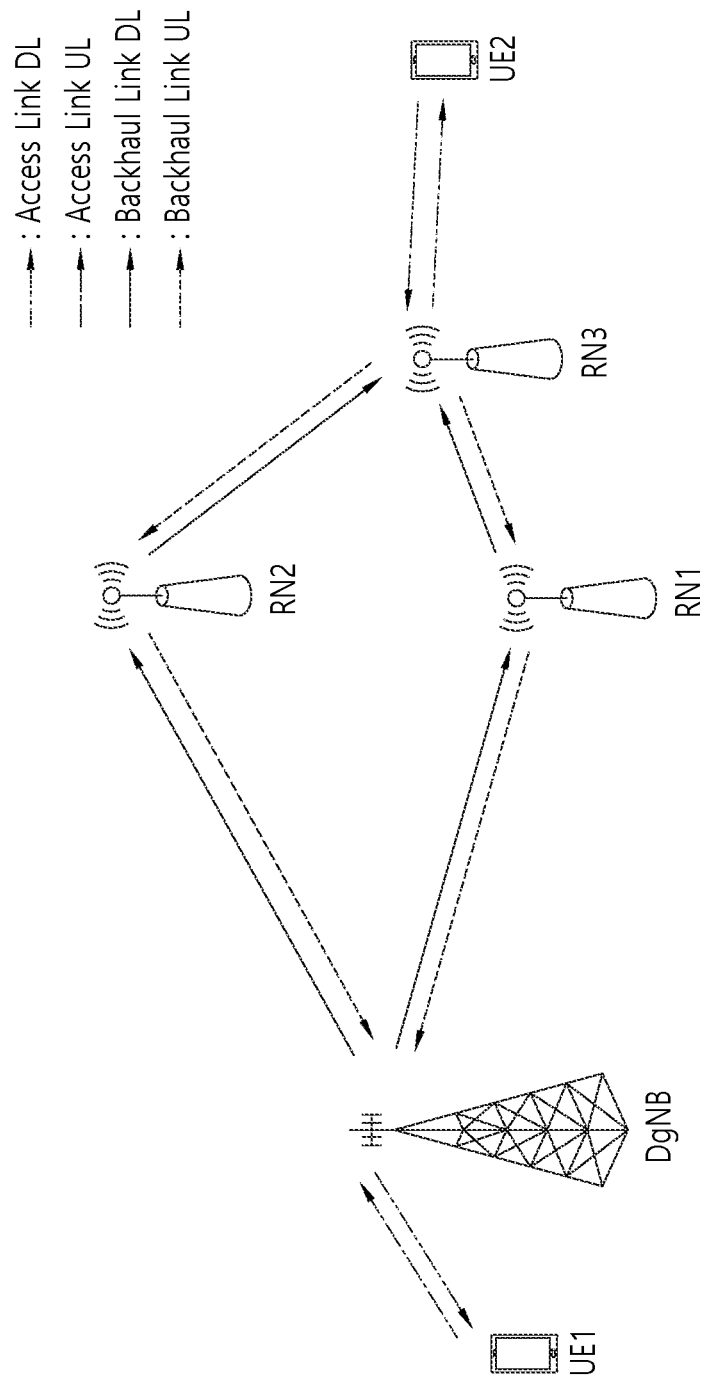
FIG. 27 schematically illustrates an example of signal transmission with respect to a multi-hop case.

FIG. 27 schematically illustrates an example of signal transmission with respect to a multi-hop case.

Referring to FIG. 27, UE2 accesses a network through RN3, and RN3 can receive information from a DgNB through a route including BH1 and BH3 or another route including BH2 and BH4.

Here, if a route for RN3 changes, a timing for resources scheduled in a backhaul link may change but an access link for UE2 should not be changed in order to minimize unnecessary handover or minimize additional processes at RN3 and UE2.

Considering that a backhaul link route may change according to resource availability and channel conditions, it is desirable that access links should not be affected by backhaul link route change unless a serving node is changed.

Based on the above consideration, three options for NR IAB can be provided.

1. Option A. Simultaneous Transmission of Access and Backhaul Links

Figure 28:
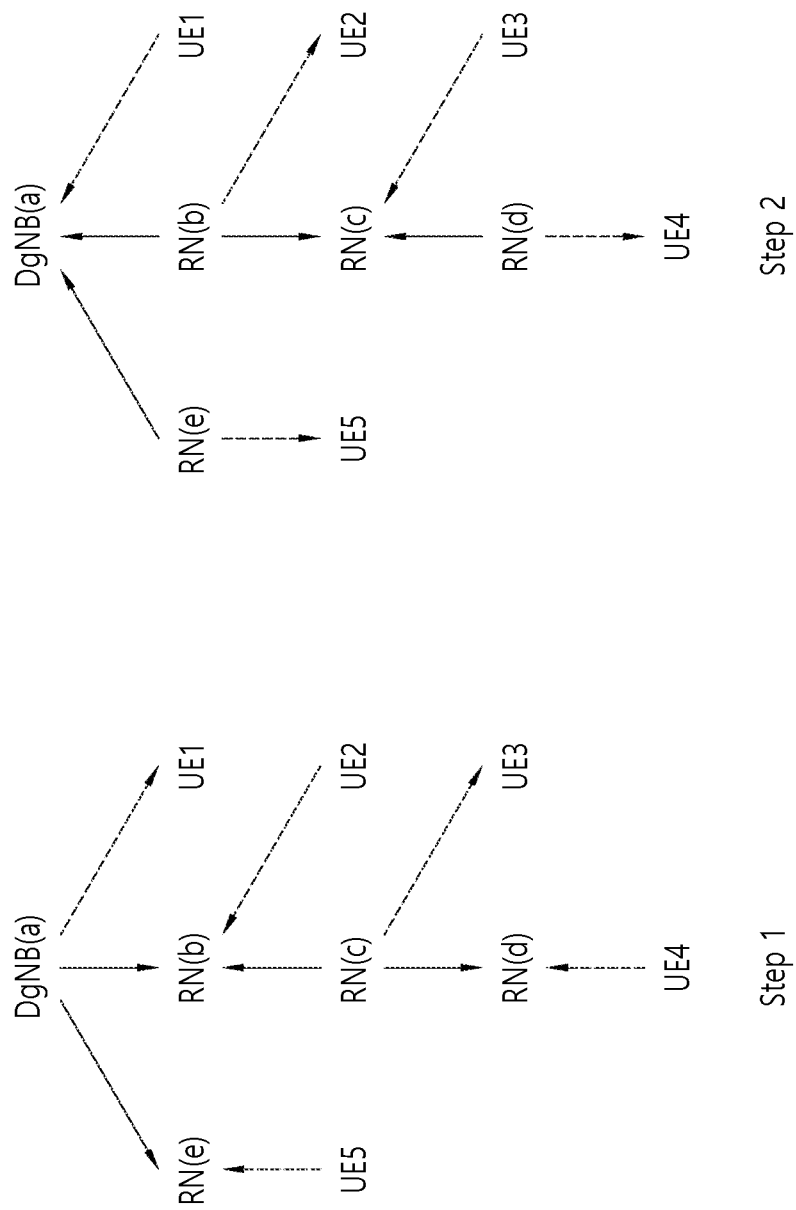
FIG. 28 schematically illustrates an example of IAB scheduling according to option A.

FIG. 28 schematically illustrates an example of IAB scheduling according to option A.

First, a method of simultaneously using an access link and a backhaul link may be considered.

In view of a node, directions of links connected to the node need to be aligned because the node cannot perform transmission and reception at a time. Accordingly, for operation of all links without time division, link directions can be coordinated as illustrated in FIG. 28.

In option A, links with the same hop count have the same link direction and the direction changes at the node of the next hop count.

Figure 29:
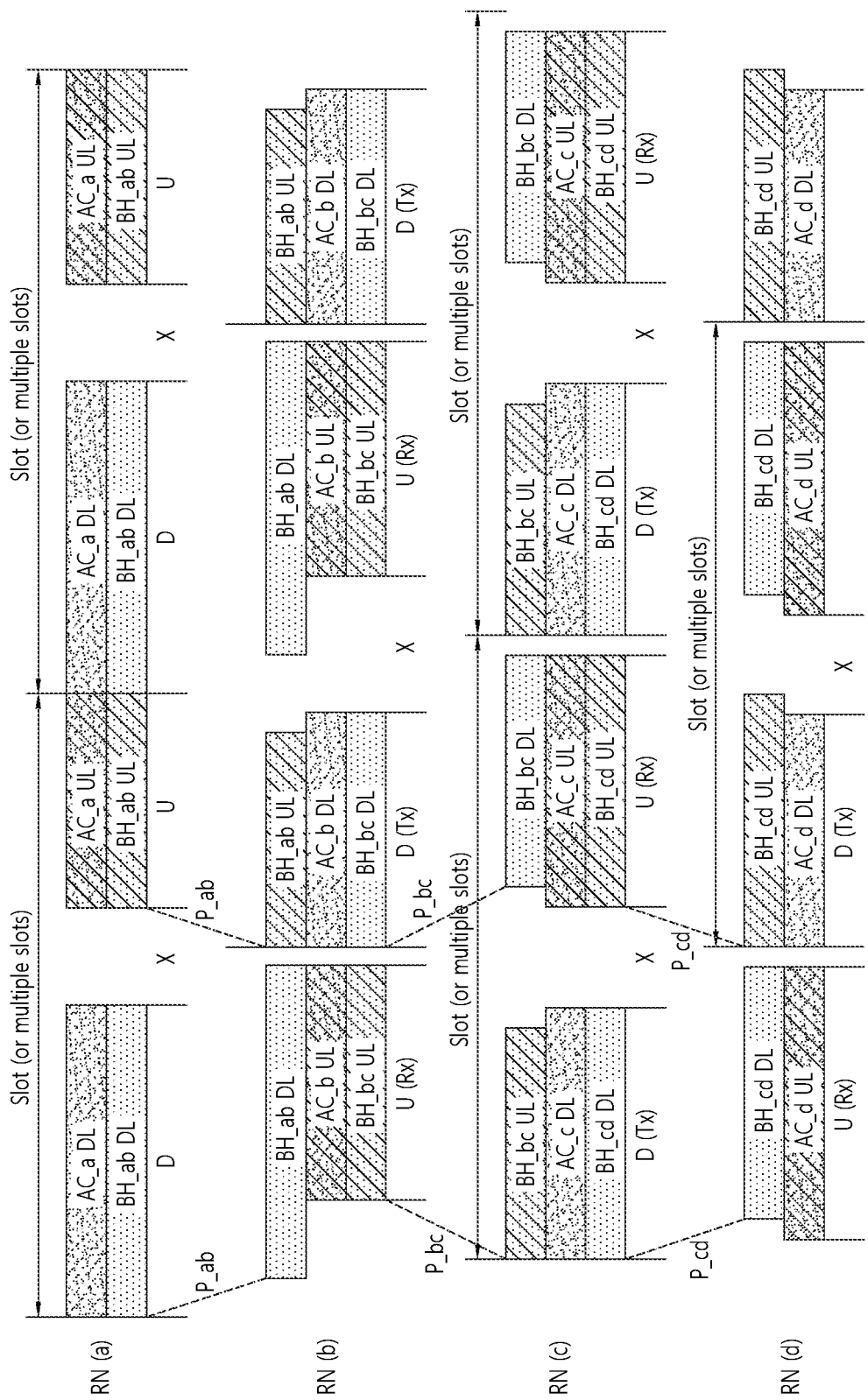
FIG. 29 schematically illustrates another example of IAB scheduling according to option A.

FIG. 29 schematically illustrates another example of IAB scheduling according to option A.

FIG. 29 shows an example of a Tx/Rx timing relationship between a link and a slot format for each link reflecting propagation delay. Here, P_xy represents propagation delay between node (x) and node (y).

In the case of RN(b), BH_ab DL needs to be propagation-delayed by P_ab from a DgNB(a) Tx timing and arrived and BH_ab UL need to precede a DgNB(a) Rx timing by P_ab.

Here, propagation delay, that is, the value P_ab, is not a multiple of a symbol length and thus a timing gap between DL and UL periods may be necessary.

Then, UL for AC_b and BH_bc can be performed while RN(b) receives BH_ab DL and DL for AC_b and BH_bc can be performed while RN(b) transmits UL for BH_bc. Here, symbol boundaries between the aforementioned three links need to be aligned.

In this case, slot boundaries (or boundaries of slots) can be defined as illustrated in FIG. 29, for example.

A slot boundary can start at a Tx (backhaul link with DL of an access link and a child node) slot boundary and end at another start point of Tx. Then, slot boundaries between nodes may not be aligned and SSB transmission timings may not be aligned in access links.

This option is advantageous in terms of efficient resource utilization but the following problems may also be present.

An access link timing depends on a backhaul link timing. When a higher node of an RN is changed, a backhaul link Tx/Rx timing with respect to the higher node may be changed. Then, the link timing of the RN may be affected and synchronization between a UE and the RN may not be maintained. In addition, this option may cause a CLI issue with respect to UEs. For example, if two neighboring UEs are connected to different RNs, access link directions may be different between the two UEs and interfere with each other as discussed in the previous section.

2. Option B. TDM of Access and Backhaul Links

Figure 30:
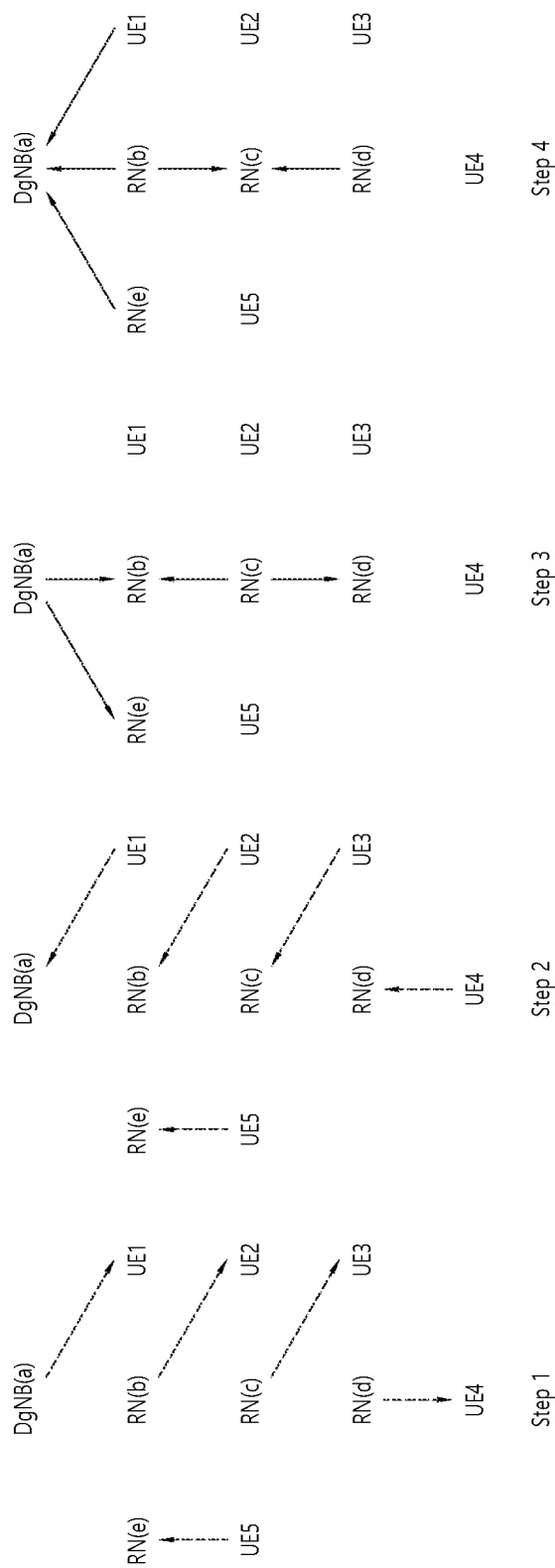
FIG. 30 schematically illustrates an example of IAB scheduling according to option B.

FIG. 30 schematically illustrates an example of IAB scheduling according to option B.

Another scheduling option may be TDM of access and backhaul links. In option B, in view of a node, scheduling between links can be composed of four steps as illustrated in FIG. 30.

a) First step: DL of access link
b) Second step: UL of access link
c) Third step: Tx of backhaul link (or Rx of backhaul link)
d) Fourth step: Rx of backhaul link (or Tx of backhaul link)

When this option is applied, link directions of all access links can be aligned because a backhaul link is not used while an access link is used. However, a backhaul link direction may vary according to the number of hops.

Figure 31:
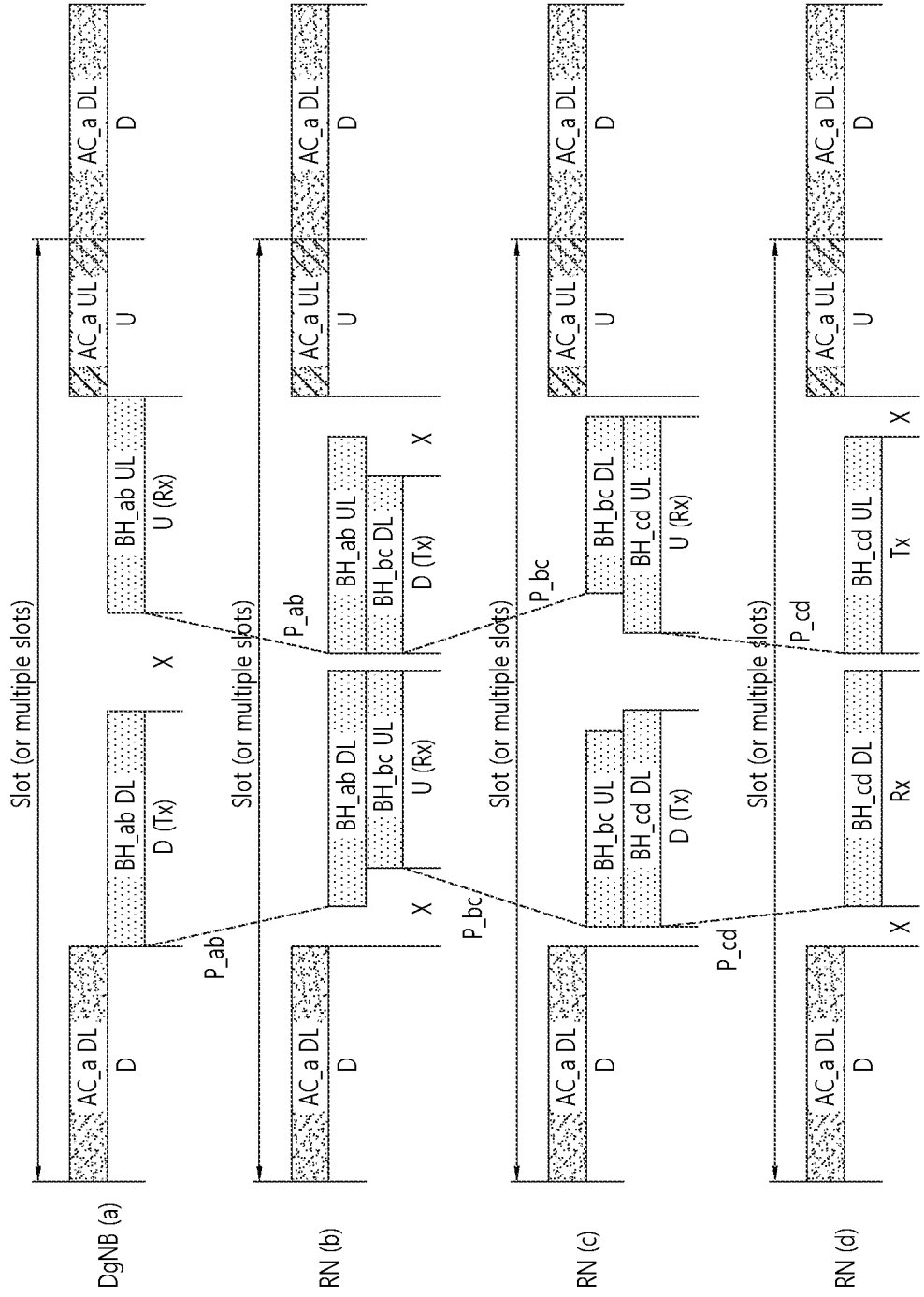
FIG. 31 schematically illustrates another example of IAB scheduling according to option B.

FIG. 31 schematically illustrates another example of IAB scheduling according to option B.

FIG. 31 shows an example of Tx/Rx timing between a link and a slot format for each link of option B. In this example, all access links can be absolutely synchronized, and thus all nodes can have the same Tx/Tx timing for access links.

However, since there is propagation delay for node-to-node communication, backhaul links cannot have the same Tx/Tx timing. A timing gap between backhaul link DL and UL may be necessary because symbol boundaries for backhaul link Rx and Tx cannot be aligned as in option A.

In addition, symbol boundaries of access and backhaul links may not be aligned. Accordingly, a timing gap for coordinating symbol boundaries may be necessary when a node switches access and backhaul links.

When this option is used, nodes may have the same slot boundaries (or boundaries of multiple slots) and may transmit SSB at the same time.

In addition, access links can be synchronized at an absolute timing in this option.

Accordingly, an access link timing can be maintained even when a backhaul link route between a DgNB and an RN changes.

Furthermore, since link directions with respect to all access links are aligned and access and backhaul links are TDMed, a UE is not interfered by other access links or backhaul links.

3. Option C. TDM of gNB Function and UE Function

Option C can be considered in order to eliminate timing dependency between links. In this option, a link for the gNB function and a link for the UE function can be TDMed in view of a node.

A node has two functions of the gNB function and the UE function. The gNB function supports and communicates with UEs and child nodes and the UE function connects to and communicates with a parent node. Accordingly, a backhaul link with a parent node is related to the UE function and a backhaul link with a child node and an access link is related to the gNB function.

Figure 32:
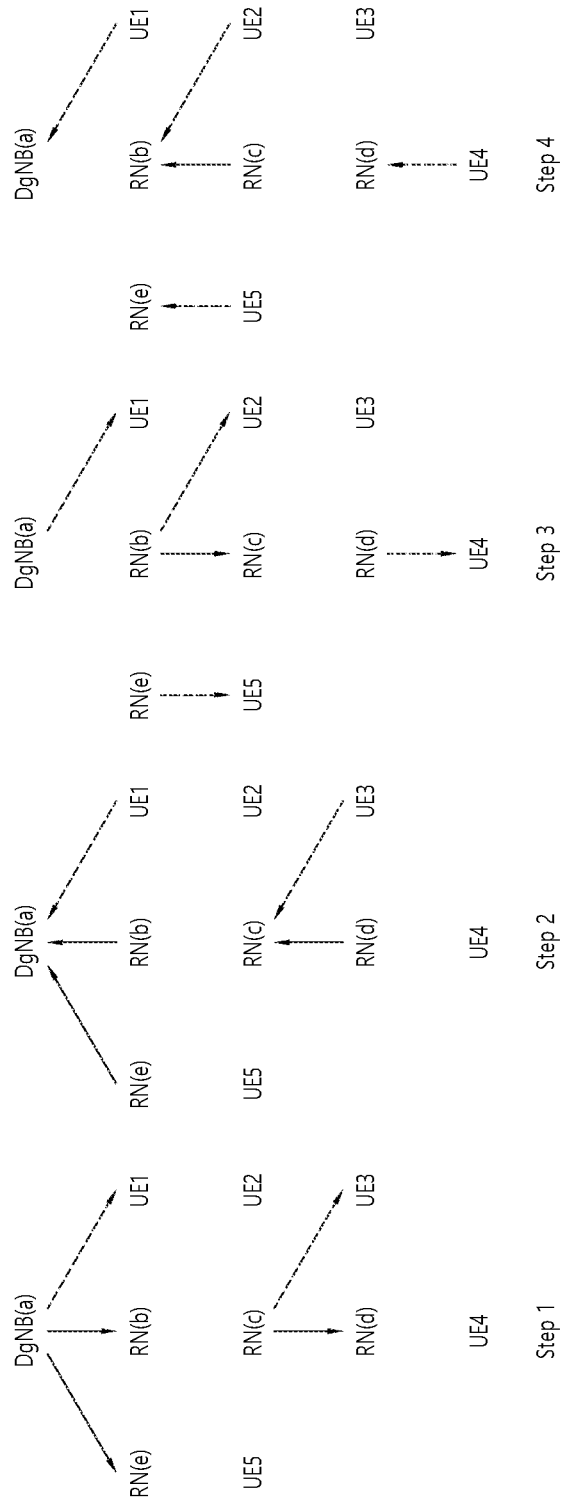
FIG. 32 schematically illustrates an example of IAB scheduling according to option C.

FIG. 32 schematically illustrates an example of IAB scheduling according to option C.

TDM of the gNB function and the UE function may mean TDM of an even-numbered hop and an odd-numbered hop, and scheduling of this option can be composed of four steps which are illustrated in FIG. 32.

(1) Step 1: DL of access/backhaul links for an odd-numbered hop
(2) Step 2: UL of access/backhaul links for an odd-numbered hop
(3) Step 3: DL of access/backhaul links for an even-numbered hop (DL of an access link of +DgNB)
(4) Step 4: UL of access/backhaul links for an even-numbered hop (DL of an access link of +DgNB)

The main purpose of this option is to generate an independent Tx/Rx timing between links.

In view of a DgNB, the DgNB has no backhaul link with a parent node. Accordingly, the DgNB may not pay attention to a backhaul link timing for a time duration for the UE function, and thus the access link of the DgNB can be used.

Figure 33:
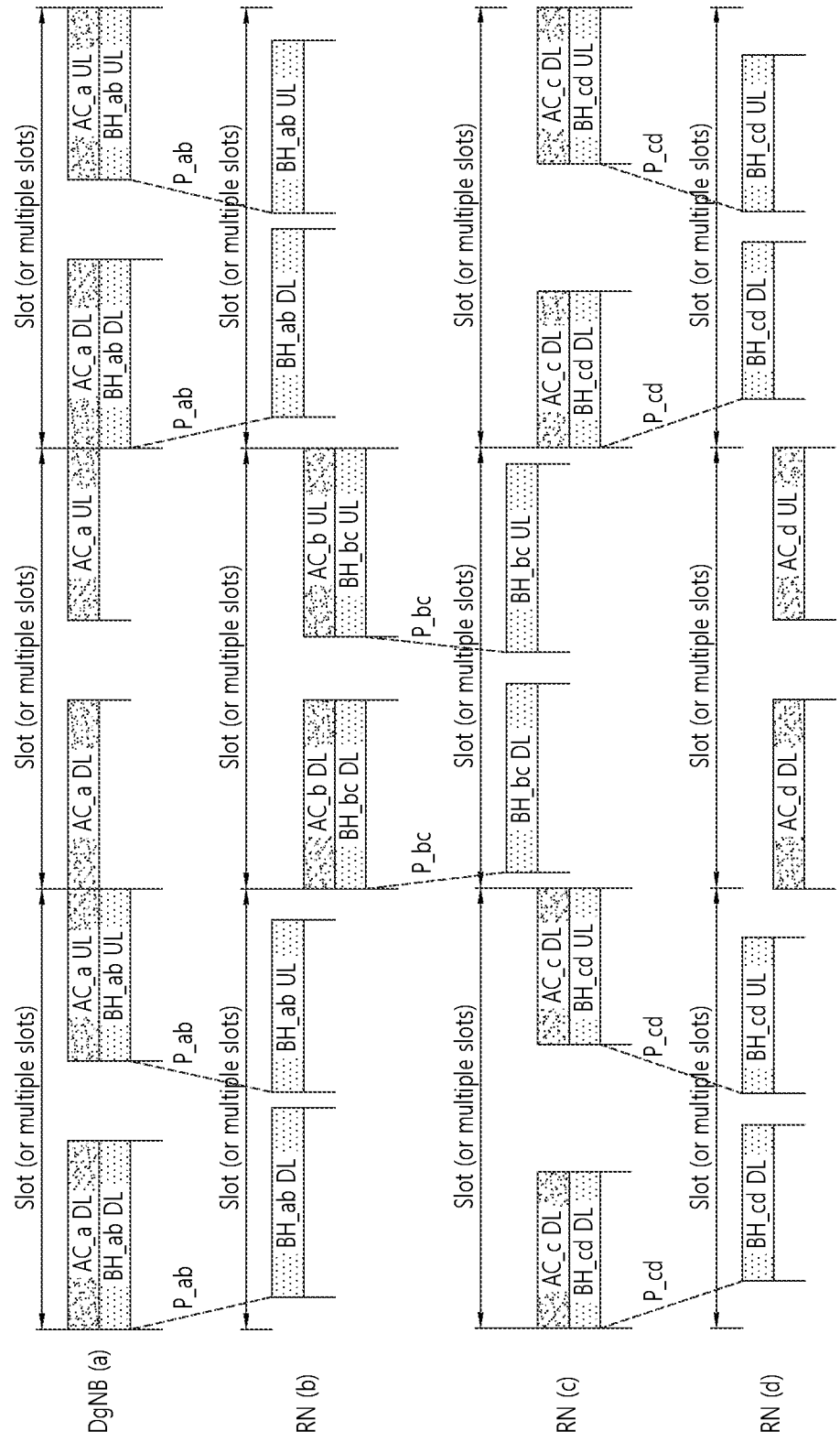
FIG. 33 schematically illustrates another example of IAB scheduling according to option C.

FIG. 33 schematically illustrates another example of IAB scheduling according to option C.

A specific example of a timing relationship between links is illustrated in FIG. 33. An RN cannot simultaneously connect Tx/Rx backhaul links to a parent node and a child node so that the two links have no reason to be correlated. Accordingly, all nodes can have the same DL Tx timing and UL Rx timing, which may cause a simple scheduling/coordination structure.

In this option, nodes may have the same slot boundaries (or boundaries of multiple slots). However, access link timings may be different for nodes and thus SSB transmission timings may also be different.

In this case, SSB can be transmitted in slots with different slot numbers between nodes although SFN start points are identical for the nodes. Alternatively, SFN start points may be different for the nodes although SSB is transmitted in slots with the same slot number between the nodes.

That is, in FIG. 33, DgNB(a) and RN(c) transmit SSB in slot #0 whereas RN(b) and RN(d) transmit SSB in slot #1, for example. Although all nodes transmit SSB in slot #0, for example, RN(b) and RN(d) may transmit a slot #(n+1) when a slot #n is transmitted for DgNB(a) and RN(c).

As in option B, the access link timing does not change even when a backhaul link route between a DgNB and an RN changes. Further, a CLI issue with respect to UEs does not occur.

In this section, three options for scheduling between links in an IAB environment have been provided.

Option (a) provides flexibility of resource utilization but has disadvantages of some restrictions and a complicated structure. On the other hand, options (b) and (c) can solve the disadvantages of option (a) but has low resource utilization flexibility.

The above-described example with respect to option A will be described below in more detail.

In a situation such as option A, slot boundaries with respect to links (an access link with a UE and a backhaul link with a child node) on which a node performs scheduling can be configured as follows. (Slot boundaries may mean boundaries of multiple slots in the present disclosure).

Alt 1. A period from a period in which DL starts to a period in which another DL starts may be a slot boundary. In this case, G_UD and/or G_DU periods may be included in a slot.

Alt 2. A period from a period in which DL starts to a period in which the next DL starts may be a slot boundary. In this case, G_UD and/or G_DU periods may be included in a slot.

Alt 3. A period from a period in which DL starts to a period in which UL ends may be a slot boundary. Here, only one DL period and one UL period can be present in the slot boundary. In this case, a G_DU period may be included in a slot. Furthermore, in this case, a slot length can be set to be less than a conventional slot length by G_UD. In addition, a gap of G_UD may be present between slots.

Alt 4. A period from a period in which DL starts to a period in which UL ends may be a slot boundary. Here, a plurality of DL periods and only one UL period can be present in the slot boundary. In this case, a G_DU period may be included in a slot. Furthermore, in this case, a slot length can be set to be less than a conventional slot length by G_UD. In addition, a gap of G_UD may be present between slots.

Alt 5. A period from a period in which UL ends to a period in which another UL ends may be a slot boundary. In this case, G_UD and/or G_DU periods may be included in a slot.

Alt 6. A period from a period in which UL ends to a period in which the next UL ends may be a slot boundary. In this case, G_UD and/or G_DU periods may be included in a slot.

Figure 34:
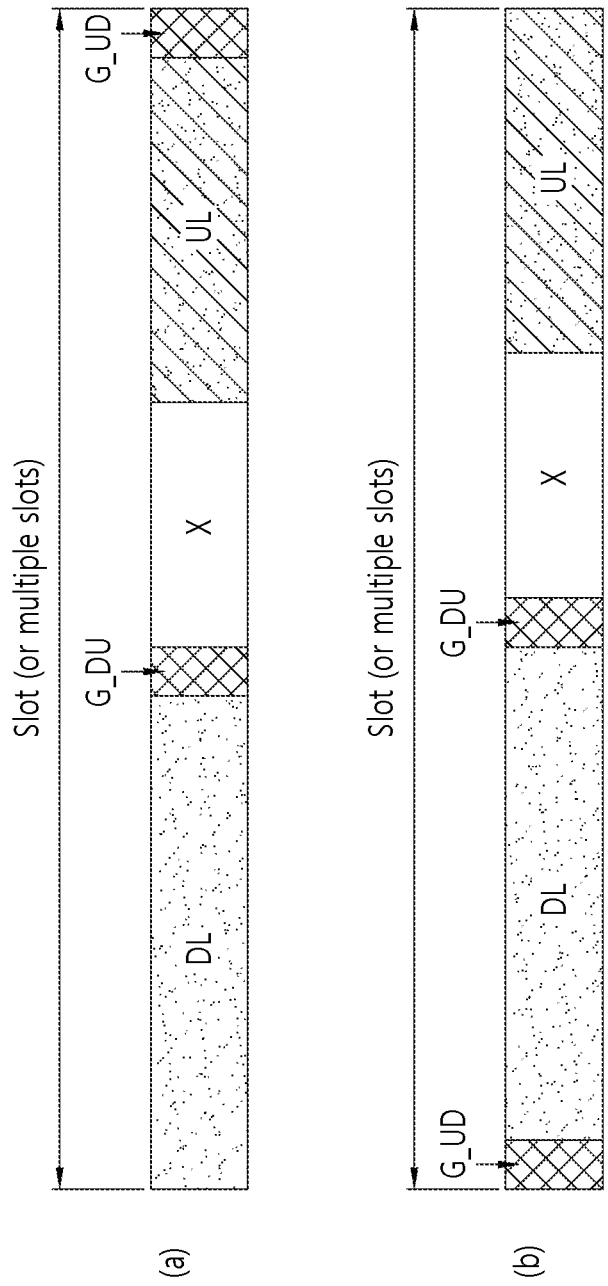
FIG. 34 schematically illustrates examples of a slot format.

FIG. 34 schematically illustrates examples of a slot format.

In the case of option A, slot formats with respect to links (an access link with a UE and a backhaul link with a child node) on which a node performs scheduling may be as follows. That is, the present disclosure proposes a method of using slot formats which will be described below for links (an access link with a UE and a backhaul link with a child node) on which a node performs scheduling in an NR IAB environment. Slots may have different slot formats. (A slot format may mean a format in which slots in an SFI interval are configured in the present disclosure).

(a) A slot format may be configured in the order of D, G_DU, X, U and G_UD as illustrated in FIG. 34(a). Here, this option includes positioning of G_DU in different periods within a time duration corresponding to the sum of consecutively positioned G_DU and X. That is, G_DU may be positioned in the order of "G_DU and X", "X and G_DU" or "X, G_DU and X".

(b) A slot format may be configured in the order of G_UD, D, G_DU, X and U as illustrated in FIG. 34(b). Here, this option includes positioning of G_DU in different periods within a time duration corresponding to the sum of consecutively positioned G_DU and X. That is, G_DU may be positioned in the order of "G_DU and X", "X and G_DU" or "X, G_DU and X".

The above-described example with respect to option B will be described below in more detail.

In a situation such as option B, slot boundaries with respect to links (an access link with a UE and a backhaul link with a child node) on which a node performs scheduling can be configured as follows. (Slot boundaries may mean boundaries of multiple slots in the present disclosure).

Alt 1. A period from a period in which DL of an access link starts to a period in which DL of another access link starts may be a slot boundary. In this case, G_UD, G_DU, G_AB and/or G_BA periods may be included in a slot.

Alt 2. A period from a period in which DL of an access link starts to a period in which DL of the next access link starts may be a slot boundary. In this case, G_UD, G_DU, G_AB and/or G_BA periods may be included in a slot.

Alt 3. A period from a period in which DL of an access link starts to a period in which UL of the access link ends may be a slot boundary. Here, only one access link DL period and one access link UL period can be present in the slot boundary. In this case, G_UD, G_DU, G_AB and/or G_BA periods may be included in a slot.

Alt 4. A period from a period in which DL of an access link starts to a period in which UL of the access link ends may be a slot boundary. Here, a plurality of access link DL periods and one access link UL period can be present in the slot boundary. In this case, G_UD, G_DU, G_AB and/or G_BA periods may be included in a slot.

Figure 35:
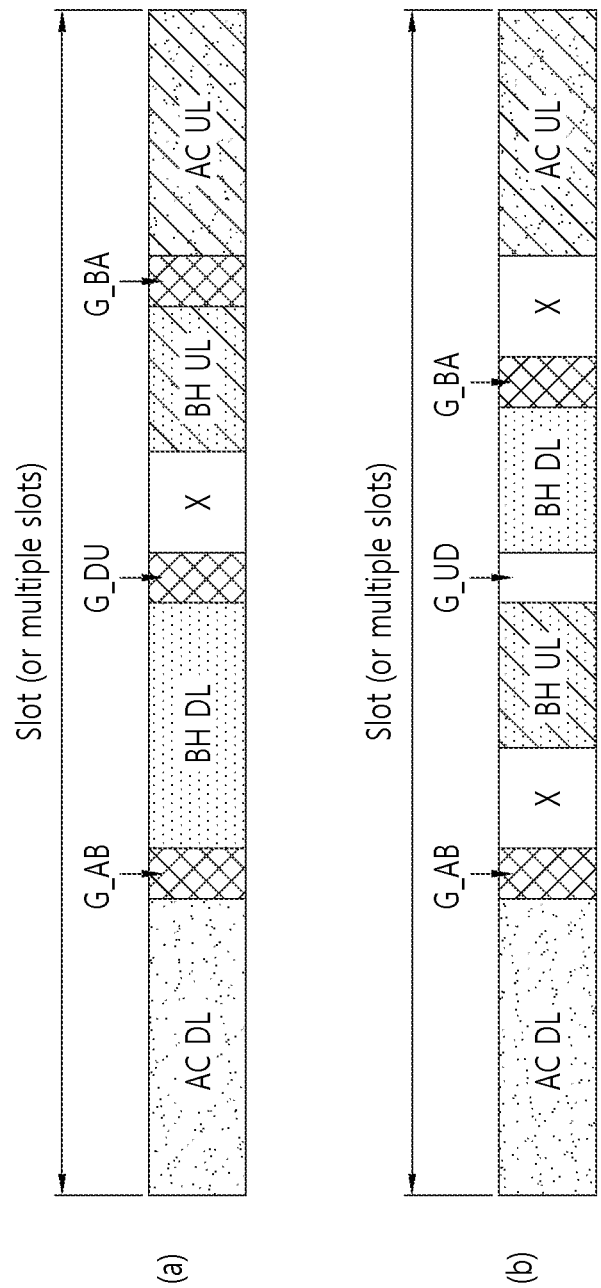
FIG. 35 schematically illustrates other examples of slot formats.

FIG. 35 schematically illustrates other examples of slot formats.

In the case of option B, slot formats with respect to links (an access link with a UE and a backhaul link with a child node) on which a node performs scheduling may be as follows. That is, the present disclosure proposes a method of using slot formats which will be described below for links (an access link with a UE and a backhaul link with a child node) on which a node performs scheduling in an NR IAB environment. Slots may have different slot formats. (A slot format may mean a format in which slots in an SFI interval are configured in the present disclosure.)

In a case in which slot formats for an access link with a UE and a backhaul link with a child node are configured in a combined form, (a) a slot format can be configured in the order of AC DL, G_AB, BH_DL, G_DU, X, BH_UL, G_BA and AC_UL, as illustrated in FIG. 35(a). Here, this option includes positioning of G_DU in different periods within a time duration corresponding to the sum of consecutively positioned G_DU and X. That is, G_DU may be positioned in the order of "G_DU and X", "X and G_DU" or "X, G_DU and X".

(b) a slot format can be configured in the order of AC DL, G_AB, X, BH_UL, G_DU, BH_DL, G_BA and X, as illustrated in FIG. 35(b). Here, this option includes positioning of a gap period in different periods within a time duration corresponding to the sum of consecutively positioned gap period (G_AB and G_BA) and X. That is, the gap period may be positioned in the order of "Gap and X", "X and Gap" or "X, Gap and X".

Figure 36:
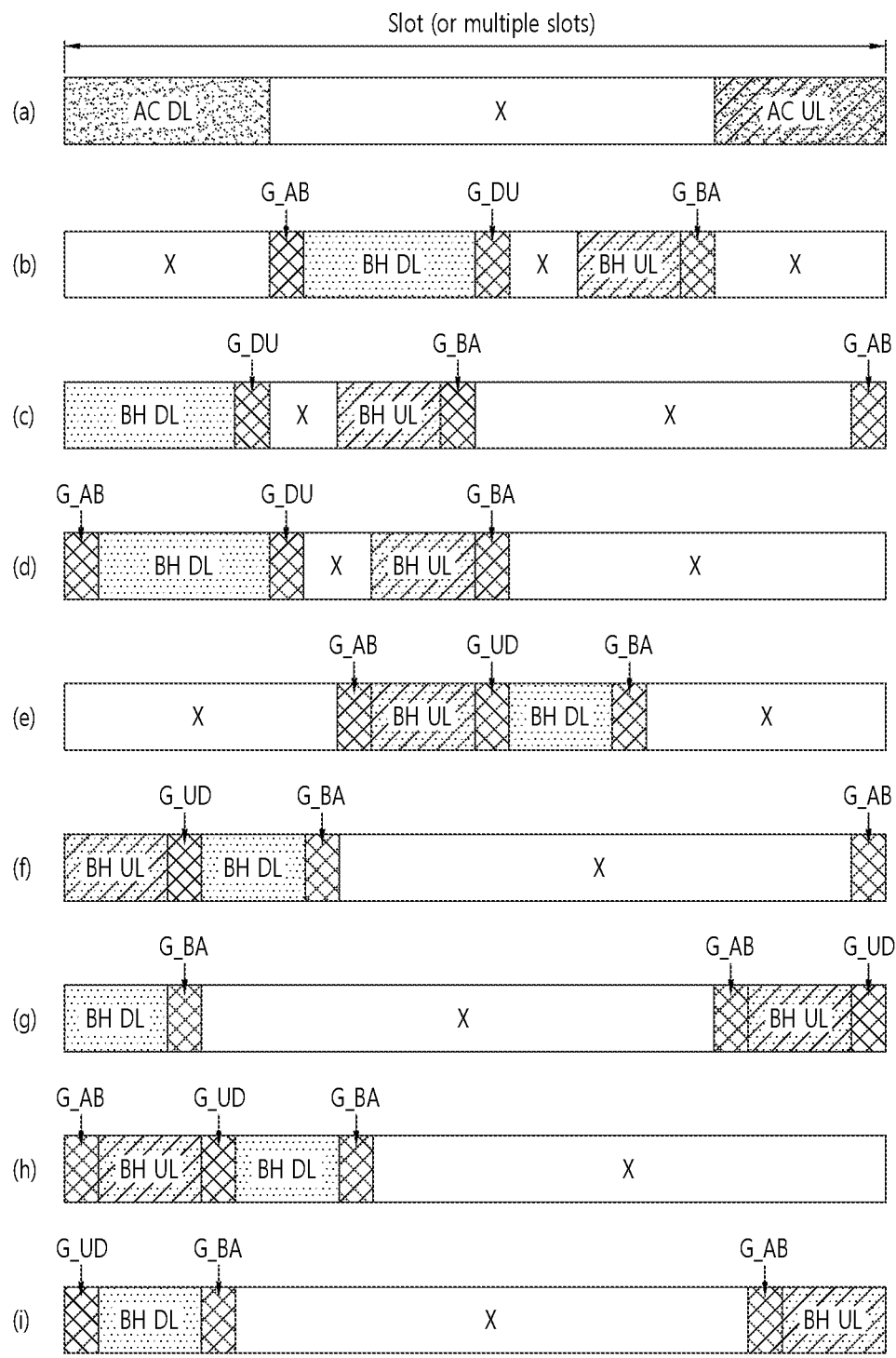
FIG. 36 schematically illustrates other examples of slot formats.

FIG. 36 schematically illustrates other examples of slot formats.

When slots format for an access link with a UE and a backhaul link with a child node are respectively configured for the UE and the child node, the slot format may be configured in the order of DL, X and UL for the access link, as illustrated in FIG. 36(a).

In the case of the backhaul link, (a) the slot format may be configured in the order of X, G_AB, DL, G_DU, X, UL, G_BA and X, as illustrated in FIG. 36(b).

(b) the slot format may be configured in the order of DL, G_DU, X, UL, G_BA, X, G_AB, as illustrated in FIG. 36(c).

(c) the slot format may be configured in the order of G_AB, DL, G_DU, X, UL, G_BA and X, as illustrated in FIG. 36(d).

(d) the slot format may be configured in the order of X, G_AB, UL, G_UD, DL, G_BA and X, as illustrated in FIG. 36(e).

(e) the slot format may be configured in the order of UL, G_UD, DL, G_BA, X and G_AB, as illustrated in FIG. 36(f).

(f) the slot format may be configured in the order of DL, G_BA, X, G_AB, UL and G_UD, as illustrated in FIG. 36(g).

(g) the slot format may be configured in the order of G_AB, UL, G_UD, DL, G_BA and X, as illustrated in FIG. 36(h).

(h) the slot format may be configured in the order of G_UD, DL, G_BA, X, G_AB and UL, as illustrated in FIG. 36(i).

Here, the present disclosure includes positioning of a gap period in different periods within a time duration corresponding to the sum of consecutively positioned gap period (G_AB, G_BA, G_DU and G_UD) and X in the above option. That is, the gap period may be positioned in the order of "Gap and X", "X and Gap" or "X, Gap and X".

In addition, the present disclosure includes positioning of Gap1 and Gap2 periods in different periods within a time duration corresponding to the sum of consecutively positioned Gap1, X and Gap2 (here, Gap1, 2 are G_AB, G_BA, G_DU or G_UD) in the above option. That is, Gap1 and Gap2 periods may be positioned in the order of "Gap1, X and Gap2", "Gap1, Gap2 and X", "Gap1, X, Gap2 and X", "X, Gap1, X and Gap2", or "X, Gap1 and Gap2". (Here, G_BA and G_AB may be changed in the order.)

The above-described example with respect to option C will be described below in more detail.

In a situation such as option C, slot boundaries with respect to links (an access link with a UE and a backhaul link with a child node) on which a node performs scheduling can be configured as follows. (Slot boundaries may mean boundaries of multiple slots in the present disclosure).

Alt 1. A period from a period in which DL starts to a period in which UL ends may be a slot boundary. Here, only one DL period and one UL period can be present in the slot boundary. Further, in this case, DL and UL periods may not be present in a specific slot. That is, a slot in which DL and UL periods are present and a slot in which DL and UL periods are not present may be TDMed.

Figure 37:
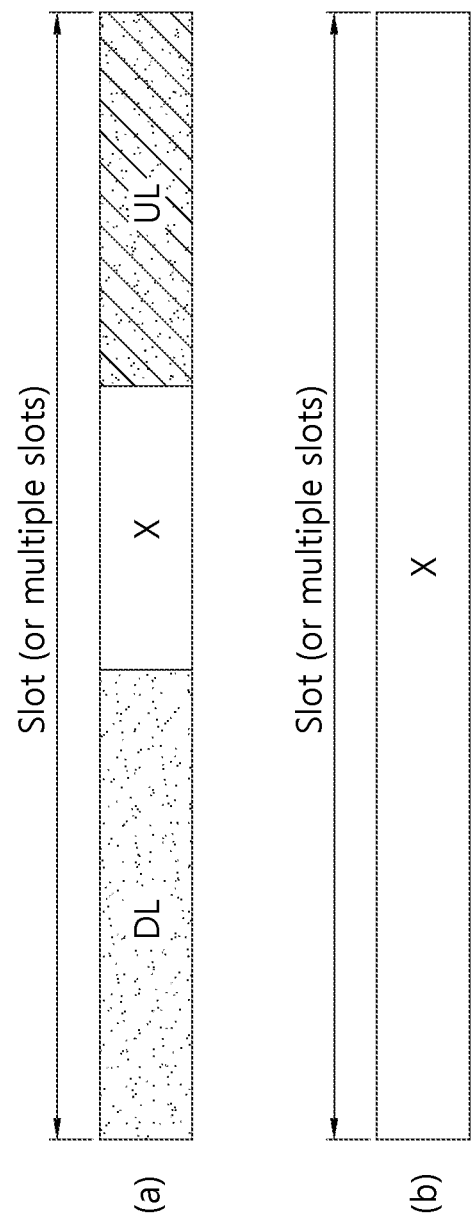
FIG. 37 schematically illustrates other examples of slot formats.

FIG. 37 schematically illustrates other examples of slot formats.

In the case of option C, slot formats with respect to links (an access link with a UE and a backhaul link with a child node) on which a node performs scheduling may be as follows. That is, the present disclosure proposes a method of using slot formats which will be described below for links (an access link with a UE and a backhaul link with a child node) on which a node performs scheduling in an NR IAB environment. Slots may have different slot formats. (A slot format may mean a format in which slots in an SFI interval are configured in the present disclosure).

(a) A slot format may be configured in the order of D, X and U as illustrated in FIG. 37(a).

(b) A slot format may be configured as X as illustrated in FIG. 37(b).

F. Access and Backhaul Link Multiplexing and Tx/Rx Timing

F-1. Transmission/Reception Timing

An IAB node is composed of MT and DU. Here, the MT relates to a backhaul link $L_P$ with a parent node and the DU relates to a backhaul link $L_C$ with a child node and a backhaul link $L_A$ with an access link.

Tx/Rx timings applicable to each IAB node and a UE may be different according to whether the MT and DU can simultaneously operate. In other words, Tx/Rx timings of an IAB node and a UE can be determined by the type of a link scheduled in the same time duration. This will be described later in detail.

Separate operations of MT and DU (TDM of $L_P$ and $L_C/L_A$)

Figure 38:
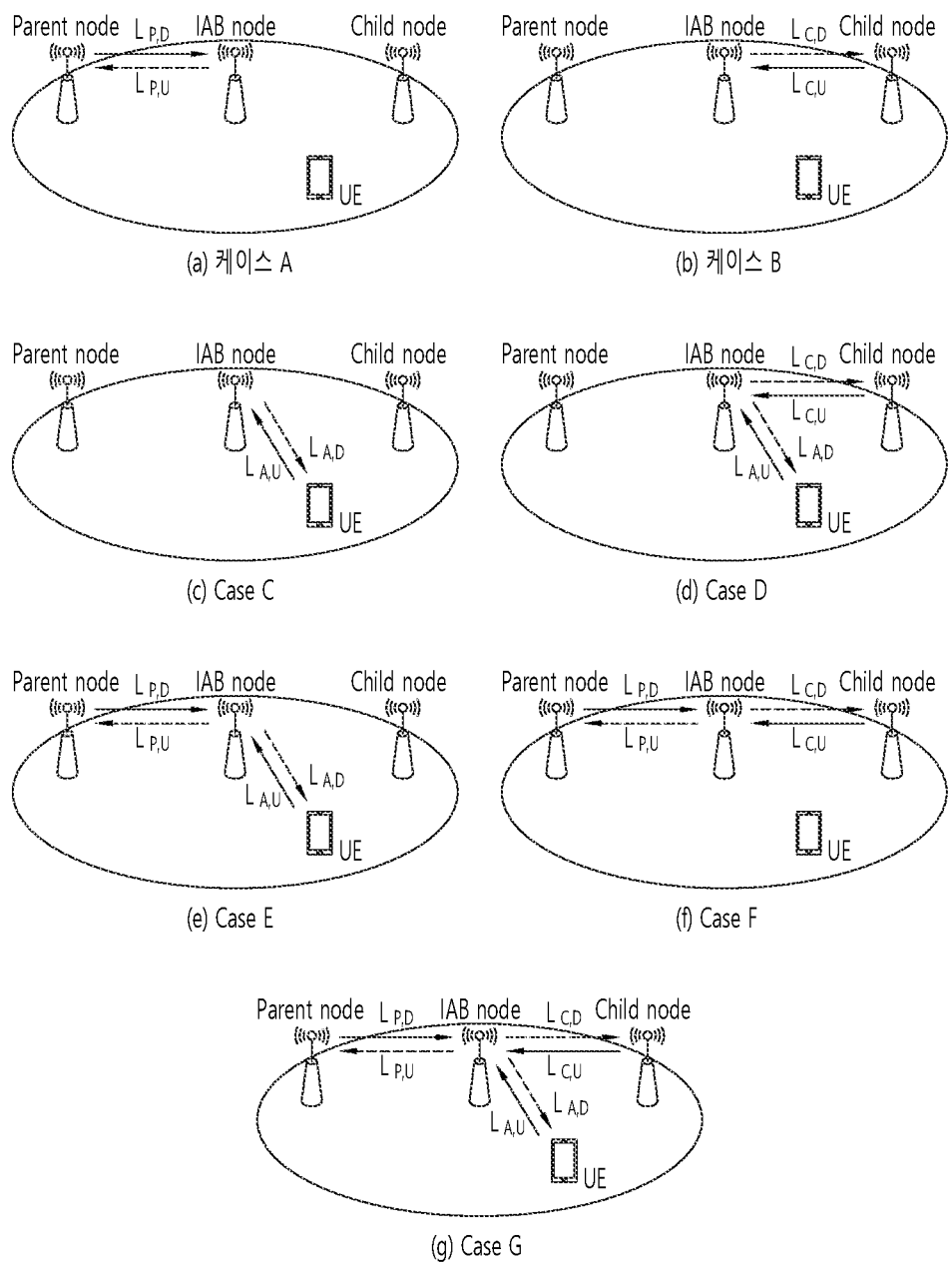
FIG. 38 schematically illustrates operations between MT and DU according to an embodiment of the present disclosure.

FIG. 38 schematically illustrates operations between MT and DU according to an embodiment of the present disclosure.

FIGS. 38(a), (b), (c) and (d) illustrate multiplexing examples in which only one of MT and DU of an IAB node operates for a time. That is, $L_P$ and $L_C/L_A$ can be TDMed in this case.

In the case of FIGS. 38(a), (b) and (c), only one of $L_P$, $L_C$ and $L_A$ can be reserved. In FIG. 38(d), $L_C$ and $L_A$ scheduled by DU can be simultaneously used but $L_P$ related to MT cannot be multiplexed.

In this case, Rx timings of $L_{P,D}$ and $L_{C,U}/L_{A,U}$ need not be aligned because MT and DU do not simultaneously transmit/receive signals. Likewise, Tx timings of $L_{P,U}$ and $L_{C,D}/L_{A,D}$ need not be aligned. Accordingly, transmission timings of all IAB nodes and donor nodes can be coordinated. Then, Tx and Rx timings with respect to each device can be determined as follows.

(1) Parent Node CU/DU $L_{P,D}$ Tx timing: absolutely aligned between nodes.

$L_{P,U}$ Rx timing: $L_{P,D}$ Tx timing $- N_{TA\ offset} \cdot T_s$ $N_{TA\ offset}$ and $T_s$ are defined in 3GPP LTE 36.211 and 3GPP NR 38.211 specifications.

(2) IAB Node MT $L_{P,D}$ Rx timing: acquired by DL timing synchronization and tracking. ($L_{P,D}$ Tx timing $+ P_d$)

$L_{P,U}$ Tx timing: $L_{P,D}$ Rx timing $- (N_{TA} + N_{TA\ offset}) \cdot T_s$ Here, $P_d$ represents propagation delay between a parent node and an IAB node. In addition, $N_{TA}$ represents a timing advance value set by the parent node.

(3) IAB Node DU $L_{C,D}$ Tx timing: can be absolutely aligned between nodes. ($L_{P,D}$ Rx timing $- 1/2 \cdot N_{TA} \sim T_s$)

$L_{C,U}$ Rx timing: $L_{C,D}$ Tx timing $- N_{TA\ offset} \cdot T_s$ $L_{A,D}$ Tx timing: identical to $L_{C,D}$ Tx timing.

$L_{A,U}$ Rx timing: identical to $L_{C,U}$ Rx timing.

Here, $N_{TA}$ represents a timing advance value set by the parent node.

(4) Parent Node MT $L_{C,D}$ Rx timing: can be obtained by DL timing synchronization and tracking. ($L_{C,D}$ Tx timing $+ P_d$)

$L_{C,U}$ Tx timing: $L_{C,D}$ Rx timing $- (N_{TA} + N_{TA\ offset}) \cdot T_s$ Here, $P_d$ represents propagation delay between a child node and an IAB node. In addition, $N_{TA}$ represents a timing advance value set by the IAB node.

(5) UE $L_{A,D}$ Rx timing: can be obtained by DL timing synchronization and tracking. ($L_{A,D}$ Tx timing $+ Pa$)

$L_{A,U}$ Tx timing: $L_{A,D}$ Rx timing $- (N_{TA} + N_{TA\ offset}) \cdot T_s$ Here, $P_d$ represents propagation delay between a UE and an IAB node. In addition, $N_{TA}$ represents a timing advance value set by the IAB node.

<Simultaneous Operations of MT and DU (SDM/FDM of $L_P$ and $L_C/L_A$)>

On the other hand, MT and DU can operate for the same time duration. As illustrated in FIGS. 38(e), (f) and (g), $L_P$ and $L_C/L_A$ can be simultaneously reserved.

In this case, MT and DU can simultaneously transmit or receive signals. In addition, Tx timings of MT and DU can be aligned such that a UL signal for a parent node and a DL signal for a child node/UE are multiplexed and simultaneously transmitted.

Likewise, Rx timings of MT and DU can be aligned for SDM/FDM of DL reception from the parent node and UL reception from the child node.

To align Tx/Rx timings of MT and DU in view of a node, Tx/Rx timings can be set to be identical to the Tx/Rx timings of MT. Accordingly, the node can set the Tx/Rx timings of MT on the basis of Rx/Tx timings of the parent node. Then, the node can align Tx/Rx timings of DU with the Tx/Rx timings of MT. Tx and Rx timings of each device based on this principle will be described in detail below.

(1) Parent Node DU $L_{P,D}$ Tx timing: aligned with a Tx timing of a parent node MT $L_{P,U}$ Rx timing: aligned with an Rx timing of the parent node MT If the parent node is a donor node, $L_{P,D}$ Tx timing and $L_{P,U}$ Rx timing of the corresponding node are $L_{C,D}$ Tx timing$-N_{TA\ offset} \cdot T_s$.

(2) IAB Node MT $L_{P,D}$ Rx timing: obtained by DL timing synchronization and tracking ($L_{P,D}$ Tx timing$+P_d$)

$L_{P,U}$ Tx timing: $L_{P,D}$ Rx timing$-(N_{TA}+N_{TA\ offset}) \cdot T_s$ $P_d$ represents propagation delay between a parent node and an IAB node and $N_{TA}$ represents a timing advance value set by the parent node.

(3) IAB Node DU $L_{C,D}$ Tx timing: identical to $L_{P,U}$ Tx timing
$L_{C,U}$ Rx timing: identical to $L_{P,D}$ Rx timing
$L_{A,D}$ Tx timing: identical to $L_{P,U}$ Tx timing
$L_{A,U}$ Rx timing: identical to $L_{P,D}$ Rx timing (4) Child Node MT $L_{C,D}$ Rx timing: obtained by DL timing synchronization and tracking ($L_{C,D}$ Tx timing$+P_d$)

$L_{C,U}$ Tx timing: $L_{C,D}$ Rx timing$-(N_{TA}+N_{TA\ offset}) \cdot T_s$ $P_d$ represents propagation delay between a child node and an IAB node and $N_{TA}$ can be a timing advance value set by IAB.

(5) UE $L_{A,D}$ Rx timing: obtained by DL timing synchronization and tracking ($L_{A,D}$ Tx timing$+P_d$)

$L_{A,U}$ Tx timing: $L_{A,D}$ Rx timing$-(N_{TA}+N_{TA\ offset}) \cdot T_s$ $P_d$ represents propagation delay between a UE and an IAB node and $N_{TA}$ can be a timing advance value set by IAB.

In the legacy NR system, a UL timing always precedes a DL timing at both of a gNB and a UE. However, when case 4 is applied, a DL timing may precede a UL timing for some nodes and UEs and thus minus values need to be supported for $N_{TA}$.

F-2. Multiplexing Options for Access and Backhaul Link

Multiplexing options for access and backhaul links in the NR IAB system will be additionally described on the basis of the above-described configurations of the present disclosure.

The following is defined for description in the present disclosure.

Timing case 1: DL transmission timing alignment over IAB nodes and donor nodes

Timing case 2: DL and UL transmission timings are aligned in an IAB node and DL and UL reception timings are aligned in the IAB node.

1. Option A. Only TDM of $L_P$ and $L_C/L_A$ is Supported

According to the above description, a specific time duration can be occupied by $L_P$, $L_C$, $L_A$ or $L_C+L_A$ in order to align Tx timings of all IAB nodes. In other words, $L_P$ and $L_C/L_A$ cannot be scheduled to be the same time duration.

Accordingly, only cases A, B, C and/or D (FIG. 38(*a*), (*b*), (*c*) and/or (*d*)) can be supported and multiplexed in different time durations in order to generate Tx timings between all nodes to be aligned (timing case 1).

That is, when a TDM pattern indicating a link that can be used for each timing period is present, this TDM pattern can be composed of a plurality of time durations and $L_P$, $L_C$, $L_A$ or $L_C+L_A$ can be transmitted in each time duration. This TDM pattern can be configured by a parent node or a donor node through higher layer signaling.

2. Option B. Support of SDM/FDM of $L_P$ and $L_C/L_A$

For flexible and efficient resource utilization in cases E, F and G in FIGS. 38(*e*), (*f*) and (*g*), support of SDM/FDM of $L_P$ and $L_C/L_A$ can be conceived.

Since timing case 2 needs to be supported in order to multiplex $L_P$ and $L_C/L_A$ in the same time duration, all or some of cases A to G may need to be supported in NR IAB and timing case 2 can be applied.

Alternatively, timing case 1 can be applied to a time duration in cases A to D and timing case 2 can be applied to a time duration in cases E to G.

3. Option C. TDM of $L_P/L_C$ and $L_A$

In view of a UE, it may be desirable to have an access link timing independent from a backhaul timing.

This means that switching between different backhaul links should not affect an access link timing on the side of a UE. Otherwise, the UE needs to perform a synchronization process whenever a backhaul link timing changes, which may not be effective for both a node and the UE.

Considering that a backhaul link route can be changed according to resource availability and channel conditions, it is desirable that an access link should not be affected by backhaul link route change unless a serving node is changed. Here, if timing case 2 is applied, a problem that an access link is affected by backhaul link route change may be generated.

In addition, since access link directions for two UEs connected to different nodes may be different, timing case 2 may cause a CLI issue for UEs.

In consideration of this aspect, independent Tx/Rx timings can be applied to at least access links even when timing case 2 is applied to backhaul links. In other words, an access link and a backhaul link can be TDMed. Accordingly, cases C and F in FIG. 38 can be considered and timing cases 1 and 2 can be applied to a backhaul link and an access link.

Hereinafter, an exemplary method of performing data transmission and/or reception by an IAB node on an access link and a backhaul link will be described with reference to the drawings for convenience of understanding of option C.

Figure 39:
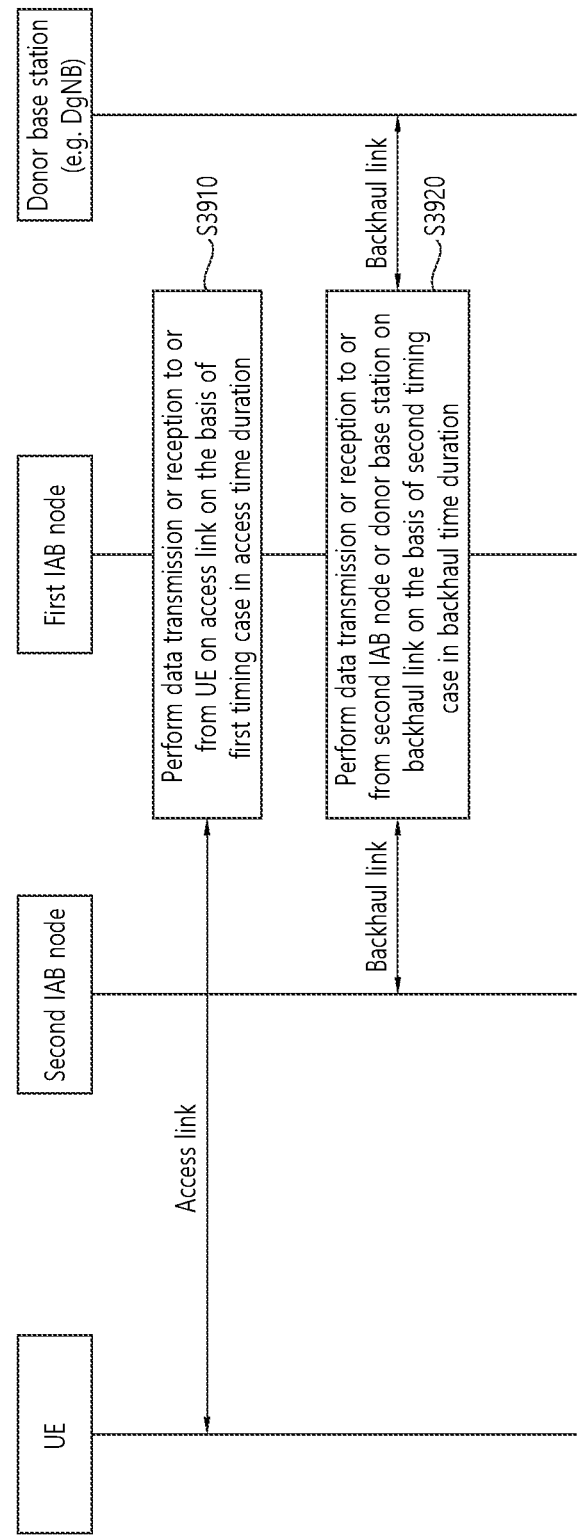
FIG. 39 is a flowchart of a method of performing data transmission and/or reception on an access link and a backhaul link according to an embodiment of the present disclosure.

FIG. 39 is a flowchart of a method of performing data transmission and/or reception on an access link and a backhaul link according to an embodiment of the present disclosure.

Referring to FIG. 39, a first node (e.g., a first IAB node) can perform transmission and/or reception of data to and/or from a terminal (e.g., a UE) on an access link in an access time duration on the basis of a first timing case (S3910).

Here, the first timing case may be the above-described "timing case 1" in which DL transmission timings over IAB nodes and donor nodes are aligned, as described above. In other words, DL transmission timings over a donor base station, a first node, a second node (e.g., a second IAB node) and a UE can be aligned in the first timing case.

Here, the first node may be the aforementioned IAB node. That is, the first node may be a node that can support both the aforementioned DU function and MT function. In other words, the first node may be a node that can support both being scheduled by the donor base station and scheduling of the second node or the UE.

The first node can perform data transmission or reception to or from the second node (e.g., the second IAB node) or the donor base station on a backhaul link in a backhaul time duration on the basis of a second timing case (S3920). Although data transmission/reception on the access link precedes data transmission/reception on the backhaul link in FIG. 39 for convenience of description, this is merely an example. That is, data transmission/reception on the backhaul link may precede data transmission/reception on the access link in the present disclosure.

Here, the second timing case may be the above-described "timing case 2" in which DL and UL transmission timings are aligned in an IAB node and DL and UL reception timings are aligned in an IAB node, as described above. In other words, DL and UL transmission timings or DL and UL reception timings can be aligned in the first node in the second timing case.

For convenience of understanding of FIG. 39, FIG. 39 is illustrated in a different manner and described below.

Figure 40:
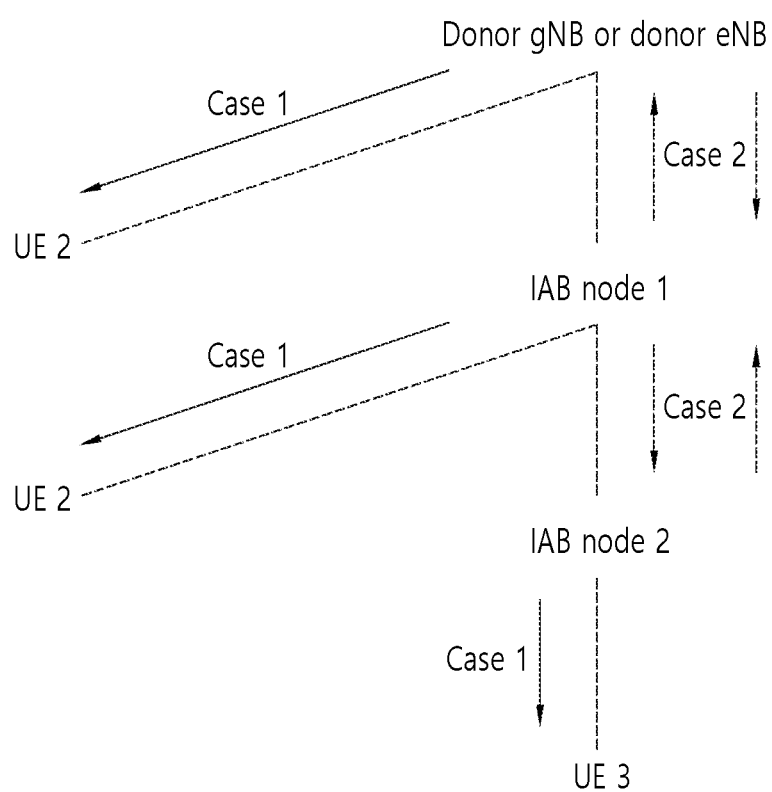
FIG. 40 illustrates the method of performing data transmission and/or reception on access links and backhaul links according to an embodiment of the present disclosure in a different form.

FIG. 40 illustrates the method of performing data transmission and/or reception on access links and backhaul links according to an embodiment of the present disclosure in a different form.

Referring to FIG. 40, a donor base station (e.g., a donor gNB or a donor eNB) may be connected to UE 1 through an access link and connected to IAB node 1 through a backhaul link. In addition, IAB node 1 may be connected to UE2 through an access link and connected to the donor base station and IAB node 2 through backhaul links. IAB node 2 may be connected to UE 3 through an access link and connected to IAB node 1 through a backhaul link.

In this situation, wireless communication can be performed on access links on the basis of timing case 1 in an access time duration. That is, the donor base station can perform wireless communication with UE 1, IAB node 1 can perform wireless communication with UE 2, and IAB node 2 can perform wireless communication with UE3 on the basis of timing case 1 in an access time duration.

In addition, wireless communication can be performed on backhaul links on the basis of timing case 2 in a backhaul time duration. That is, the donor base station can perform wireless communication with IAB node 1, IAB node 1 can perform wireless communication with the donor base station, and IAB node 2 can perform wireless communication with IAB node 1 on the basis of timing case 2 in a backhaul time duration.

Referring back to FIG. 39, the access time duration and the backhaul time duration may be time-division-multiplexed (TDMed). An example of this will be described below with reference to the drawing.

Figure 41:
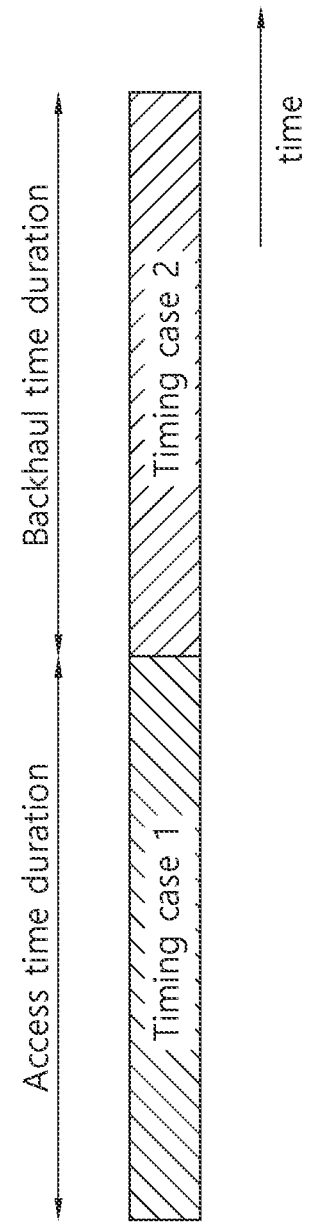
FIG. 41 schematically illustrates an example in which an access time duration and a backhaul time duration are TDMed.

FIG. 41 schematically illustrates an example in which an access time duration and a backhaul time duration are TDMed.

As in the example of FIG. 41, an access time duration, that is, a time duration in which wireless communication is performed on an access link, and a backhaul time duration, that is, a time duration in which wireless communication is performed on a backhaul link, can be distinguished from each other in the time domain.

Although the access time duration precedes the backhaul time duration in this example, this is merely an example for convenience of description. That is, the backhaul time duration may precede the access time duration or the access time duration and the backhaul time duration may be repeated in time series.

Referring back to FIG. 39, the embodiment of the present disclosure illustrated in FIG. 39 may be combined with embodiments of sections A to F which have been described above and will be described later. The embodiment of FIG. 39 and other embodiments (of sections A to F) may also independently operate.

For example, the first node may be connected to the donor base station through a first backhaul link, the first node may be connected to the second node through a second backhaul link, and a slot format for the first backhaul link may be different from a slot format for the second backhaul link, as described in section A. Here, the first node may be connected to a third node through a third backhaul link and the slot format for the second backhaul link may be different from a slot format for the third backhaul link.

In addition, the slot format for the backhaul links may be different from the slot format for the access links.

According to the embodiment described in FIG. 39, legacy UEs can be supported.

In addition, according to the embodiment described in FIG. 39, UEs can reuse the existing specifications, and thus impact on communication specifications change is mitigated. Furthermore, since DL timings of UEs can be aligned in an access timing duration, interference caused by DL communication performed by a certain UE and UL communication performed by another UE in the access timing duration can be alleviated.

Finally, since an access timing duration and a backhaul timing duration are TDMed and timing case 1 is applied to the access timing duration as in the example of FIG. 39, access links are not affected by backhaul link route change unless a serving node is changed.

The example of FIG. 39 will be described below from the viewpoint of the first node (e.g., first IAB node).

Figure 42:
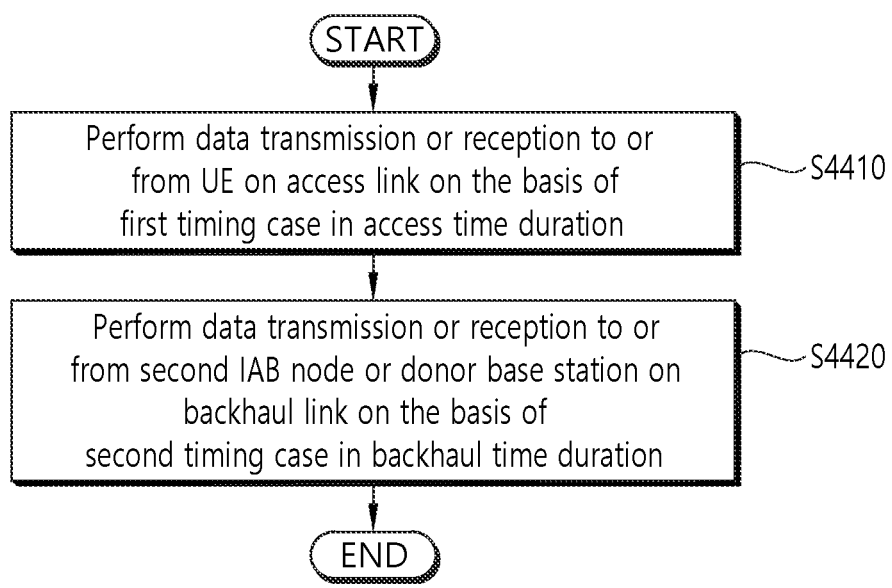
FIG. 42 is a flowchart of a method of performing data transmission and/or reception on an access link and a backhaul link from the viewpoint of the first node according to an embodiment of the present disclosure.

FIG. 42 is a flowchart of a method of performing data transmission and/or reception on an access link and a backhaul link from the viewpoint of the first node according to an embodiment of the present disclosure.

Referring to FIG. 42, the first node can perform data transmission/reception to/from a UE on an access link on the basis of the first timing case in an access time duration (S4110).

The first node can perform data transmission/reception to/from a second IAB node or a donor base station on a backhaul link on the basis of the second timing case in a backhaul time duration (S4120). Here, DL transmission timings over the donor base station, the first node, the second node and the UE can be aligned in the first timing case, and DL and UL transmission timings or DL and UL reception timings can be aligned in the first node in the second timing case, as described above.

Since the method of performing data transmission and/or reception on an access link and a backhaul link from the viewpoint of the first node has been described above in detail, redundant description is omitted for convenience.

Figure 43:
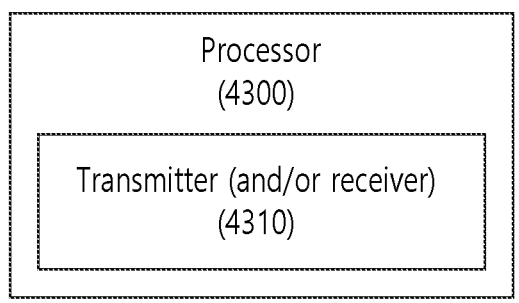
FIG. 43 is a block diagram of a device of performing data transmission and/or reception on an access link and a backhaul link from the viewpoint of the first node according to an embodiment of the present disclosure.

FIG. 43 is a block diagram of a device of performing data transmission and/or reception on an access link and a backhaul link from the viewpoint of the first node according to an embodiment of the present disclosure.

Referring to FIG. 43, a processor 4300 may include a transmitter (and/or receiver) 4310. Here, the processor may correspond to processors of FIGS. 47 to 49 which will be described later.

The transmitter (and/or receiver) 4310 may be configured to perform data transmission/reception to/from a UE on an access link on the basis of the first timing case in an access time duration. In addition, the transmitter (and/or receiver) 4310 may be configured to perform data transmission/reception to/from the second IAB node or the donor base station on a backhaul link on the basis of the second timing case in a backhaul time duration. Here, DL transmission timings over the donor base station, the first node, the second node and the UE can be aligned in the first timing case, and DL and UL transmission timings or DL and UL reception timings can be aligned in the first node in the second timing case, as described above.

Since the method of performing data transmission and/or reception on an access link and a backhaul link from the viewpoint of the first node has been described above in detail, redundant description is omitted for convenience.

The example of FIG. 39 will be described below from the viewpoint of a donor base station (e.g., donor gNB or donor eNB).

Figure 44:
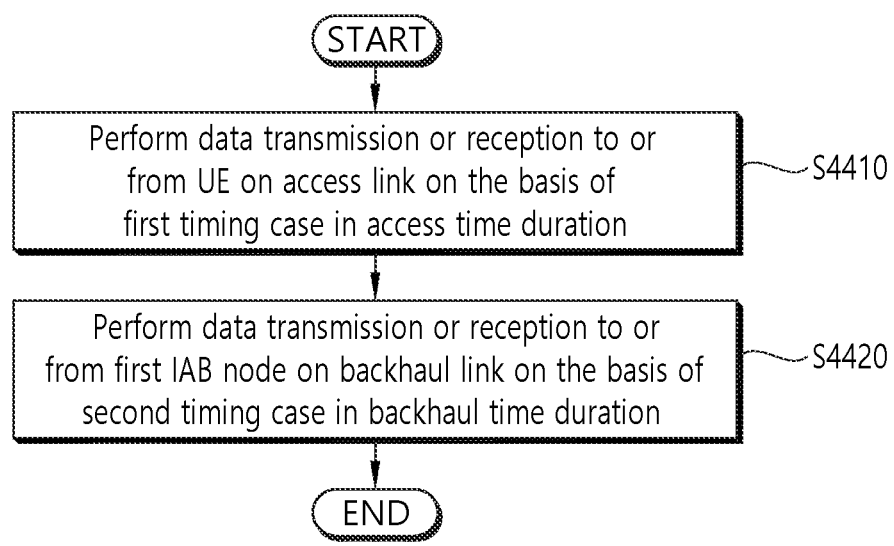
FIG. 44 is a flowchart of a method of performing data transmission and/or reception on an access link and a backhaul link from the viewpoint of the donor base station according to an embodiment of the present disclosure.

FIG. 44 is a flowchart of a method of performing data transmission and/or reception on an access link and a backhaul link from the viewpoint of the donor base station according to an embodiment of the present disclosure.

Referring to FIG. 44, the donor base station can perform data transmission/reception to/from a UE on an access link on the basis of the first timing case in an access time duration (S4410).

The donor base station can perform data transmission/reception to/from a first IAB node on a backhaul link on the basis of the second timing case in a backhaul time duration (S4420). Here, DL transmission timings over the donor base station, the first node, the second node and the UE can be aligned in the first timing case, and DL and UL transmission timings or DL and UL reception timings can be aligned in the first node in the second timing case, as described above.

Since the method of performing data transmission and/or reception on an access link and a backhaul link from the viewpoint of the donor base station has been described above in detail, redundant description is omitted for convenience.

Figure 45:
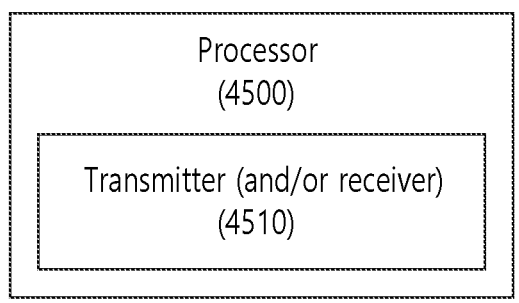
FIG. 45 is a block diagram of a device of performing data transmission and/or reception on an access link and a backhaul link from the viewpoint of the donor base station according to an embodiment of the present disclosure.

FIG. 45 is a block diagram of a device of performing data transmission and/or reception on an access link and a backhaul link from the viewpoint of the donor base station according to an embodiment of the present disclosure.

Referring to FIG. 45, a processor 4500 may include a transmitter (and/or receiver) 4510. Here, the processor may correspond to processors of FIGS. 47 to 49 which will be described later.

Referring to FIG. 45, the transmitter (and/or receiver) 4510 may be configured to perform data transmission/reception to/from a UE on an access link on the basis of the first timing case in an access time duration.

The transmitter (and/or receiver) 4510 may be configured to perform data transmission/reception to/from the first IAB node on a backhaul link on the basis of the second timing case in a backhaul time duration. Here, DL transmission timings over the donor base station, the first node, the second node and the UE can be aligned in the first timing case, and DL and UL transmission timings or DL and UL reception timings can be aligned in the first node in the second timing case, as described above.

Since the method of performing data transmission and/or reception on an access link and a backhaul link from the viewpoint of the donor base station has been described above in detail, redundant description is omitted for convenience.

F-3. Multi-Path Operation

Figure 46:
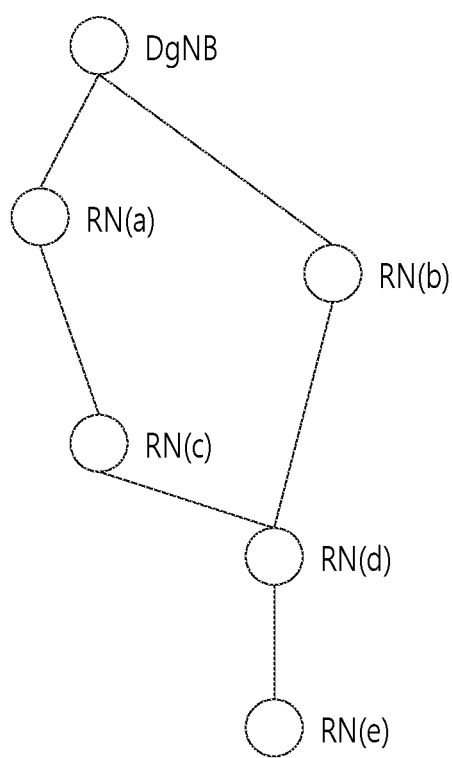
FIG. 46 schematically illustrates an example of multiple paths from a DgNB to RN(e).

FIG. 46 schematically illustrates an example of multiple paths from a DgNB to RN(e).

An IAB node can be connected to two or more parent nodes and there may be multiple paths reaching the DgNB. In FIG. 46, RN(d) has RN(b) and RN(c) as parent nodes and thus there are two paths from the DgNB to RN(e).

Even if RN(d) is connected to two higher nodes, RN(d) cannot simultaneously communicate with the two parent nodes. One reason may be that a Tx/Rx timing difference between an RN(b)-RN(d) backhaul link and an RN(c)-RN(d) backhaul link may be present on the side of RN(d). When a gap between a DL Rx timing of RN(b) and a DL Rx timing of RN(c) is not sufficiently small, it may be difficult to successfully receive data from both of RN(b) and RN(c). In addition, the same issue may be present even when UL signals are simultaneously transmitted to RN(b) and RN(c).

A TDM pattern of $L_P$ and $L_C$ may be configured differently for two parent nodes. For example, a backhaul link having a child node can be activated in an even-numbered slot of an even-numbered hop node and an odd-numbered slot of an odd-numbered hop node. In this case, since RN(b) is an odd-numbered hop node and RM(c) is an even-numbered hop node, RN(d) cannot communicate with RN(b) and RN(c) in the same time duration.

Considering the above aspect, it is necessary to support communication with another parent node in a different time duration. Accordingly, it is conceivable to set an available time duration for $L_P$ per parent node.

That is, when backhaul links with a plurality of parent nodes are present for a single node (when a plurality of $L_P$ is present), TDM patterns can be respectively configured for the backhaul links with the parent nodes (for $L_P$).

Figure 47:
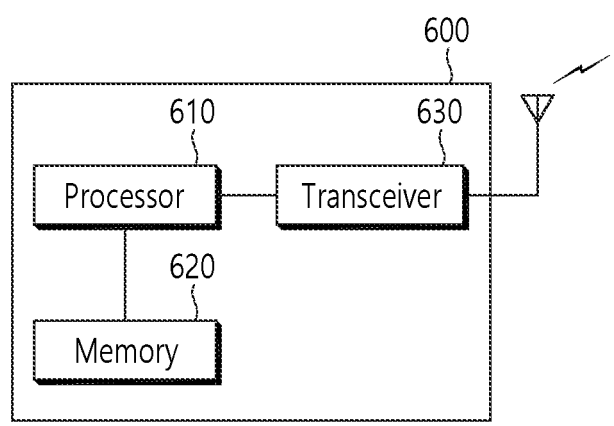
FIG. 47 illustrates a UE for implementing embodiments of the present disclosure.

FIG. 47 illustrates a UE for implementing embodiments of the present disclosure. The above-described present disclosure can be applied to this embodiment with respect to the UE.

The UE 600 includes a processor 610, a memory 620 and a transceiver 630. The processor 610 may be configured to implement functions, procedures and/or methods proposed in the present specification. Wireless interface protocol layers may be implemented in the processor 610.

More specifically, the processor 610 may be configured to perform data transmission/reception to/from a donor base station, a first IAB node or a second IAB node on an access link on the basis of the first timing case in an access time duration.

The memory 620 is operably connected to the processor 610 and stores various types of information for operating the processor 610. The transceiver 630 is operably connected to the processor 610 and transmits and/or receives RF signals.

The processor 610 may include an application-specific integrated circuit (ASIC), other chipsets, a logic circuit and/or a data processing device. The memory 620 may include a read-only memory (ROM), a random access memory (RAM), a flash memory, a memory card, a storage medium and/or other storage devices. The transceiver 630 may include a baseband circuit for processing RF signals. When an embodiment is implemented by software, technologies described in the present specification can be implemented by modules (e.g., procedures, functions, and the like) which perform functions described in the present specification. The modules may be stored in the memory 620 and executed by the processor 610. The memory 620 may be provided in the processor 610. Alternatively, the memory 620 may be provided outside the processor 610 and connected to the processor 610 through various known means such that it can communicate with the processor 610.

Figure 48:
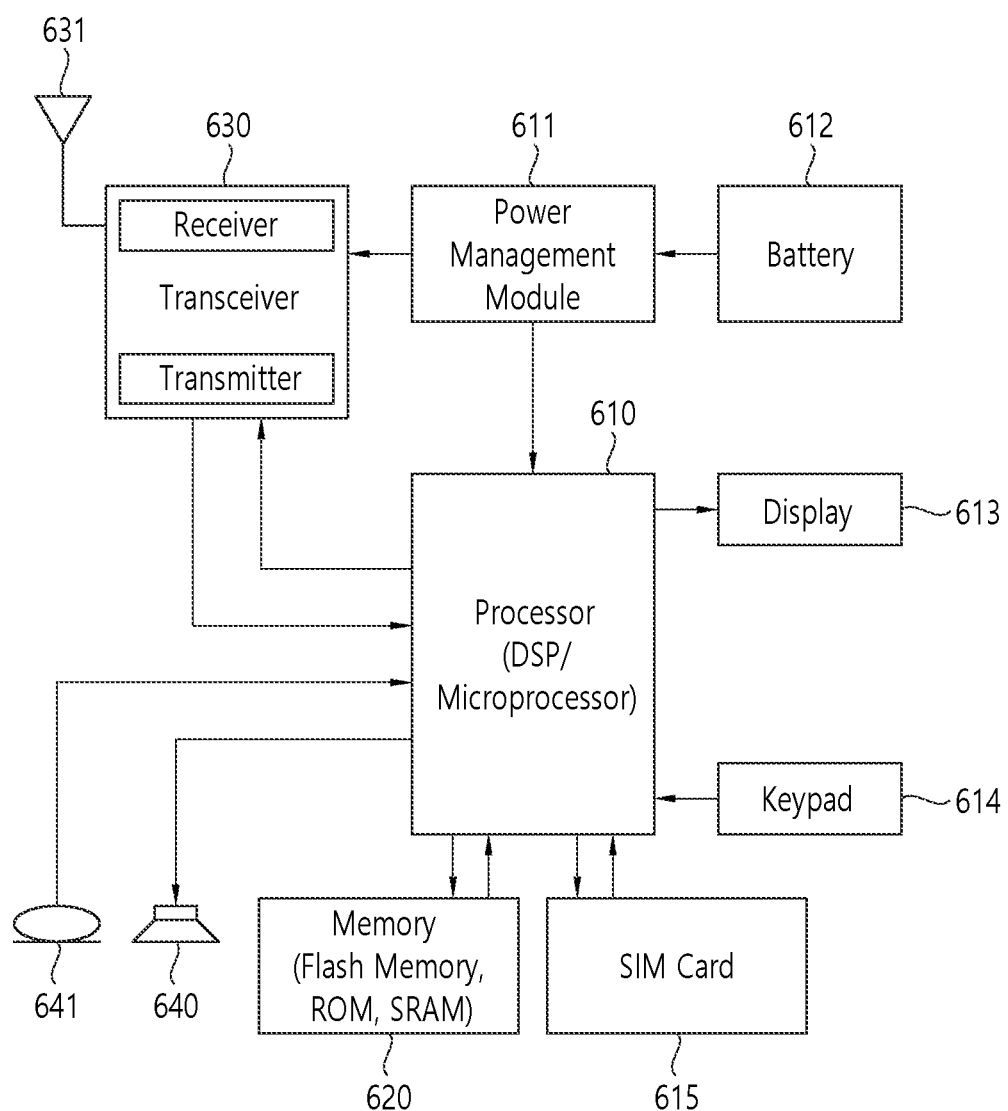
FIG. 48 illustrates the UE for implementing embodiments of the present disclosure in more detail.

FIG. 48 illustrates the UE for implementing embodiments of the present disclosure in more detail.

The present disclosure can be applied to this embodiment with respect to the UE.

The UE includes the processor 610, a power management module 611, a battery 612, a display 613, a keypad 614, a subscriber identification module (SIM) card 615, the memory 620, the transceiver 630, one or more antennas 631, a speaker 640, and a microphone 641.

The processor 610 may be configured to implement functions, procedures and/or methods proposed in the present specification. Wireless interface protocol layers may be implemented in the processor 610. The processor 610 may include an application-specific integrated circuit (ASIC), other chipsets, a logic circuit and/or a data processing device. The processor may be an application processor (AP). The processor 610 may include at least one of a digital signal processor (DSP), a central processing unit (CPU), a graphics processing unit (GPU), and a modulator and demodulator (modem). Examples of the processor 610 may be a SNAPDRAGONm series processor manufactured by Qualcomm©, an EXYNOSM series processor manufactured by Samsung©, an A series processor manufactured by Apple*, aTHELIOm series processor manufactured by MediaTek©, an ATOMm series processor manufactured by INTEL©, and a corresponding next-generation processor.

The processor 610 may be configured to perform data transmission/reception to/from a donor base station, a first IAB node or a second IAB node on an access link on the basis of the first timing case in an access time duration.

The power management module 611 manages power with respect to the processor 610 and/or the transceiver 630. The battery 612 provides power to the power management module 611. The display 613 outputs results processed by the processor 610. The keypad 614 receives input to be used by the processor 610. The keypad 614 may be displayed on the display 613. The SIM card 615 is an integrated circuit used to safely store international mobile subscriber identity (IMSI) used to identify and authenticate a subscriber in a mobile phone device such as a cellular phone or a computer and keys related thereto. Contact information may be stored in many SIM cards.

The memory 620 is operably connected to the processor 610 and stores various types of information for operating the processor 610. The memory 620 may include a read-only memory (ROM), a random access memory (RAM), a flash memory, a memory card, a storage medium and/or other storage devices. The transceiver 630 may include a baseband circuit for processing RF signals. When an embodiment is implemented by software, technologies described in the present specification can be implemented by modules (e.g., procedures, functions, and the like) which perform functions described in the present specification. The modules may be stored in the memory 620 and executed by the processor 610. The memory 620 may be provided in the processor 610. Alternatively, the memory 620 may be provided outside the processor 610 and connected to the processor 610 through various known means such that it can communicate with the processor 610.

The transceiver 630 is operably connected to the processor 610 and transmits and/or receives RF signals. The transceiver 630 includes a transmitter and a receiver. The transceiver 630 may include a baseband circuit for processing RF signals. The transceiver controls the one or more antennas 631 such that RF signals are transmitted and/or received.

The speaker 640 outputs audio-related results processed by the processor 610. The microphone 641 receives audio-related input to be used by the processor 610.

Figure 49:
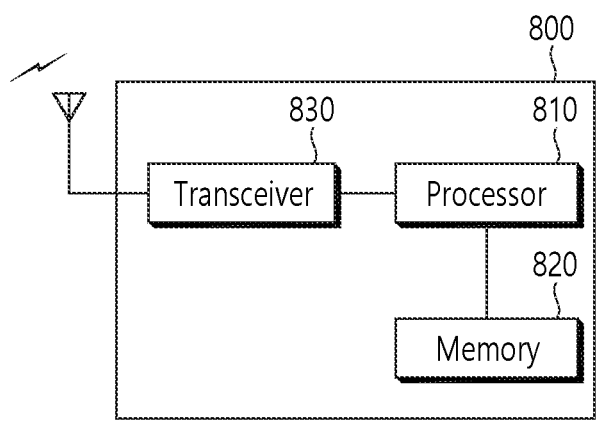
FIG. 49 illustrates a network node for implementing embodiments of the present disclosure.

FIG. 49 illustrates a network node for implementing embodiments of the present disclosure.

The above-described present disclosure can be applied to this embodiment with respect to the network node.

The network node 800 includes a processor 810, a memory 820 and a transceiver 830. The processor 810 may be configured to implement functions, procedures and/or methods proposed in the present specification. Wireless interface protocol layers may be implemented in the processor 810.

More specifically, when the network node corresponds to the aforementioned first node in FIG. 39, for example, the processor 810 may be configured to perform data transmission/reception to/from a UE on an access link on the basis of the first timing case in an access time duration. In addition, the processor 810 may be configured to perform data transmission/reception to/from a second IAB node or a donor base station on a backhaul link on the basis of the second timing case in a backhaul time duration. Here, DL transmission timings over the donor base station, the first node, the second node and the UE can be aligned in the first timing case, and DL and UL transmission timings or DL and UL reception timings can be aligned in the first node in the second timing case, as described above.

The memory 820 is operably connected to the processor 810 and stores various types of information for operating the processor 810. The transceiver 830 is operably connected to the processor 810 and transmits and/or receives RF signals.

The processor 810 may include an application-specific integrated circuit (ASIC), other chipsets, a logic circuit and/or a data processing device. The memory 820 may include a read-only memory (ROM), a random access memory (RAM), a flash memory, a memory card, a storage medium and/or other storage devices. The transceiver 830 may include a baseband circuit for processing RF signals. When an embodiment is implemented by software, technologies described in the present specification can be implemented by modules (e.g., procedures, functions, and the like) which perform functions described in the present specification. The modules may be stored in the memory 820 and executed by the processor 810. The memory 820 may be provided in the processor 810. Alternatively, the memory 820 may be provided outside the processor 810 and connected to the processor 810 through various known means such that it can communicate with the processor 610.

What is claimed is:

1. A method for receiving information related to a slot format for an Integrated Access and Backhaul (IAB) operation in a wireless communication system, the method performed by an IAB node and comprising:
   receiving the information related to the slot format; and
   performing the IAB operation according to the information,
   wherein the information indicates the slot format for a single slot, which includes a plurality of symbols, used for performing the IAB operation,
   wherein, based on the information, the plurality of symbols included in the single slot is configured from a uplink symbol period to a downlink symbol period, and
   wherein, between the uplink symbol period and the downlink symbol period, a flexible symbol period is located.

2. The method of claim 1, wherein a downlink operation is performed on the downlink symbol period or the flexible symbol period, and a uplink operation is performed on the uplink symbol period or the flexible symbol period.

3. The method of claim 1, wherein the IAB operation includes a distributed unit, DU, operation and a mobile terminal, MT, operation.

4. The method of claim 3, wherein information related to a slot format for the MT operation is different from information related to a slot format for the DU operation.

5. The method of claim 3, wherein the MT operation of the IAB node is an operation related to a backhaul link between the IAB node and a parent node, and wherein the DU operation of the IAB node is an operation related to a backhaul link between the IAB node and a child node or an operation related to an access link between the IAB node and a user equipment (UE).

6. An Integrated Access and Backhaul (IAB) node comprising:

a transceiver;

at least one memory; and at least one processor operatively coupled to the at least one memory and the transceiver, wherein the at least one processor is configured to:

control the transceiver to receive information related to a slot format; and perform an IAB operation according to the information, wherein the information indicates the slot format for a single slot, which includes a plurality of symbols, used for performing the IAB operation, wherein, based on the information, the plurality of symbols included in the single slot is configured from a uplink symbol period to a downlink symbol period, and wherein, between the uplink symbol period and the downlink symbol period, a flexible symbol period is located.

7. The IAB node of claim 6, wherein a downlink operation is performed on the downlink symbol period or the flexible symbol period, and a uplink operation is performed on the uplink symbol period or the flexible symbol period.

8. The IAB node of claim 6, wherein the IAB operation includes a distributed unit, DU, operation and a mobile terminal, MT, operation.

9. The IAB node of claim 8, wherein information related to a slot format for the MT operation is different from information related to a slot format for the DU operation.

10. The IAB node of claim 8, wherein the MT operation of the IAB node is an operation related to a backhaul link between the IAB node and a parent node, and wherein the DU operation of the IAB node is an operation related to a backhaul link between the IAB node and a child node or an operation related to an access link between the IAB node and a user equipment (UE).

* * * * *